US012699350B2

(12) United States Patent
Fan et al.

(10) Patent No.: US 12,699,350 B2
(45) Date of Patent: Aug. 4, 2026

(54) PROCESS CARTRIDGE DETACHABLY MOUNTABLE IN IMAGE FORMING APPARATUS

(71) Applicant: ZHUHAI DINGHUI TECHNOLOGY CO., LTD., Zhuhai (CN)

(72) Inventors: Jinshi Fan, Zhuhai (CN); Xia Liu, Zhuhai (CN)

(73) Assignee: ZHUHAI DINGHUI TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 19/361,375

(22) Filed: Oct. 17, 2025

(65) Prior Publication Data

US 2026/0044108 A1 Feb. 12, 2026

Related U.S. Application Data

(63) Continuation-in-part of application No. PCT/CN2024/096779, filed on May 31, 2024.

(30) Foreign Application Priority Data

May 31, 2023 (CN) ........................ 202321385346.9
Jun. 2, 2023 (CN) ........................ 202321406687.X
(Continued)

(51) Int. Cl.
*G03G 21/00* (2006.01)
*G03G 21/18* (2006.01)

(52) U.S. Cl.
CPC ..... *G03G 21/1825* (2013.01); *G03G 21/1821* (2013.01); *G03G 21/1842* (2013.01);
(Continued)

(58) Field of Classification Search
CPC ........... G03G 21/1633; G03G 21/1842; G03G 21/1821; G03G 21/1825; G03G 21/1853;
(Continued)

(56) References Cited

U.S. PATENT DOCUMENTS 8,712,284 B2 4/2014 Toba et al.
8,849,156 B2 9/2014 Mizuno et al.
(Continued)

FOREIGN PATENT DOCUMENTS

CN 104423239 A 3/2015
CN 109765773 A 5/2019
(Continued)

OTHER PUBLICATIONS

International Search Report and Written Opinion issued in corresponding PCT Application No. PCT/CN2024/096779, dated Aug. 31, 2024.

*Primary Examiner* — Robert B Beatty
(74) *Attorney, Agent, or Firm* — Westbridge IP LLC

(57) ABSTRACT

An image forming apparatus includes a tray configured to mount a process cartridge. The process cartridge includes: a developing unit provided with a developing member; a photosensitive unit provided with a photosensitive member; a side member disposed at a longitudinal end of the process cartridge, the developing unit and the photosensitive unit being arranged along a front-rear direction and movably connected by the side member; a resetting member configured to elastically deform and apply a force to the photosensitive unit when the developing unit moves relative to the photosensitive unit; and a positioning member provided on at least one of the side member and the photosensitive unit, the positioning member being configured to abut the tray in the front-rear direction when the developing unit moves relative to the photosensitive unit.

20 Claims, 39 Drawing Sheets

(30) Foreign Application Priority Data

| | | |
|---|---|---|
| Nov. 23, 2023 | (CN) | 202323175486.6 |
| Oct. 18, 2024 | (CN) | 202422533692.8 |
| Nov. 8, 2024 | (CN) | 202422740519.5 |
| Jan. 13, 2025 | (CN) | 202520076048.4 |
| Apr. 22, 2025 | (CN) | 202520777779.1 |
| May 23, 2025 | (CN) | 202521041407.9 |

(52) U.S. Cl.
CPC ............... *G03G 2221/1861* (2013.01); *G03G 2221/1869* (2013.01); *G03G 2221/1884* (2013.01)

(58) Field of Classification Search
CPC ... G03G 2221/1684; G03G 2221/1853; G03G 2221/1861; G03G 2221/1869; G03G 2221/1884
USPC .................................................. 399/111, 113
See application file for complete search history.

(56) References Cited

U.S. PATENT DOCUMENTS

| | | | | |
|---|---|---|---|---|
| 9,310,762 | B2 | 4/2016 | Kanno et al. | |
| 10,656,592 | B1 * | 5/2020 | Amann | G03G 21/1853 |
| 2008/0159772 | A1 * | 7/2008 | Koishi | G03G 21/1871 399/167 |
| 2011/0311265 | A1 * | 12/2011 | Ueno | G03G 21/1832 399/113 |
| 2013/0251402 | A1 * | 9/2013 | Yamashita | G03G 21/1825 399/111 |
| 2013/0315618 | A1 * | 11/2013 | Koishi | G03G 21/1842 399/110 |
| 2016/0252879 | A1 * | 9/2016 | Morioka | G03G 21/1814 399/111 |
| 2021/0034003 | A1 * | 2/2021 | Kubo | G03G 15/50 |
| 2022/0004144 | A1 * | 1/2022 | Sakai | G03G 21/1878 |
| 2022/0171328 | A1 | 6/2022 | Kakuta et al. | |
| 2023/0176514 | A1 * | 6/2023 | Itabashi | G03G 15/80 399/38 |

FOREIGN PATENT DOCUMENTS

| | | | |
|---|---|---|---|
| CN | 105929661 | B | 6/2020 |
| CN | 214540388 | U | 10/2021 |
| CN | 115061345 | A | 9/2022 |
| CN | 218547261 | U | 2/2023 |
| JP | 3890230 | B | 3/2007 |
| JP | 4882009 | B | 2/2012 |
| JP | 2021021938 | A | 2/2021 |
| JP | 2022162118 | A | 10/2022 |
| JP | 2023019457 | A | 2/2023 |

* cited by examiner

PROCESS CARTRIDGE DETACHABLY MOUNTABLE IN IMAGE FORMING APPARATUS

CROSS-REFERENCE TO RELATED APPLICATIONS

This application is continuation-in-part of International Application No. PCT/CN2024/096779, filed on May 31, 2024, which claims priority to Chinese Patent Application No. CN202321385346.9, filed on May 31, 2023, Chinese Patent Application No. CN202321406687.X, filed on Jun. 2, 2023, and Chinese Patent Application No. CN202323175486.6, filed on Nov. 23, 2023. This application also claims priority to Chinese Patent Application No. CN202422740519.5, filed on Nov. 8, 2024, Chinese Patent Application No. CN202422533692.8, filed on Oct. 18, 2024, Chinese Patent Application No. CN202520777779.1, filed on Apr. 22, 2025, Chinese Patent Application No. CN202520076048.4, filed on Jan. 13, 2025, and Chinese Patent Application No. CN202521041407.9, filed on May 23, 2025. The disclosures of the above-mentioned applications are hereby incorporated by reference in their entireties.

TECHNICAL FIELD

The present disclosure relates to the technical field of electrophotographic image forming apparatus, and in particular to a process cartridge that is detachably mountable to a main assembly of an electrophotographic image forming apparatus.

BACKGROUND

Process cartridges are typically detachably mounted in the main assembly of an electrophotographic image forming apparatus, such as a laser printer, copier, or facsimile machine. An electrophotographic image forming apparatus uniformly charges a photosensitive member, which serves as an image-bearing member, and then selectively exposes the photosensitive member to light to form an electrostatic latent image. This latent image is then developed with developer to become a visible developer image. The developer image is subsequently transferred to a recording medium. The developer image transferred to the recording medium is fixed by applying heat and pressure, thereby recording the image.

Conventional process cartridges are often equipped with a chip. Electrical contacts on the chip establish a communication link with the electrophotographic image forming apparatus by making contact with contact pins disposed in the main assembly of the apparatus. This communication link allows the image forming apparatus to obtain information about the process cartridge, such as whether the cartridge is installed, cartridge specifications, and other operating data. However, in existing process cartridges, the chip mount for installing the chip has a complex configuration, which can lead to issues such as complicated mold configurations and difficult mold release during manufacturing.

Furthermore, some process cartridges are provided with a separation force receiving member. When this member receives a separation force, the process cartridge may deflect, posing a risk of the chip disengaging from the contact pins and losing electrical contact.

SUMMARY

The present disclosure provides a process cartridge to address at least one of the technical problems existing in the background art.

A first aspect of the present disclosure provides a process cartridge detachably mountable in an image forming apparatus, the image forming apparatus including a tray configured to mount the process cartridge, the tray being movable into and out of a main assembly of the image forming apparatus, the process cartridge comprising: a developing unit provided with a developing member; a photosensitive unit provided with a photosensitive member; a side member disposed at a longitudinal end of the process cartridge, the developing unit and the photosensitive unit being arranged along a front-rear direction and movably connected by the side member; a resetting member configured to elastically deform and apply a force to the photosensitive unit when the developing unit moves relative to the photosensitive unit; and a positioning member provided on at least one of the side member and the photosensitive unit, the positioning member being configured to abut the tray in the front-rear direction when the developing unit moves relative to the photosensitive unit.

Preferably, the process cartridge further comprises a separation force receiving member configured to receive a separation force from the image forming apparatus thereby causing the developing unit to move relative to the photosensitive unit, wherein the photosensitive unit further comprises a second frame, and the photosensitive member is rotatable relative to the second frame; and wherein when the separation force receiving member receives the separation force, as the developing unit moves, the resetting member elastically deforms and applies a rearward pushing force to the second frame, and the positioning member positions the process cartridge by resisting the rearward pushing force, the rearward direction being a direction from the developing unit toward the photosensitive unit.

Preferably, the tray comprises a plurality of side plates and a process cartridge receiving cavity formed by the plurality of side plates, and wherein the positioning member is configured to abut an inner surface of at least one of the plurality of side plates, the inner surface facing the process cartridge receiving cavity.

Preferably, the positioning member is configured as a protrusion.

Preferably, the positioning member comprises a front positioning member and a rear positioning member, wherein the tray comprises a tray frame and a support portion provided on the tray frame for supporting the process cartridge; the tray frame comprises a first side plate, a second side plate, a third side plate, and a fourth side plate; wherein the first side plate and the second side plate are spaced apart from and opposite to each other in the front-rear direction, the third side plate and the fourth side plate are spaced apart from and opposite to each other in a longitudinal direction of the process cartridge, and wherein the first side plate, the second side plate, the third side plate, and the fourth side plate enclose and form the process cartridge receiving cavity; wherein along the front-rear direction, the first side plate is located in front of the second side plate, the first side plate having a first inner surface facing the process cartridge receiving cavity, and the second side plate having a second inner surface facing the process cartridge receiving cavity, the first inner surface and the second inner surface being opposite to each other; wherein before the separation force receiving member receives the separation force, the front positioning member is in a state of contact with the first inner surface or a gap is formed between the front positioning member and the first inner surface, and the rear positioning member is in a state of contact with the second inner surface or a gap is formed between the rear positioning member and the second inner surface; wherein the front-rear direction is parallel to a direction in which the tray moves into and out of the main assembly of the image forming apparatus; and wherein when the separation force receiving member receives the separation force, the developing unit rotates relative to the photosensitive unit, and the rear positioning member abuts the second inner surface.

Preferably, the image forming apparatus is provided with a rotational stop protrusion, the process cartridge further comprises a charging member and a second conductive member, the charging member being configured to charge the photosensitive member, the second conductive member being configured to supply power to the charging member; wherein, along a longitudinal direction of the process cartridge, the side member comprises a first side member disposed at a first end of the process cartridge and a second side member disposed at a second end of the process cartridge, the second side member being provided with a first end face and a step portion, the step portion including a recessed portion, the recessed portion being recessed from the step portion toward the first end of the process cartridge along the longitudinal direction of the process cartridge and being further recessed toward a front direction along the front-rear direction, the second conductive member being disposed in the recessed portion and being exposed rearward, the step portion protruding from the first end face, the step portion having an abutment surface facing a lower side of the process cartridge; wherein when the process cartridge is mounted in the image forming apparatus, the abutment surface abuts the rotational stop protrusion, the front-rear direction being parallel to a direction in which the tray moves into and out of the main assembly of the image forming apparatus, and wherein, along the front-rear direction, a direction from the developing unit toward the photosensitive unit is a rearward direction, and an opposite direction is the front direction.

Preferably, the developing unit comprises a first driving member provided at the first end of the process cartridge in a longitudinal direction, and wherein the photosensitive unit comprises a second driving member provided at the first end of the process cartridge in the longitudinal direction; wherein the first side member is provided with a first exposure portion configured to expose at least a part of the first driving member and a second exposure portion configured to expose at least a part of the second driving member, wherein the first exposure portion is configured as a notch structure, and the second exposure portion is configured as a hole structure;

wherein the first side member further includes a guide groove, an end face of the developing unit is provided with a protrusion cooperating with the guide groove, the developing unit is supported by the first side member through the cooperation of the guide groove and the protrusion, and the protrusion is slidable within the guide groove when the developing unit moves relative to the photosensitive unit.

Preferably, the image forming apparatus is provided with a preventing portion, the first side member further comprises a chip mount configured to mount a chip and an avoidance portion configured to avoid the preventing portion, wherein along the front-rear direction, the avoidance portion is located to the rear of the chip mount, and when the process cartridge is lowered with the tray to a predetermined position, the preventing portion enters the avoidance portion.

Preferably, the process cartridge further comprises a chip and a chip mount, the chip being provided with a substrate and a terminal, the terminal being provided on the substrate; the chip mount being provided with a mounting surface for supporting the substrate; and wherein the chip is configured to be press-fit into the chip mount when being mounted.

Preferably, the chip mount is provided with a mounting cavity, the mounting surface is disposed inside the mounting cavity, the mounting cavity has a mounting opening facing upward, and the mounting opening is provided with a guide portion configured to guide the chip.

Preferably, the substrate comprises a front surface, a rear surface opposite the front surface, and a side surface connecting the front surface and the rear surface, the terminal being provided on the front surface; wherein the chip mount further comprises an elastic member and a blocking portion, the elastic member is provided on at least one side of the mounting cavity and comprises a cover portion, the cover portion being configured to abut the front surface of the substrate; and the blocking portion is provided on a side of the mounting cavity different from the side on which the elastic member is provided, the blocking portion being configured to abut the side surface of the substrate.

Preferably, the chip mount comprises two elastic members, the two elastic members being provided on opposite sides of the mounting cavity, respectively; and wherein within a region defined by the mounting cavity, the chip mount further includes an empty portion adjacent to the blocking portion.

Preferably, the chip mount is detachable relative to the side member.

Preferably, the process cartridge further comprises a plurality of electrode contacts, wherein the developing unit is rotatable relative to the photosensitive unit about an developing rotation axis, and the developing rotation axis is located outside of a polygon having a largest area that formed by connecting the plurality of electrode contacts.

Preferably, the process cartridge further comprises a sealing member removable from the process cartridge, wherein when viewed in a direction perpendicular to a surface of the sealing member, a developing rotation axis of the developing unit is located outside of a width dimension of the sealing member defined in a direction perpendicular to an axial direction of the sealing member.

Preferably, the separation force receiving member comprises a surface configured to receive the separation force, wherein at least a portion of the surface faces downward.

Preferably, the process cartridge further comprises a shielding member, the separation force receiving member is provided with an acting portion, the acting portion being configured to receive a force applied by the image forming apparatus, and wherein when viewed in a longitudinal direction of the process cartridge, the shielding member shields the acting portion.

A second aspect of the present disclosure provides a process cartridge detachably mountable in an image forming apparatus, the image forming apparatus including a tray configured to mount the process cartridge, the tray having a second inner surface disposed to face a front-rear direction; the process cartridge comprising a developing unit, a photosensitive unit, and a side member, wherein the developing unit is provided with a developing member, the photosensitive unit is provided with a photosensitive member, the side member is disposed at a longitudinal end of the process cartridge, and the developing unit and the photosensitive unit are disposed along the front-rear direction and movably connected by the side member; wherein the process cartridge further comprises: a resetting member configured to elastically deform and apply a force to the photosensitive unit when the developing unit moves relative to the photosensitive unit; and a rear positioning member provided on at least one of the side member and the photosensitive unit, the rear positioning member being configured to abut the second inner surface of the tray.

Preferably, the process cartridge further comprises a front positioning member configured to abut a first inner surface of the tray, wherein the first inner surface and the second inner surface are opposite to each other.

Preferably, the rear positioning member is configured as a protrusion.

With the process cartridge having the above configuration, when the separation force receiving member receives a separation force, the deflection of the process cartridge can be effectively suppressed, and the chip of the process cartridge can maintain stable electrical contact with the contact pins in the main assembly of the image forming apparatus.

DETAILED DESCRIPTION OF THE EMBODIMENTS

In the following description, numerous specific details are set forth in conjunction with the embodiments to provide a thorough understanding of the present disclosure. However, it should be understood that the following embodiments and detailed descriptions are provided for illustrative purposes only and are not intended to limit the scope of protection of the present disclosure.

Embodiment 1

As known in the prior art (see, for example, Chinese Patent Publication CN105929661B), a process cartridge is detachably mounted in an electrophotographic image forming apparatus. Specifically, the process cartridge may be mounted into a tray unit in an up-down direction (a second direction), and the process cartridge may be mounted via the tray unit of the electrophotographic image forming apparatus into the main body (also referred to as the main assembly) of the image forming apparatus, which is configured to form images on a recording medium. The process cartridge is mounted in the tray unit and moves into and out of the main body. The tray unit is configured to move together with the process cartridge from a pulled-out position outside the main body to a mounting position inside the main body. The tray unit is provided with a plurality of trays, each for accommodating one process cartridge.

Figure 1A:
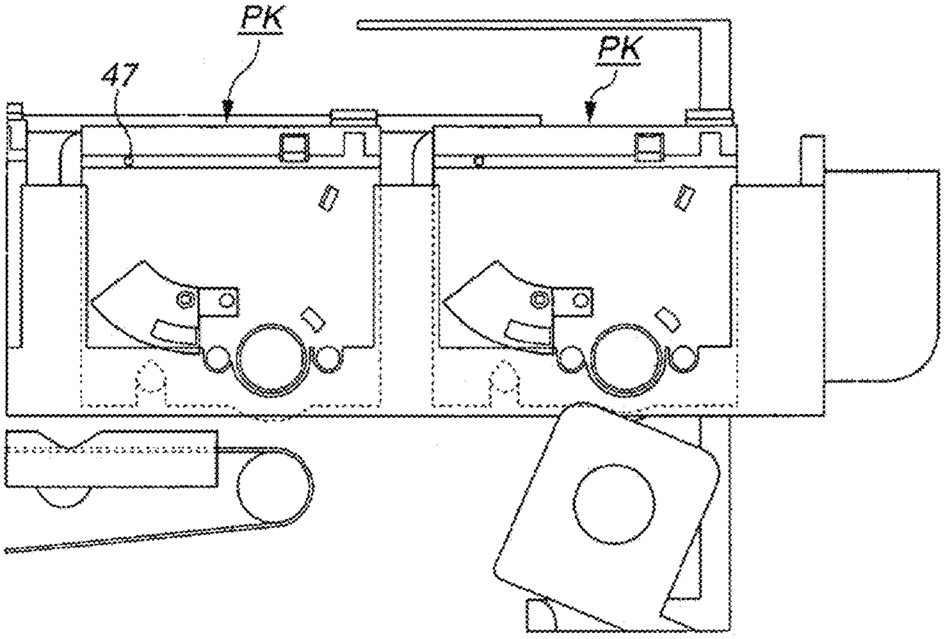
FIG. 1A (Prior Art)
FIG. 1A is a schematic structural view of a prior art process cartridge mounted in an image forming apparatus.

Referring to FIG. 1A, the image forming apparatus is provided with a rotational stop protrusion 47, which limits the position of the process cartridge PK when the process cartridge PK is mounted in the image forming apparatus. Specifically, the rotational stop protrusion 47 is provided in the main body of the image forming apparatus.

In the present disclosure, the process cartridge 100 may be a developing cartridge that includes a developing member, a drum cartridge that includes a photosensitive member, or an integrated cartridge that includes both a developing member and a photosensitive member.

As shown in FIG. 1C, FIG. 1D, FIG. 2, and FIG. 3, the longitudinal direction of the process cartridge is defined as the X-direction, the up-down direction when the process cartridge is mounted in the image forming apparatus is the Z-direction, and the direction perpendicular to both the longitudinal and up-down directions is the Y-direction. The process cartridge 100 of this embodiment includes a developing unit 1 and a photosensitive unit 2, which are connected such that they are movable relative to each other. Specifically, the developing unit 1 and the photosensitive unit 2 are connected by side members disposed at the X-direction ends of the process cartridge 100, allowing them to rotate relative to each other. The side member may be a part of the developing unit 1 or the photosensitive unit 2, or it may be an independently provided component. The side members are attached to the longitudinal ends of the process cartridge.

The developing unit 1 includes a developing member 11, a toner supplying member 12, a first driving member 13, a first conductive member 14, and a first frame 15. The first frame 15 is substantially rectangular. The developing member 11 and the toner supplying member 12 are rotatably mounted on the first frame 15. The toner supplying member 12 faces the developing member 11 to transfer toner contained within the first frame 15 to the developing member 11. The first driving member 13 is disposed at a first end in the longitudinal direction of the process cartridge and is capable of receiving a driving force from the electrophotographic image forming apparatus to drive the rotation of the developing member 11 and the toner supplying member 12.

The first conductive member 14 is disposed at a second end, opposite the first end, and is configured to supply power to the developing member 11.

The photosensitive unit 2 includes a photosensitive member 21, a charging member 22, a second driving member 23, a second conductive member 24, and a second frame 25. The photosensitive member 21 and the charging member 22 are rotatably mounted on the second frame 25. The photosensitive member 21 faces the developing member 11 for image forming operations. The developing member 11 is configured to supply toner to the photosensitive member 21 to develop the electrostatic latent image formed on its surface. The charging member 22 is configured to charge the photosensitive member 21. The second driving member 23 is disposed at the first end in the longitudinal direction of the process cartridge and can receive a driving force from the image forming apparatus to rotate the photosensitive member 21. The second conductive member 24 is disposed at the second end, opposite the first end, and is configured to supply power to the photosensitive unit 2 or the charging member 22.

Hereinafter, in the Z-direction, the side where the photosensitive member 21 or developing member 11 is located is referred to as the lower side, and the opposite side is the upper side. In the X-direction, the side where the first driving member 13 and second driving member 23 are located is the right side, and the opposite is the left side. In the Y-direction, the direction from the developing unit 1 towards the photosensitive unit 2 is the rearward direction, and the opposite is the forward direction.

As shown in FIG. 1C to FIG. 6, in this embodiment, the side members are formed as part of the photosensitive unit 2 and include a first side member 3 at the first end of the process cartridge and a second side member 4 at the second end. In the present disclosure, both the first side member 3 and the second side member 4 may be referred to as side members. The first side member 3 and the second side member 4 are respectively fixed to the two ends of the second frame 25 in the length direction and are configured to connect to the developing unit 1, allowing the developing unit 1 to rotate relative to the photosensitive unit 2.

Figure 2:
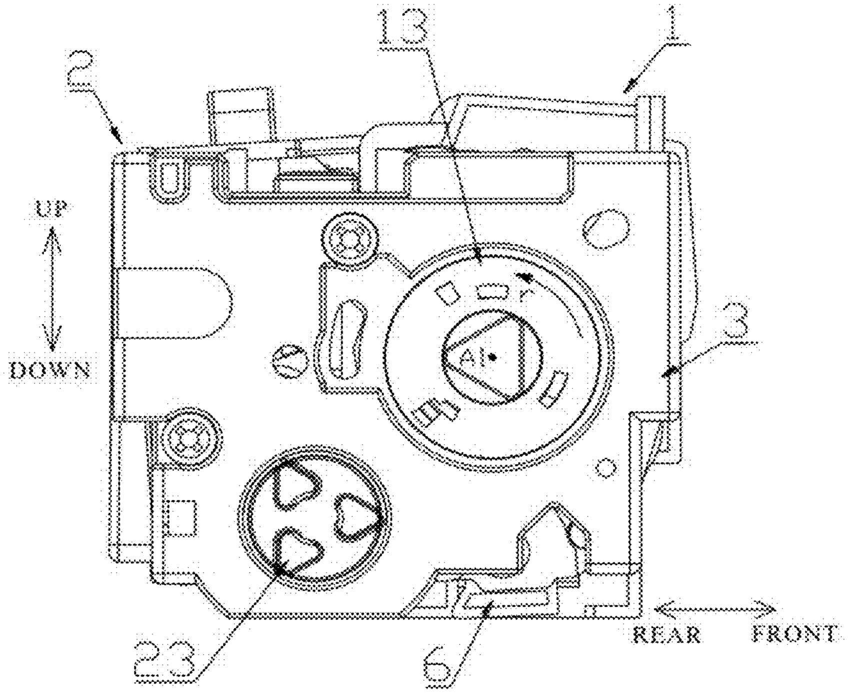
FIG. 2 is a side view showing the configuration of the first side member of the process cartridge according to Embodiment 1.
Figure 3:
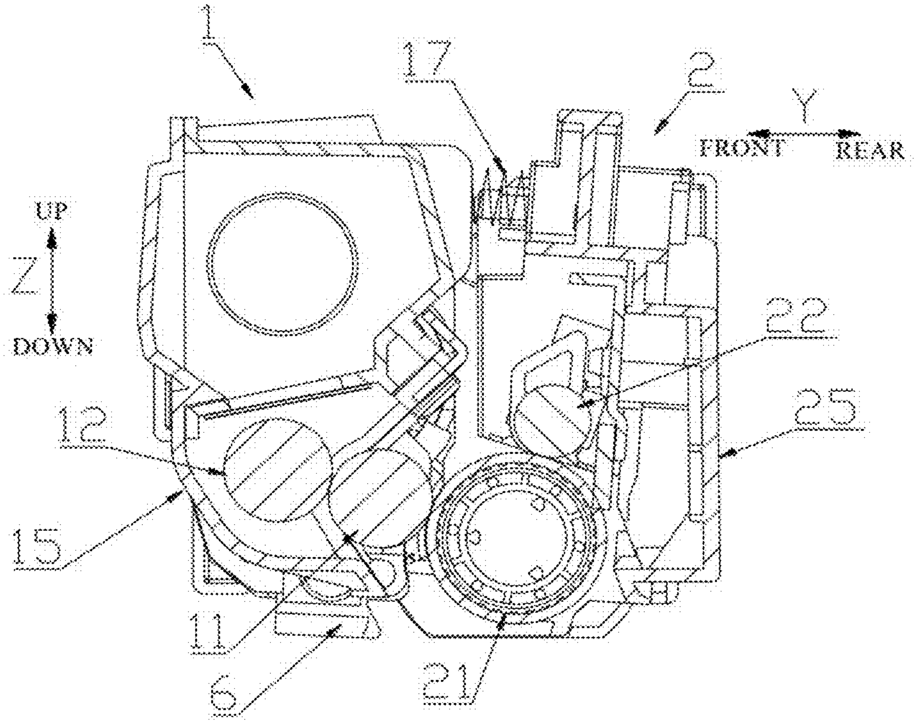
FIG. 3 is a cross-sectional structural view of the process cartridge according to Embodiment 1.

As shown in FIG. 2 and FIG. 3, the process cartridge 100 also includes a resetting member 17 and a separation force receiving member 6. In the up-down direction, the resetting member 17 and the separation force receiving member 6 are spaced apart. The separation force receiving member 6 is configured to receive a separation force from the image forming apparatus to compel the developing unit 1 to rotate relative to the photosensitive unit 2 about a rotation axis A1 in the direction r. This causes the developing member 11 and the photosensitive member 21 to move from a mutually close state to a mutually separated state. Simultaneously, the resetting member 17 undergoes elastic deformation and stores restoring force. When the separation force applied by the image forming apparatus to the separation force receiving member 6 is removed, the resetting member 17 releases its elastic force, compelling the developing unit 1 to rotate in the direction opposite to r about the rotation axis A1. The developing member 11 and the photosensitive member 21 return from the separated state to the close state, allowing the process cartridge 100 to perform developing/image forming operations.

Figure 4:
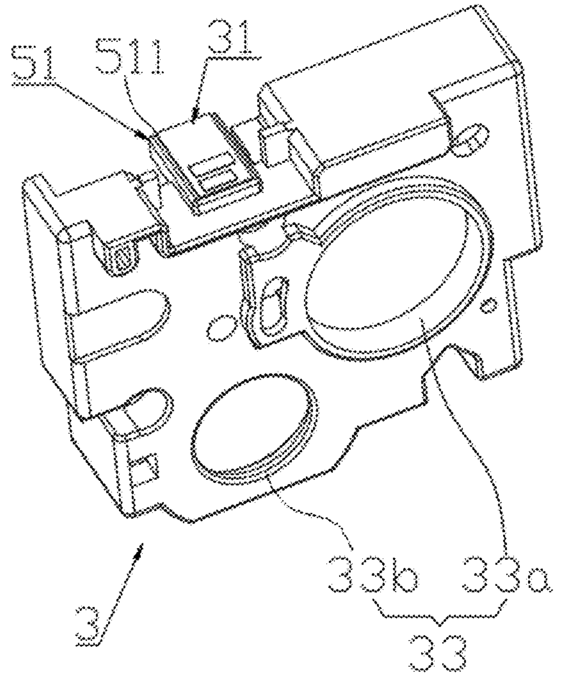
FIG. 4 is a perspective structural view of the first side member and the chip according to Embodiment 1.
Figure 5:
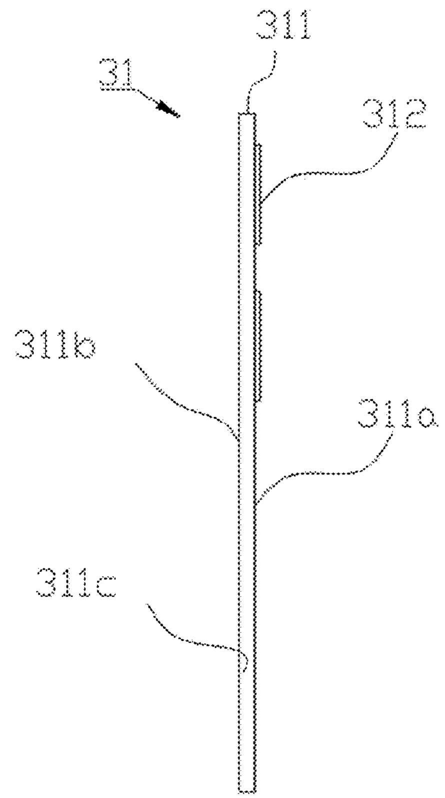
FIG. 5 is a side view of the chip according to Embodiment 1.

As shown in FIG. 3 and FIG. 4, the first side member 3 further includes a chip mount 51, a first exposure portion 33*a* configured to expose at least a part of the first driving member 13, and a second exposure portion 33*b* configured to expose at least a part of the second driving member 23, thereby allowing the first driving member 13 and second driving member 23 to receive an external driving force. The chip mount 51 is disposed on the first main body 32 (as described later) and is configured to mount a chip 31 (memory). As shown in FIG. 5, the chip 31 includes a substrate 311, terminals 312 mounted on the front surface 311*a* of the substrate, a rear surface 311*b* opposite the front surface 311*a*, and a side surface 311*c* connecting the front and rear surfaces. The terminals 312 are configured for electrical contact with the contact pins in the image forming apparatus to establish communication between the process cartridge 100 and the image forming apparatus. When the process cartridge is mounted in the electrophotographic image forming apparatus, both the chip 31 and the chip mount 51 are disposed on the upper side of the first side member 3, and the front surface 311*a* of the substrate faces upward.

As shown in FIG. 4, in the up-down direction Z, the first exposure portion 33*a* is located closer to the chip 31 than the second exposure portion 33*b*. The exposure portion 33 may be a hole configuration or a notch configuration.

In this embodiment, the chip mount 51 has an upward-facing mounting surface 511. The chip 31 may be mounted onto the mounting surface 511 in a direction perpendicular to the mounting surface 511. The mounting surface 511 supports the chip 31. Specifically, the substrate 311 of the chip 31 is attached to the mounting surface 511 by an adhesive, such as glue, double-sided tape, or solvent bonding. This configuration simplifies the chip mount 51.

Further, the extension direction of the mounting surface 511 is perpendicular to the up-down direction.

Further, the substrate 311 of the chip 31 is located above the chip mount 51, and the side surface 311*c* of the substrate 311 is exposed. This configuration of the process cartridge 100 simplifies the installation and removal of the chip 31 and reduces the risk of damaging the chip 31.

The second side member 4 is disposed at the second end of the process cartridge 100 in the longitudinal direction. It includes a third exposure portion 41*a* and a fourth exposure portion 41*b* configured to expose the first conductive member 14 and the second conductive member 24. The third and fourth exposure portions 41*a*, 41*b* may be configured as through-holes or notches.

In some embodiments, the chip mount 51 further includes a limiting portion to facilitate accurate installation of the chip 31.

In some embodiments, the first exposure portion 33*a* and the second exposure portion 33*b* are configured as circular holes of the same size.

In some embodiments, the first exposure portion 33*a* and the second exposure portion 33*b* are configured as circular holes, and the radius of the first exposure portion 33*a* is smaller than that of the second exposure portion 33*b*.

Figure 6:
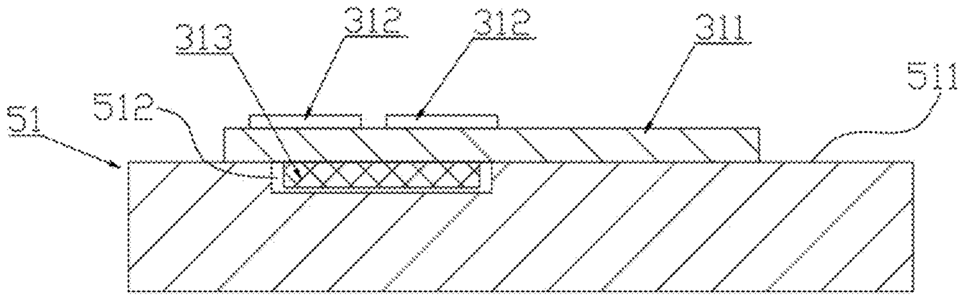
FIG. 6 is a cross-sectional view of the chip and the chip mount according to Embodiment 1.

In some embodiments, as shown in FIG. 6, the chip 31 also includes a memory device 313 on its rear surface 311*b*. The chip mount 51 includes an avoidance groove 512 corresponding to the memory device 313. The avoidance groove 512 is recessed from the mounting surface 511 in a direction away from the chip 31. When the chip 31 is installed on the mounting surface 511, the memory device 313 is situated within the avoidance groove 512.

In some embodiments, the chip mount 51 is configured to be detachable from the first side member 3. When the chip 31 needs to be replaced, a user can detach the chip mount 51 rather than using tools to pry the chip 31 from the chip mount 51.

Embodiment 2

Figure 7A:
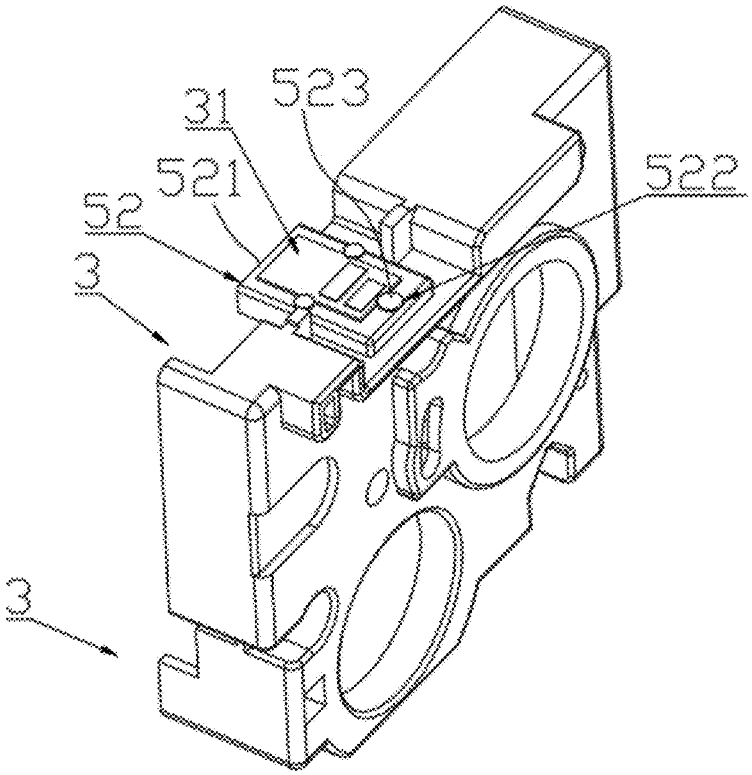
FIG. 7A is a perspective structural view of the first side member and the chip according to Embodiment 2.
Figure 7B:
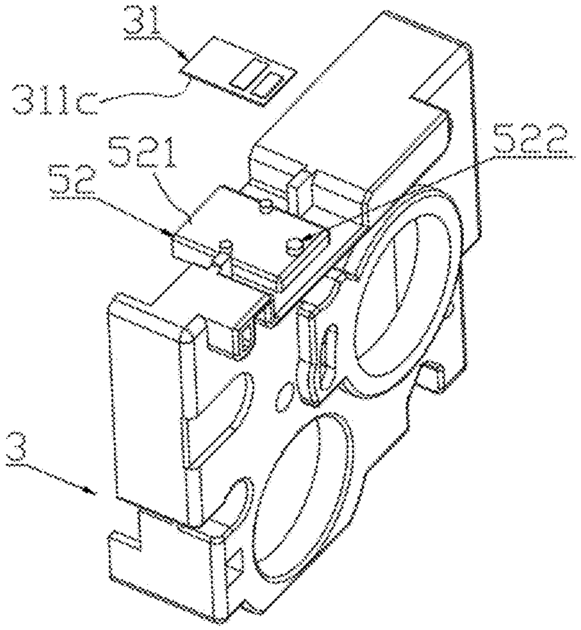
FIG. 7B is an exploded view of the first side member and the chip according to Embodiment 2.
Figure 7C:
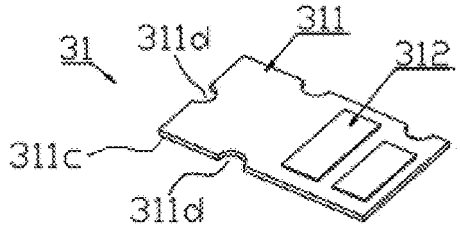
FIG. 7C is a perspective view of the chip according to Embodiment 2.
Figure 8:
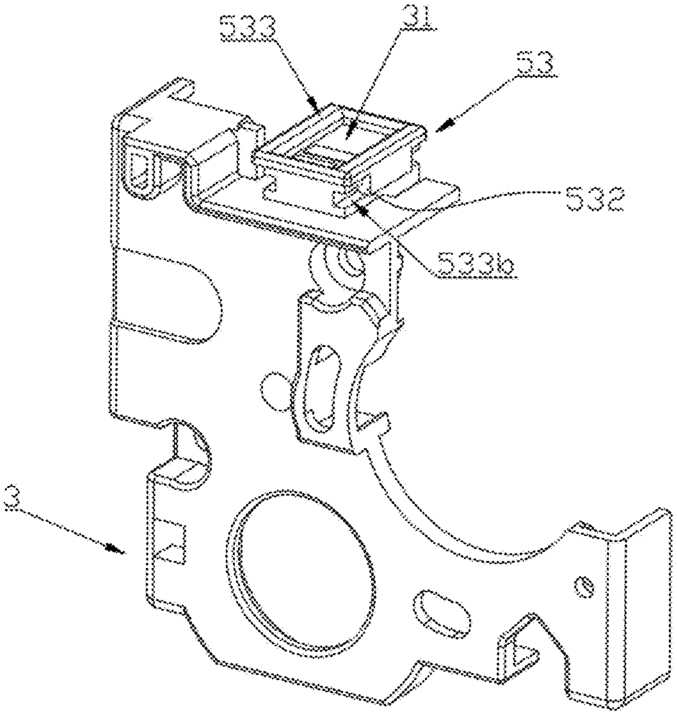
FIG. 8 is a perspective structural view of the first side member and the chip according to Embodiment 3.
Figure 9:
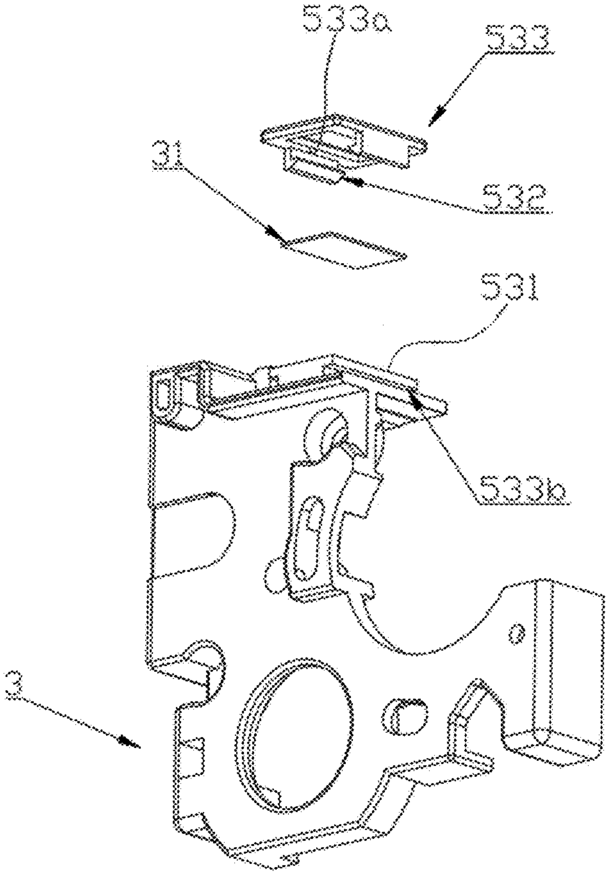
FIG. 9 is an exploded view of the first side member and the chip according to Embodiment 3.
Figure 10:
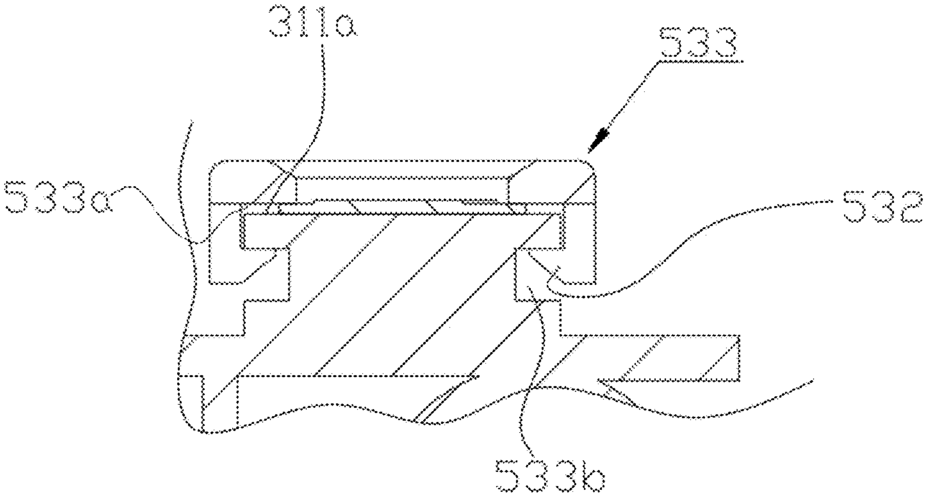
FIG. 10 is a partial cross-sectional structural view of the first side member and the chip according to Embodiment 3.

This embodiment differs from Embodiment 1 in the configuration of the chip mount and the chip. As shown in FIGS. 7A-7C, the chip mount 52 includes a mounting surface 521 and a plurality of mounting protrusions 522. The mounting surface 521 is configured for supporting the substrate 311 of the chip 31, and the plurality of mounting protrusions 522 are for fixing the substrate 311 of the chip 31. The mounting protrusions 522 extend outward in a direction perpendicular to the mounting surface 521.

When the chip 31 is mounted on the chip mount 52, the mounting protrusions 522 abut against a portion of the side surface 311*c* of the substrate 311 to restrict the movement of the chip 31.

Further, the chip mount 52 also has a cover portion 523 for fixing the chip 31. In this embodiment, at least one of the mounting protrusions 522 has a cover portion 523 at its tip. The cover portion 523 is disposed at the tip of the mounting protrusion 522 and is capable of covering a part of the front surface 311*a* of the substrate 311 to restrict its movement. Specifically, the cover portion 523 may be a configuration formed by melting or deforming the tip of the mounting protrusion 522 during a welding process.

In some embodiments, the substrate 311 of the chip 31 further includes a through-portion 311*d*, which may be a hole or a notch. The mounting protrusions 522 are inserted into the through-portion 311*d* and abut against the side surface 311*c* of the substrate 311 of the chip 31 to restrict the movement of the substrate 311.

In this embodiment, the chip 31 may be installed by first placing it on the chip mount 52 in a direction perpendicular to the mounting surface 521, and then fixing it by welding.

The process cartridge of this embodiment is configured to reduce wear on the substrate 311 of the chip 31 during installation. For removal, it is only necessary to break a part of the mounting protrusions 522 or the cover portion 523, making chip removal convenient.

Embodiment 3

This embodiment differs from Embodiment 2 in the configuration of the chip mount and the chip.

As shown in FIGS. 8-12, the chip mount 53 includes a mounting surface 531, an engaging portion 533*b*, and a cover portion 533. The mounting surface 531 is configured for supporting the substrate 311 of the chip 31. The cover portion 533 is configured for fixing the chip 31. The cover portion 533 includes a contact portion 533*a* capable of abutting against the front surface 311*a* of the chip 31 and an engaged portion 532 that mates with the engaging portion 533*b*. The engaging portion 533*b* and the engaged portion 532 of the cover portion 533 are joined to fix the cover portion 533.

Specifically, the engaging portion 533*b* and the engaged portion 532 may be configured as a snap-fit configuration.

To install the chip 31, it is first placed on the mounting surface 531 in a direction perpendicular to the mounting surface 531, and then the cover portion 533 is assembled, causing the chip 31 to be fixed on the chip mount 53. The cover portion 533 may be installed in a direction perpendicular to the mounting surface 531 so that the engaging portion 533*b* and the engaged portion 532 mate, or it may be installed in a direction parallel to the mounting surface 531.

The process cartridge 100 with the above configuration allows for simpler installation of the chip 31. To remove the chip 31, a user only needs to detach the cover portion 533, which prevents damage to the chip mount 53.

Figure 11:
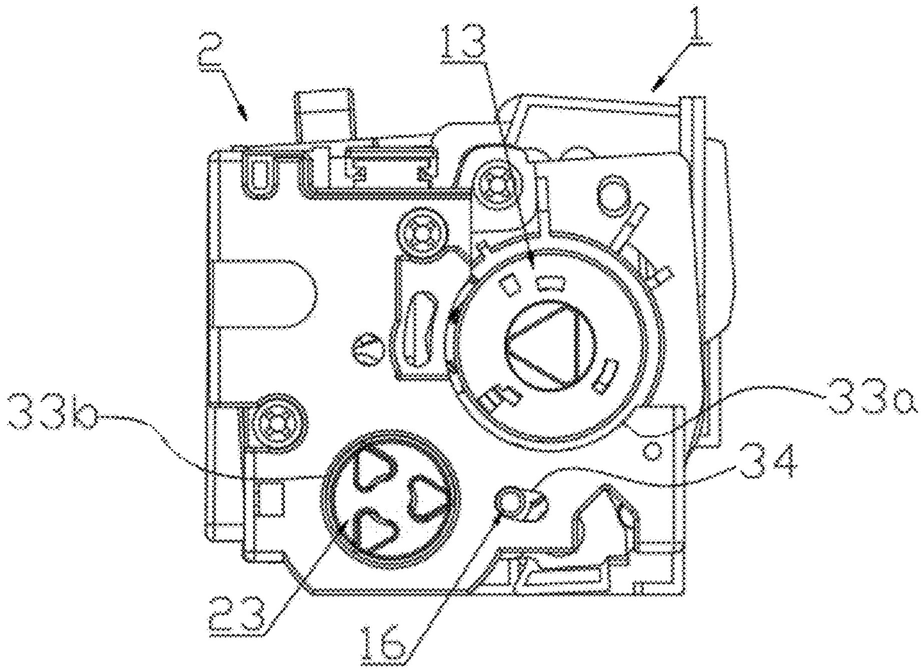
FIG. 11 is a side view of the process cartridge according to Embodiment 3.
Figure 12:
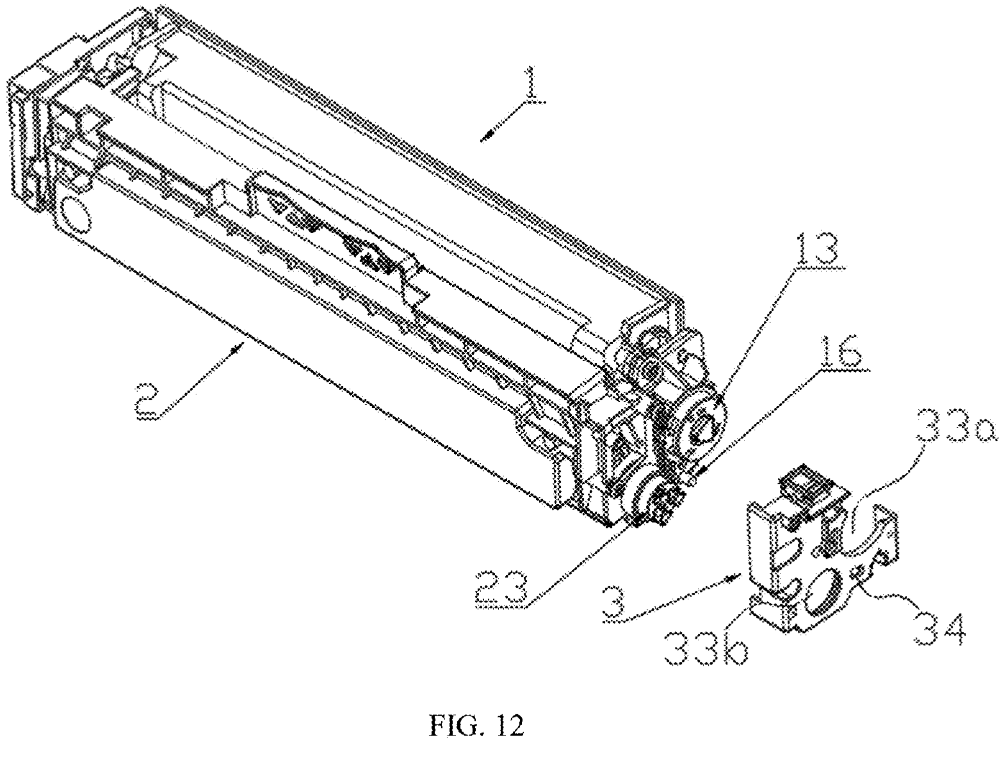
FIG. 12 is an exploded view of the process cartridge according to Embodiment 3.

In some embodiments, as shown in FIG. 11 and FIG. 12, the first side member 3 is provided with a guide groove 34, and the end face of the developing unit 1 is provided with a protrusion 16 that cooperates with the guide groove 34. The developing unit 1 is supported by the first side member 3 through the cooperation of the guide groove 34 and the protrusion 16. When the developing unit 1 moves relative to the photosensitive unit 2, the protrusion 16 can slide within the guide groove 34. Additionally, the first exposure portion 33*a* is configured as a notch with its opening facing the direction of movement of the developing unit 2, while the second exposure portion 33*b* is configured as a circular hole. The size of the first exposure portion 33*a* is larger than that of the second exposure portion 33*b*. This configuration provides sufficient space for the developing unit 1 to move within the notch when it moves relative to the photosensitive unit 2. The aforementioned guide groove 34 and protrusion 16 may be implemented in other embodiments of the present disclosure.

Embodiment 4

This embodiment differs from Embodiment 1 in the chip mount and chip mounting method.

Figure 13:
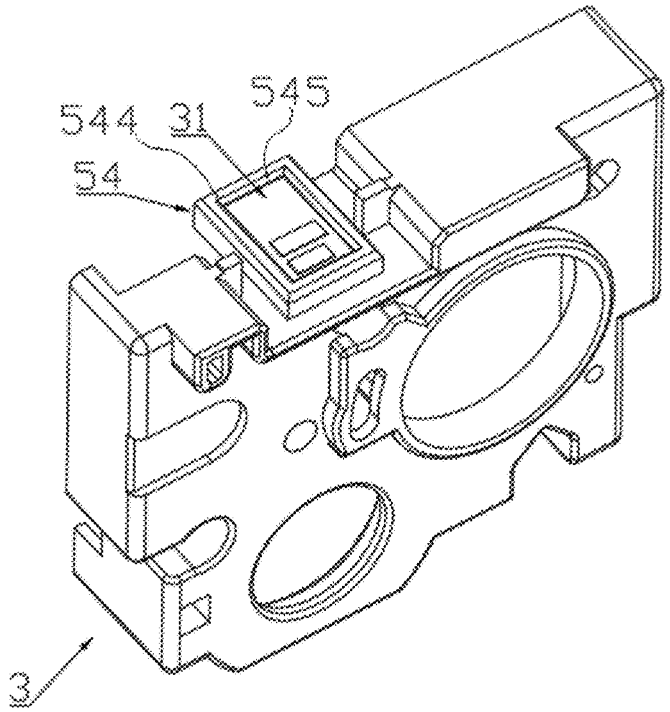
FIG. 13 is a perspective structural view of the first side member and the chip according to Embodiment 4.
Figure 14:
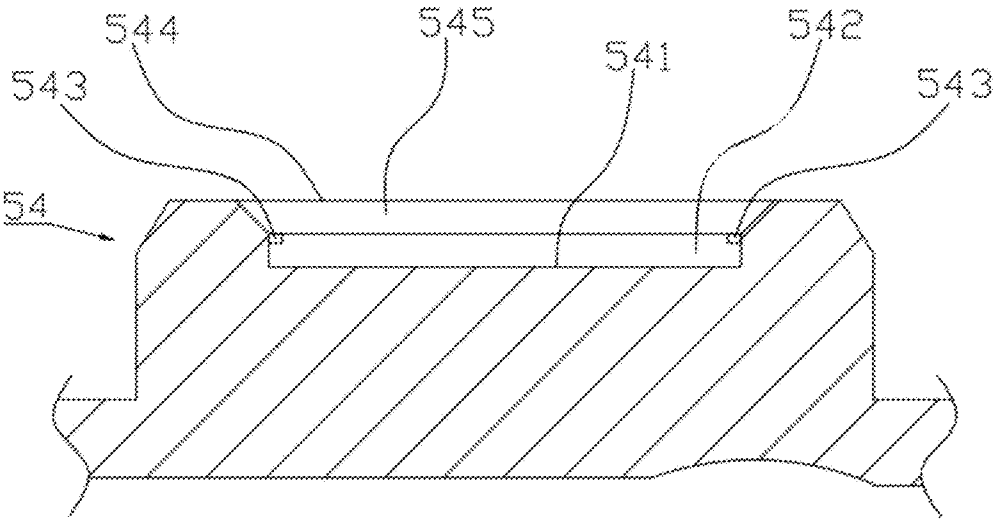
FIG. 14 is a cross-sectional view of the chip mount according to Embodiment 4.

As shown in FIGS. 13-14, the chip mount 54 includes a mounting cavity 542, a mounting surface 541 disposed within the mounting cavity 542 for supporting the substrate 311 of the chip 31, and a cover portion 543 located above the mounting surface 541 for fixing the chip 31. The mounting cavity 542 is configured to receive the substrate 311 of the chip 31 and has a mounting opening 544. The mounting opening 544 faces the upper side of the process cartridge, and the substrate 311 of the chip 31 may be mounted into the mounting cavity 542 through the mounting opening 544 in a direction perpendicular to the mounting surface 541.

Further, the side surface 311*c* of the chip substrate 311 may be enclosed by the mounting cavity 542.

Further, the mounting opening 544 has a guide portion 545. The guide portion 545 facilitates the smooth installation of the chip when it is being mounted into the mounting cavity.

To install the chip 31, it may be pressed into the mounting cavity 542 through the mounting opening 544, which makes assembly more convenient.

Embodiment 5

This embodiment differs from the aforementioned Embodiment 4 in the chip mount and chip mounting method.

Figure 15:
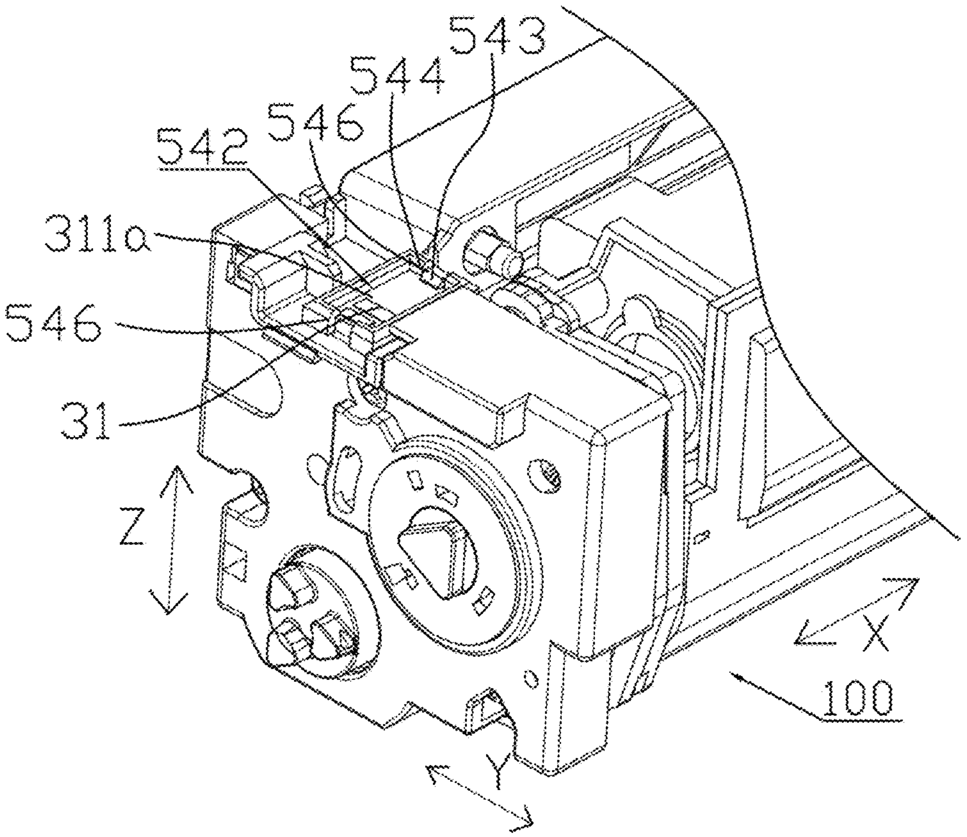
FIG. 15 is a partial structural view of one end of the process cartridge in the longitudinal direction according to Embodiment 5.

As shown in FIG. 15, at least one side of the mounting cavity 542 in the X or Y direction is provided with an elastic member 546. The elastic member 546 includes a cover portion 543 disposed at the tip of the elastic member 546. When the chip 31 is installed in the direction perpendicular to the mounting surface, the elastic member 546 elastically deforms to allow the chip 31 to be mounted into the mounting cavity 542. The cover portion 543 abuts against the front surface 311*a* of the substrate of the chip 31 to restrict the position of the chip 31. This configuration of the chip mount allows the chip to be pressed into the chip mount for installation, featuring a simple configuration and convenient mounting.

Specifically, the elastic member 546 may be configured as an elastic hook, with the cover portion 543 extending inward toward the mounting cavity 542. The number of elastic hooks may be one or more. Preferably, two elastic members 546 are provided, located on opposite sides of the mounting cavity 542 along the X direction or along the Y direction, which is perpendicular to the X and Z directions.

Embodiment 6

Figure 16:
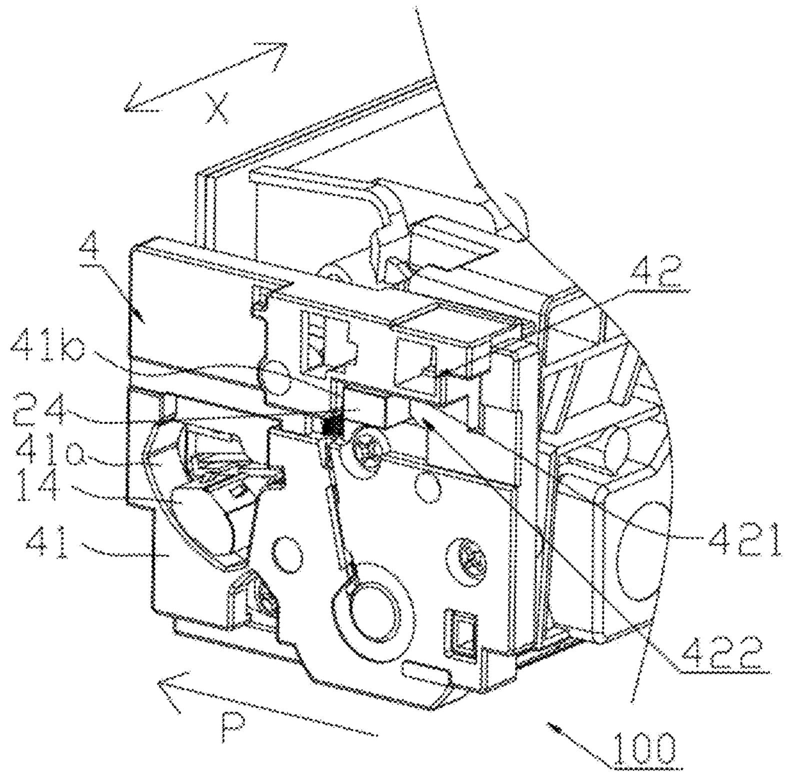
FIG. 16 is a partial structural view of one end of the process cartridge in the longitudinal direction according to Embodiment 6.

As shown in FIG. 16, this embodiment further improves the second side member 4 based on the previous embodiments. That is, the second side member 4 of this embodiment may be applied to the process cartridges of the previous embodiments.

Referring to FIG. 16, the second side member 4 has a first end face 41 and a step portion 42 protruding longitudinally from the first end face 41. Along the longitudinal X direction, the first end face 41 faces away from the developing unit 1/first frame 15. When the process cartridge is installed in the electrophotographic image forming apparatus and the door is closed, this step portion 42 abuts against a rotational stop protrusion 47 (as shown in FIG. 1A), thereby defining the position of the process cartridge. Specifically, the step portion 42 has an abutment surface 421 facing toward the bottom of the process cartridge. Along a first direction P (parallel to the Y direction), the abutment surface 421 is located upstream of the second conductive member 24. This abutment surface 421 abuts against the rotational stop protrusion 47 of the electrophotographic image forming apparatus. In other words, the abutment surface 421 is located to the rear of the second conductive member 24.

Further, the step portion 42 includes a recessed portion 422. This recessed portion 422 is recessed from the step portion 42 in the X direction toward the first end of the process cartridge and is also recessed in the first direction P. Preferably, the second conductive member 24 is disposed in this recessed portion 422. More preferably, along the direction opposite to the first direction P, the second conductive member 24 is exposed, which facilitates its installation. The first direction P is preferably parallel to the Y direction. This design can prevent interference between the step portion and the rotational stop protrusion 47 during the process of installing the process cartridge into the electrophotographic image forming apparatus. In particular, when closing the door, it ensures that the abutment surface 421 can smoothly abut against the rotational stop protrusion 47.

Embodiment 7

Figure 17:
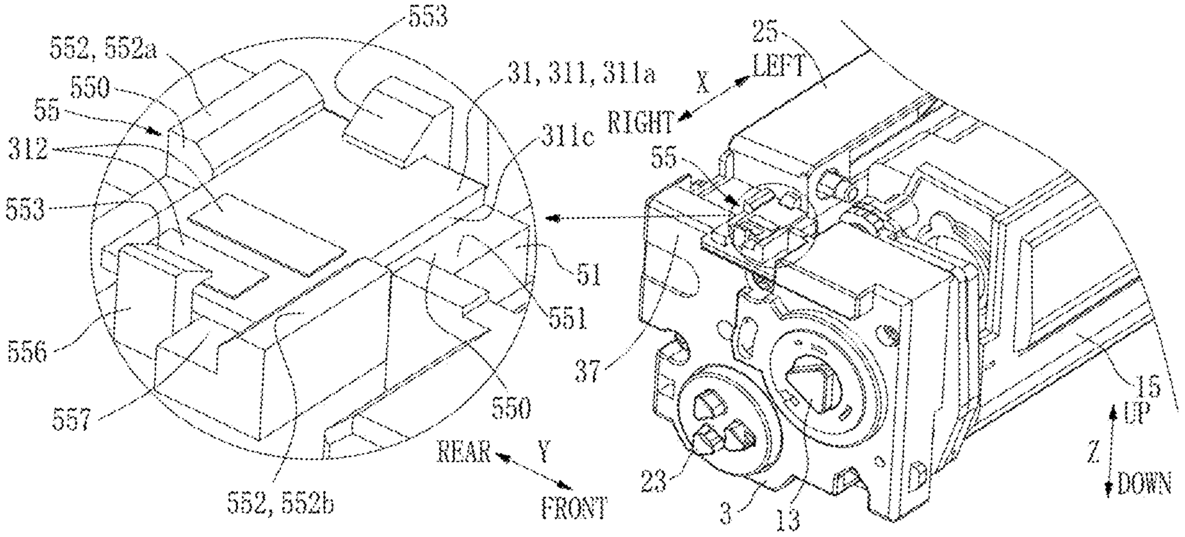
FIG. 17 is a partial structural view of one end of the process cartridge in the longitudinal direction according to Embodiment 7.

As shown in FIG. 17, the chip mount 55 in this embodiment further includes an elastic member 556 and a cover portion 553 at the end of the elastic member 556. When the chip 31 is installed in the mounting cavity 557 in a direction perpendicular to the mounting surface 551, the elastic member 556 elastically deforms to allow the chip 31 to be mounted, and the cover portion 553 abuts against the front surface 311*a* of the substrate of the chip 31 to restrict the chip 31.

Further, the chip mount 55 also includes a blocking portion (mounting protrusion) 552 provided on a side different from the elastic member 556. When the chip 31 is mounted on the mounting surface 551, both the blocking portion 552 and the elastic member 556 abut against the side surface 311*c* of the substrate, thereby stably positioning the chip 31 on the mounting surface 551. Accordingly, the blocking portion 552 and the elastic member 556 may be collectively referred to as a limiting portion. The limiting portion abuts against the side surface 311*c* of the substrate to restrict the movement of the chip 31 in directions perpendicular to the Z direction.

Preferably, two elastic members 556 are provided. Along the longitudinal X or Y direction, the two elastic members 556 are disposed on opposite sides of the mounting cavity 557, respectively. In some embodiments, the two elastic members 556 may have only one that is elastic. FIG. 17 shows an example where two elastic members 556 are provided on opposite sides of the mounting cavity 557 along the longitudinal X direction. In a deformable configuration, the two elastic members 556 may also be provided on opposite sides of the mounting cavity 557 along the Y direction.

Taking the configuration shown in FIG. 17 as an example, the blocking portion 552 is provided on the Y-direction side of the mounting cavity 557. Preferably, two blocking portions 552 are also provided. The two blocking portions are arranged on opposite sides of the mounting cavity 557 and are spaced apart along the Y direction. In one embodiment, the two blocking portions 552 are misaligned. Specifically, the blocking portion 552 includes a first blocking portion 552*a* located at the rear of the mounting cavity 557 and a second blocking portion 552*b* located at the front of the mounting cavity 557. Along the longitudinal X direction, the dimensions of both the first blocking portion 552*a* and the second blocking portion 552*b* are smaller than the dimension of the mounting cavity 557. Therefore, an empty portion 550 is formed adjacent to both the first blocking portion 552*a* and the second blocking portion 552*b*. That is, along the arrangement direction of the two elastic members 556, or along a direction intersecting the arrangement direction of the two blocking portions, within the defined area S of the mounting cavity 557, the blocking portion 552 is provided adjacent to the empty portion 550.

Figure 18:
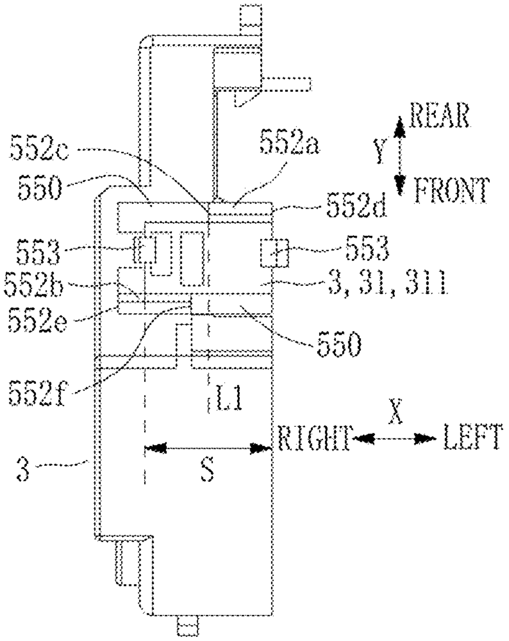
FIG. 18 is a side view of the first side member according to Embodiment 7, viewed from top to bottom along the Z-axis.

As shown in FIG. 18, the first blocking portion 552*a* is located to the left of the second blocking portion 552*b*. Along the longitudinal X direction, the first blocking portion 552*a* has a first end face 552*c* at its right end and a second end face 552*d* at its left end. The second blocking portion 552*b* has a third end face 552*e* at its right end and a fourth end face 552*f* at its left end. A first reference line L1, parallel to the Y direction, is drawn through the rightmost point or face of the first blocking portion 552*a*. This first reference line L1 is located at least to the left of the third end face 552*e*. Preferably, the first reference line L1 is located to the left of the fourth end face 552*f* or passes through the fourth end face 552*f*. In this preferred configuration, the first blocking portion 552*a* and the second blocking portion 552*b* do not overlap in the Y direction. This simplifies the configuration of the chip mount 55, and the mold for manufacturing the chip mount 55 may be released more easily.

In some embodiments, along the longitudinal X direction, the positions of the first blocking portion 552*a* and the second blocking portion 552*b* may be interchanged, meaning the first blocking portion 552*a* is to the right of the second blocking portion 552*b*. In this case, the first reference line L1 will pass through the leftmost point or face of the first blocking portion 552*a*. Along the longitudinal X direction, the first reference line L1 is located at least to the right of the fourth end face 552*f*. Preferably, the first reference line L1 is located to the right of the third end face 552*e* or passes through the third end face 552*e*.

In some embodiments, the positions of the blocking portion 552 and the elastic member 556 may also be interchanged. That is, the elastic member 556 is provided on the Y-direction side of the mounting cavity 557, and the blocking portion 552 is provided on the longitudinal X-direction side of the mounting cavity 557.

Figure 1B:
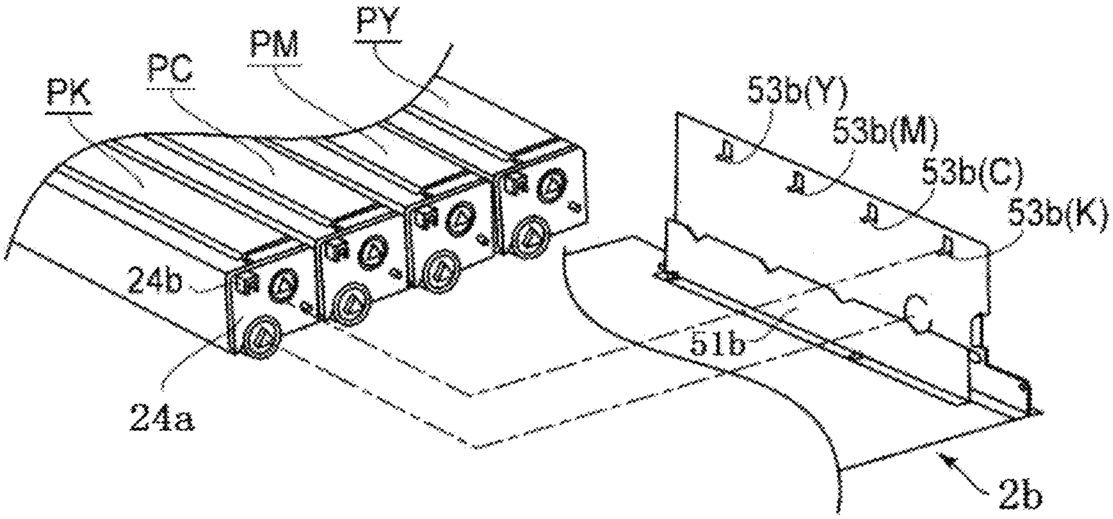
FIG. 1B (Prior Art)
FIG. 1B is a schematic view illustrating the cooperative relationship between a prior art process cartridge and a main body of an image forming apparatus.
Figure 1C:
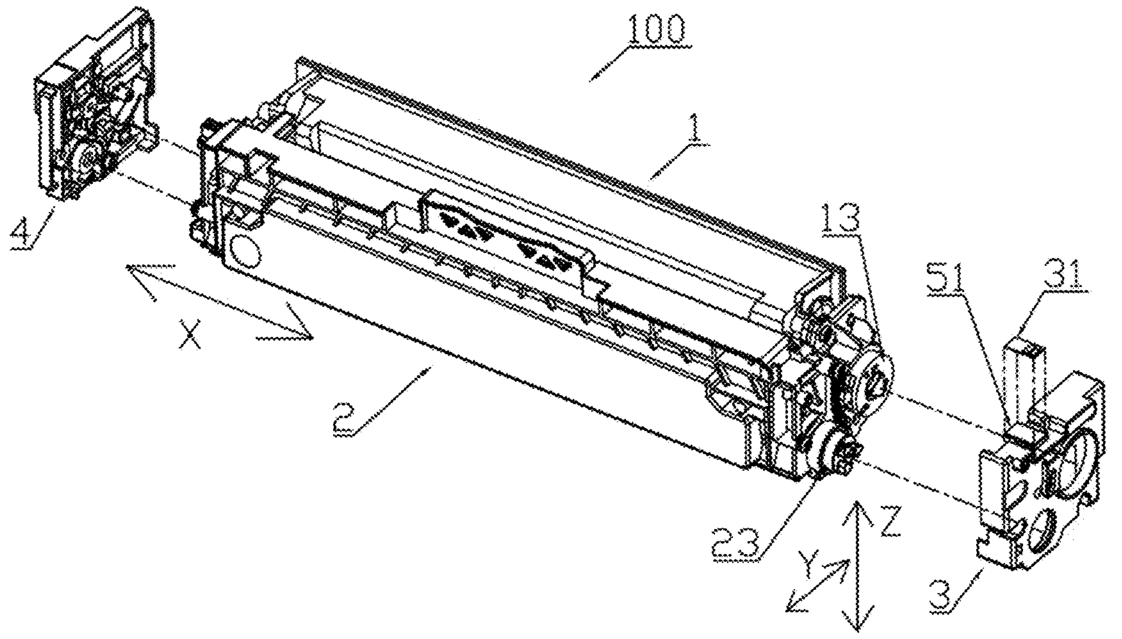
FIG. 1C is a first exploded structural view of the process cartridge according to Embodiment 1 of the present disclosure.
Figure 1D:
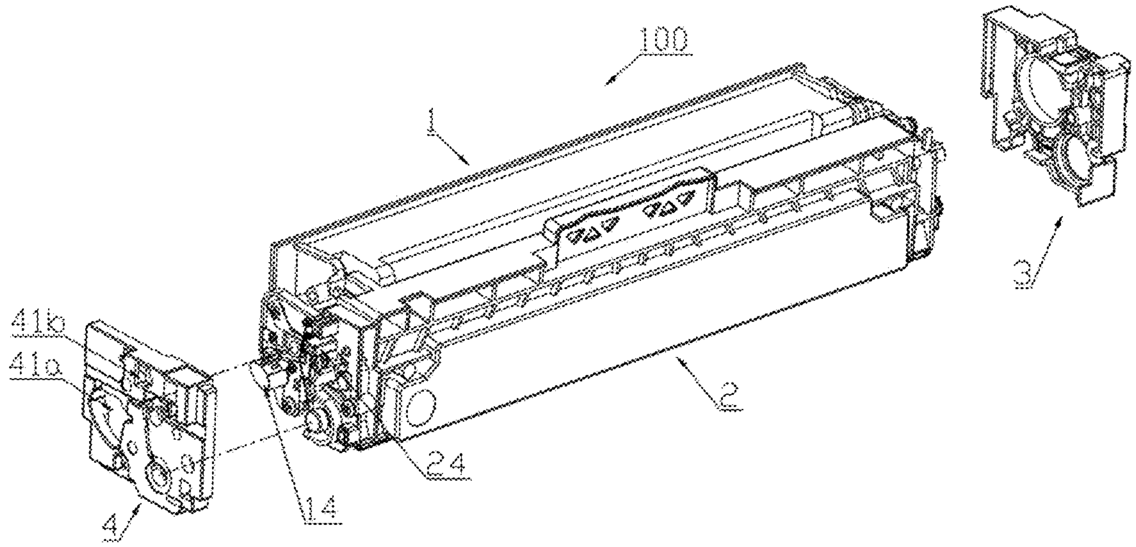
FIG. 1D is a second exploded structural view of the process cartridge according to Embodiment 1 of the present disclosure.

The image forming apparatus also includes a preventing portion disposed in its main body. Conventional process cartridges have a U-shaped groove that cooperates with this preventing portion. The U-shaped groove is on a side member. When the tray unit moves into the main body and the process cartridge moves downward with the tray, the preventing portion enters the U-shaped groove to position the process cartridge in the image forming apparatus. For example, as shown in FIG. 1B, the image forming apparatus also includes a preventing portion 53*b* disposed in its main body 2*b*. A conventional process cartridge PK, PC, PM, PY further includes a U-shaped groove 24*b* for cooperating with the preventing portion 53*b*. The U-shaped groove 24*b* is disposed on a side member 24*a*. When the tray unit 51*b* moves into the main body 2*b*, and the process cartridge PK, PC, PM, PY moves downward with the tray unit 51*b*, the preventing portion 53*b* enters the U-shaped groove 24*b* to position the process cartridge PK, PC, PM, PY in the image forming apparatus. However, this positioning configuration requires the preventing portion 53*b* and the U-shaped groove 24*b* to be precisely aligned; otherwise, the tray unit 51*b* cannot be lowered smoothly, and there is a risk of damaging the image forming apparatus or the process cartridge.

To address this, in one embodiment, the U-shaped groove 24*b* is replaced by an avoidance portion 37, as shown in FIG. 17. In the Y direction, the avoidance portion 37 is located to the rear of the chip mount 55. When the process cartridge 100 of the present disclosure is lowered with the tray to a predetermined position, the preventing portion 53 of the image forming apparatus enters the avoidance portion 37. That is, the preventing portion 53 is exposed in the Y direction. In some embodiments, the U-shaped groove 24 may be retained. However, when the process cartridge 100 of the present disclosure is lowered to the predetermined position, the avoidance portion 37 still enters the U-shaped groove 24, but regardless of the forces on the process cartridge within the image forming apparatus, the preventing portion 53 does not contact the side walls that form the U-shaped groove 24. In other words, the U-shaped groove 24 no longer functions to position the process cartridge 100 in cooperation with the preventing portion 53.

Embodiment 8

Figure 19:
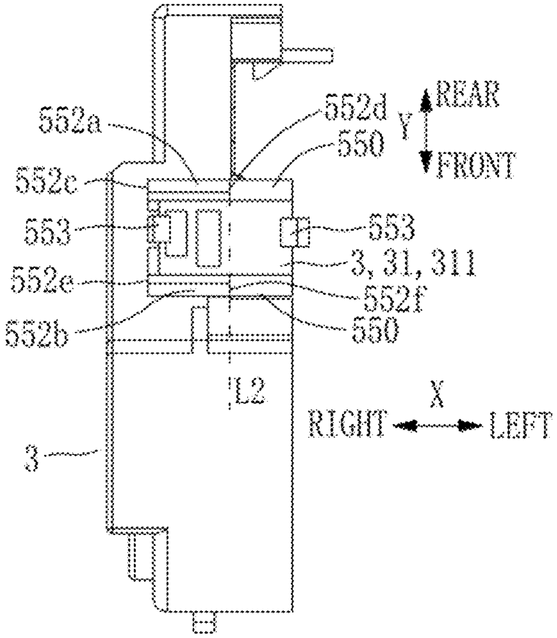
FIG. 19 is a side view of the first side member according to Embodiment 8, viewed from top to bottom along the Z-axis.

Differing from Embodiment 7, in this embodiment the first blocking portion 552*a* and the second blocking portion 552*b* are configured to overlap along the Y direction or the longitudinal X direction. Specifically, along the Y direction or the longitudinal X direction, one of the first blocking portion 552*a* and the second blocking portion 552*b* completely overlaps with the other. As shown in FIG. 19, the first blocking portion 552*a* and the second blocking portion 552*b* are disposed on opposite sides of the mounting cavity 557 in the Y direction, respectively. Along the Y direction, the first blocking portion 552*a* and the second blocking portion 552*b* overlap. A second reference line L2, parallel to the Y direction, is drawn through the leftmost point or face of the first blocking portion 552*a*. This second reference line L2 passes through the leftmost point or face of the second blocking portion 552*b*. Furthermore, along the longitudinal X direction, the dimension of the first blocking portion 552*a* does not exceed the dimension of the second blocking portion 552*b*, or the dimension of the second blocking portion 552*b* does not exceed the dimension of the first blocking portion 552*a*.

In some embodiments, the second reference line L2 may not pass through the leftmost point or face of the second blocking portion 552*b*. Overall, along the longitudinal X direction, as long as the first blocking portion 552*a* does not extend beyond the region defined by the leftmost and rightmost points or faces of the second blocking portion 552*b* in the Y direction, or vice versa, the condition is met.

Based on the above description, the configuration of the chip mount 55 in this embodiment is also simplified, and the mold for manufacturing the chip mount 55 is also easier to release.

Embodiment 9

Figure 20:
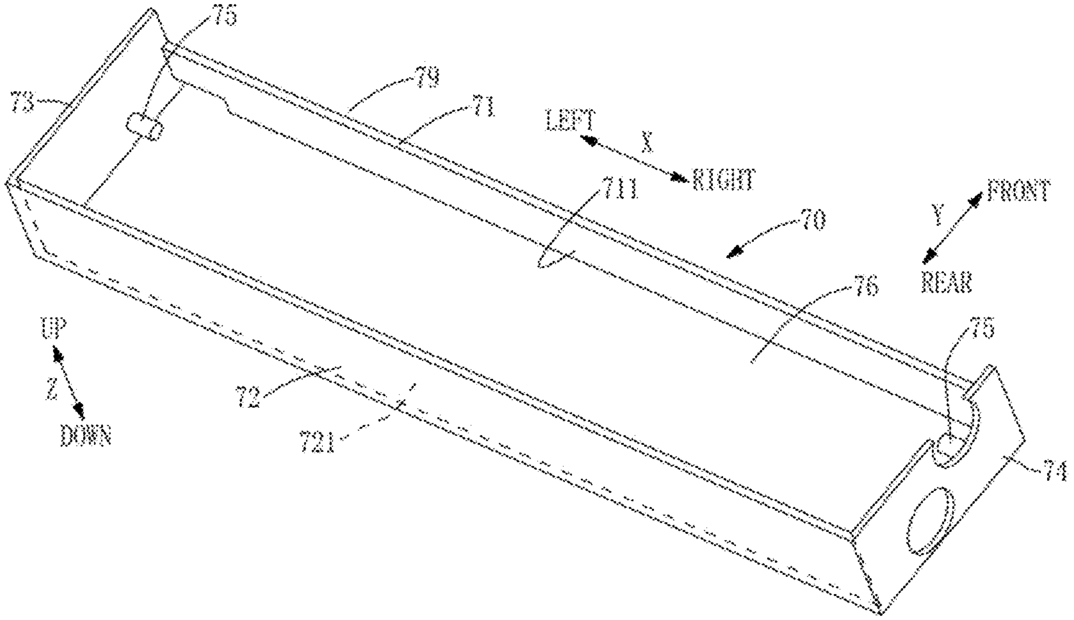
FIG. 20 is a perspective view of a tray in an image forming apparatus suitable for the process cartridge of the present disclosure.

As referenced in Chinese Patent Publication CN105929661B, the image forming apparatus is provided with a tray unit for carrying a process cartridge. The tray unit has multiple trays 70, each for accommodating one process cartridge. FIG. 20 shows the configuration of a tray 70. As shown, the tray 70 includes a tray frame 79 and a support portion 75 on the tray frame 79 for supporting the process cartridge. Specifically, the tray frame 79 includes a first side plate 71, a second side plate 72, a third side plate 73, and a fourth side plate 74. The first and second side plates 71, 72 are spaced apart from and opposite to each other in the Y direction. The third and fourth side plates 73, 74 are spaced apart from and opposite to each other in the longitudinal X direction. These four side plates enclose and form a process cartridge receiving cavity 76. In the Y direction, the first side plate 71 is located in front of the second side plate 72. The first side plate 71 has a first inner surface (front inner surface) 711 facing the receiving cavity 76, and the second side plate 72 has a second inner surface (rear inner surface) 721 facing the receiving cavity 76. The first and second inner surfaces 711, 721 are opposite to each other.

Figure 21:
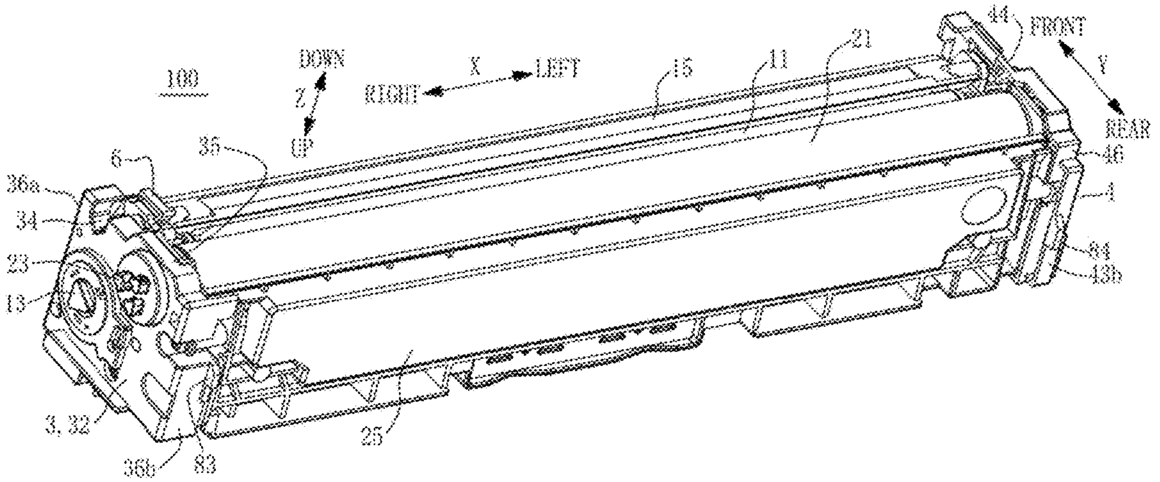
FIG. 21 and FIG. 22 are perspective views of the process cartridge according to Embodiment 9.
Figure 22:
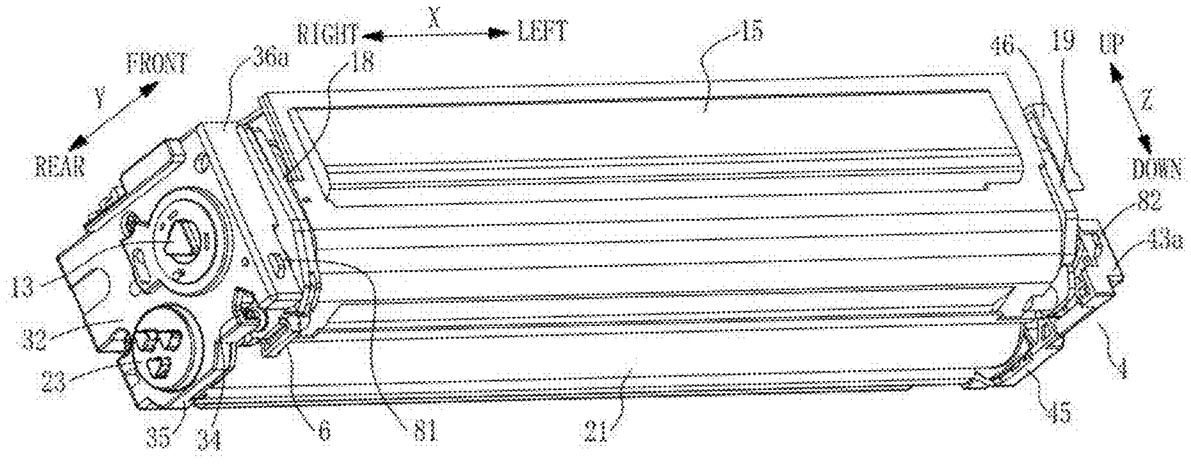

As shown in FIG. 21 and FIG. 22, the first side member 3 includes a first main body 32 and, provided on the first main body 32, a first supported portion 34 and a second supported portion 35. The first exposure portion 33*a* and the second exposure portion 33*b* are disposed on the first main body 32. The second side member 4 includes a second main body 46 and, provided on the second main body 46, a third supported portion 44 and a fourth supported portion 45. As shown in FIG. 16, the third exposure portion 41*a* and the fourth exposure portion 41*b* are disposed on the second main body 46.

When the tray unit is moved out of the main body, the first supported portion 34 and the third supported portion 44 are simultaneously supported by the support portions 75. Thus, the process cartridge 100 is supported in the mounting cavity 76. When the tray unit is moved into the main body, the second supported portion 35 and the fourth supported portion 45 are simultaneously supported by positioning portions (such as 51*a* in FIG. 1B) within the main body.

As shown in FIG. 2 and FIG. 3, when the separation force receiving member 6 receives a separation force, with the rotation of the developing unit 1, the side member or the developing unit will be subjected to a forward pushing force. At the same time, the elastically deformed resetting member 17 will apply a rearward pushing force to the second frame 25. For this reason, the process cartridge 100 also needs to be provided with a positioning member for positioning the process cartridge 100 in the mounting cavity 76. The positioning member positions the process cartridge 100 by overcoming the forward and/or rearward pushing force.

As stated above, the developing unit 1 is configured to rotate relative to the photosensitive unit 2. Preferably, the positioning member is provided on at least one of the side member and the second frame 25.

Figure 23:
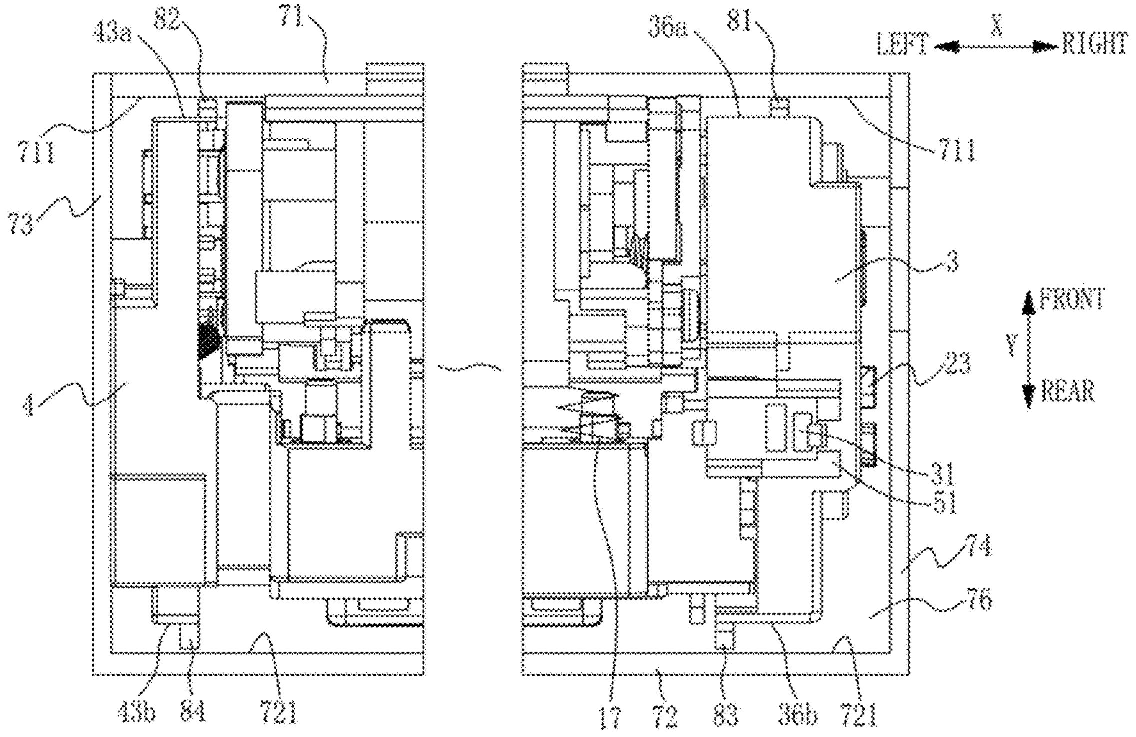
FIG. 23 is a side view of the process cartridge according to Embodiment 9 after being mounted in the tray, viewed from top to bottom along the Z-axis.

As shown in FIGS. 21-23, the positioning member in this embodiment includes a first positioning member 81 and a third positioning member 83 provided on the first side member 3, and a second positioning member 82 and a fourth positioning member 84 provided on the second side member 4. In the Y direction, the first positioning member 81 and the third positioning member 83 are spaced apart, and the second positioning member 82 and the fourth positioning member 84 are spaced apart. In the longitudinal X direction, the first positioning member 81 and the second positioning member 82 are spaced apart, and the third positioning member 83 and the fourth positioning member 84 are spaced apart.

In the Y direction, the first main body 32 has a first front surface 36*a* facing forward and a first rear surface 36*b* facing rearward. The second main body has a second front surface 43*a* facing forward and a second rear surface 43*b* facing rearward. The first positioning member 81 protrudes forward from the first front surface 36*a*, and the third positioning member 83 protrudes rearward from the first rear surface 36*b*. Preferably, each of the positioning members is formed as a protrusion. The protrusion may be either fixed or movable.

As shown in FIG. 23, after the process cartridge 100 is mounted in the process cartridge mounting cavity 76, the first positioning member 81 and the second positioning member 82 are both opposite the first inner surface 711. The third positioning member 83 and the fourth positioning member 84 are both opposite the second inner surface 721. Collectively, the first positioning member 81 and the second positioning member 82 may be referred to as the front positioning member, and the third positioning member 83 and the fourth positioning member 84 may be referred to as the rear positioning member. That is, the front positioning member includes at least one of the first positioning member 81 and the second positioning member 82, and the rear positioning member includes at least one of the third positioning member 83 and the fourth positioning member 84. Preferably, before the separation force receiving member 6 receives the separation force, the front positioning member is in contact with the first inner surface 711, or there is a gap between them to facilitate the smooth installation of the process cartridge 100. Similarly, the rear positioning member also has one of these two states with respect to the second inner surface 721.

Along the longitudinal X direction, the respective positioning members in this embodiment may abut against the tray frame 79 at both ends of the process cartridge 100, resulting in a more uniform distribution of forces on the process cartridge 100.

When the separation force receiving member 6 receives the separation force, under the effect of the aforementioned forward and rearward pushing forces, the front positioning member abuts against the first inner surface 711, and the rear positioning member abuts against the second inner surface 721. In this way, stable positioning of the second frame 25 and the side members in the process cartridge mounting cavity 76 may be achieved. Even if the developing unit 1 rotates relative to the photosensitive unit 2, the position of the process cartridge 100 in the mounting cavity 76 will not change, thus eliminating the risk of the terminal 312 disengaging from the contact pin.

In some embodiments, the respective positioning members may not necessarily be formed as protrusions but may be formed by increasing the dimension of the side members in the Y direction. In this case, the entire first front surface 36*a* may be considered the first positioning member 81, the entire first rear surface 36*b* may be considered the third positioning member 83, the entire second front surface 43*a* may be considered the second positioning member 82, and the entire second rear surface 43*b* may be considered the fourth positioning member 84.

In some embodiments, the process cartridge 100 also includes a bracket or side plate between the first frame 15 or second frame 25 and the side member. The bracket or side plate is configured for supporting rotatable components (such as the photosensitive member 21, charging member 22, developing member 11, toner supplying member 12, first driving member 13, second driving member 23, etc.) in the process cartridge. Based on the inventive concept of the present disclosure, the positioning member may also be provided on the bracket or side plate. Generally, the bracket or side plate is fixedly connected to the second frame 25, and thus the bracket or side plate may also be considered a part of the photosensitive unit 2 or second frame 25.

Embodiment 10

Figure 24:
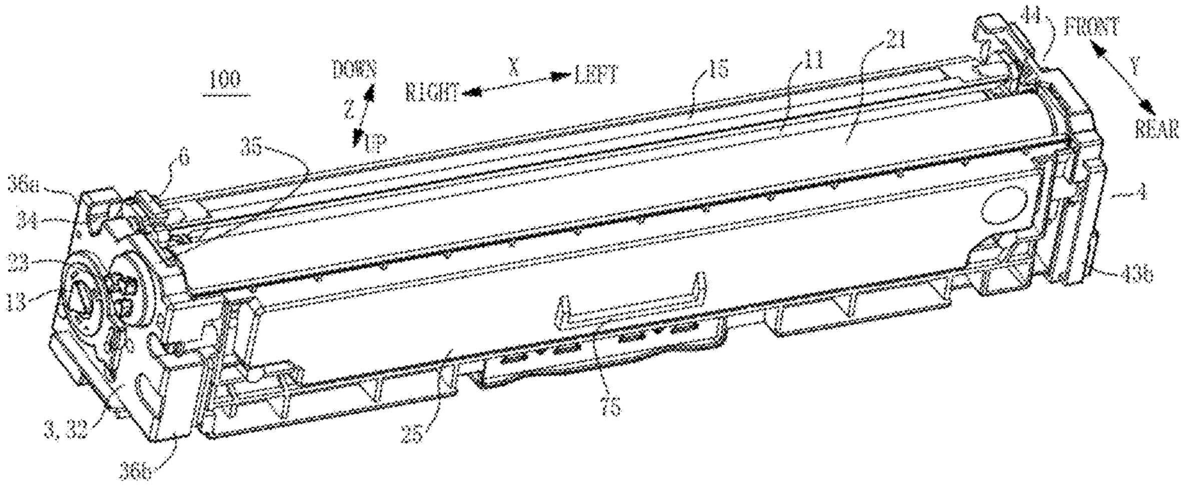
FIG. 24 is a perspective view of the process cartridge according to Embodiment 10.
Figure 25:
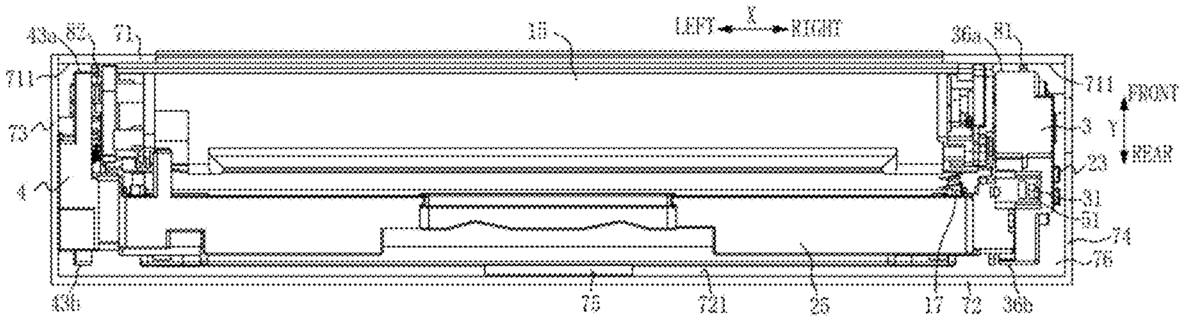
FIG. 25 is a side view of the process cartridge according to Embodiment 10 after being mounted in the tray, viewed from top to bottom along the Z-axis.
Figure 26A:
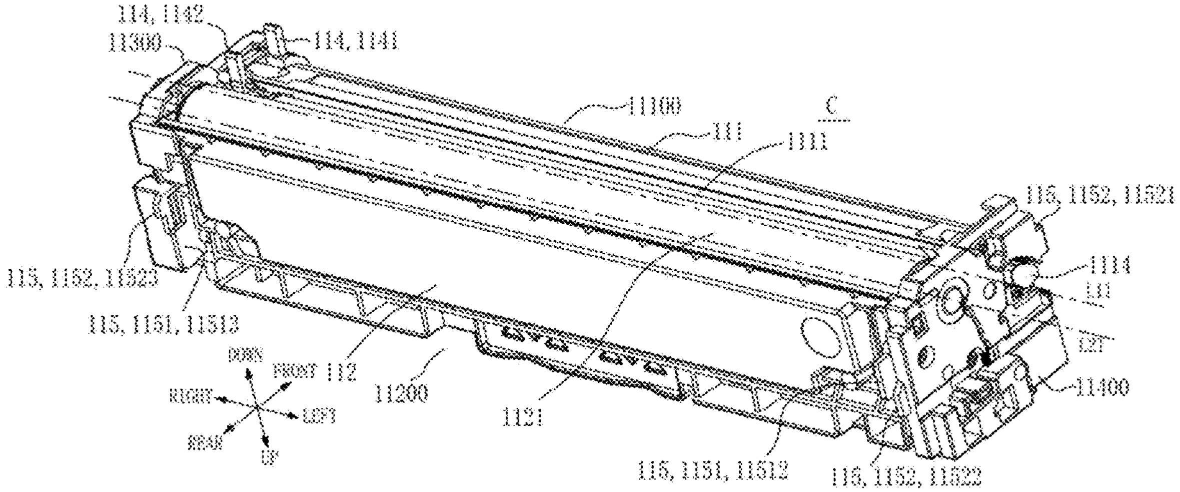
FIG. 26A and FIG. 26B are perspective views of the process cartridge according to Embodiment 11.
Figure 26B:
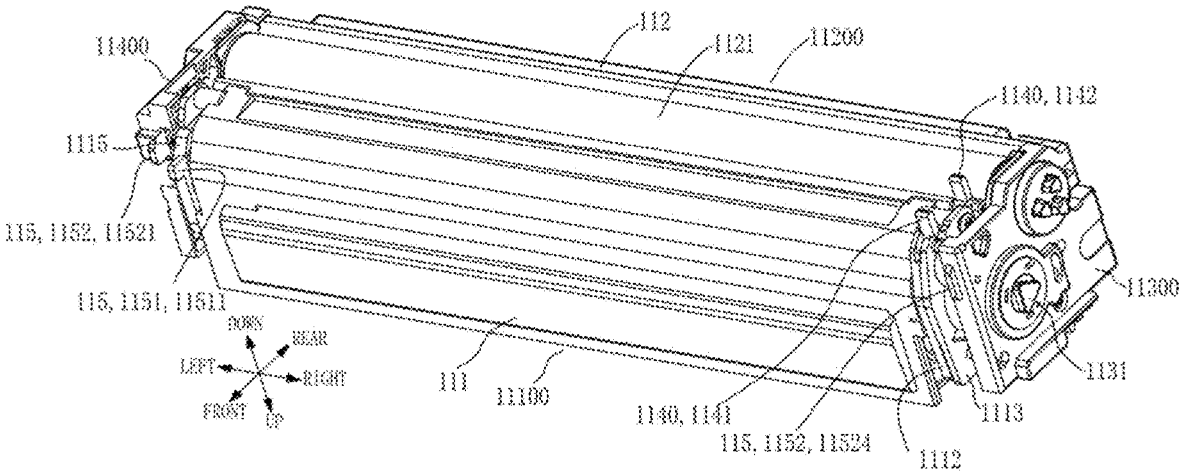

As shown in FIG. 24 and FIG. 25, the rear positioning member in this embodiment is a protrusion 75 provided on the second frame 25, while the front positioning members 81 and 82 are still provided on the side members.

In some embodiments, along the longitudinal X direction, the protrusion 75 is located approximately in the middle of the second frame 25. The first positioning member 81, the second positioning member 82, and the protrusion 75 are arranged in a triangle. When the separation force receiving member 6 receives the separation force, this can ensure stable positioning of the process cartridge 100. That is, the line connecting the first positioning member 81, the second positioning member 82, and the protrusion 75 forms a triangle.

In some embodiments, along the longitudinal X direction, two protrusions 75 may be provided, spaced apart from each other, which can also achieve stable positioning of the process cartridge 100.

Embodiment 11

As shown in FIGS. 26A-27A, the developing roller (developing member) 1111 rotates about a first rotation axis L11, and the photosensitive drum (photosensitive member) 1121 rotates about a second rotation axis L21. The first rotation axis L11 and the second rotation axis L21 are parallel to each other. A first drive force receiving member (first driving member) 1131 transmits a driving force to the developing roller (developing member) 1111 via a drive force transmission assembly 1118. The process cartridge C also includes a first bracket 1112 and a cover 1113 on the driving side. Both the first bracket 1112 and the cover 1113 are fixedly connected to the first unit housing (first frame) 111. At least a part of the drive force transmission assembly 1118 is supported by the first bracket 1112. Therefore, the first bracket 1112 may also be referred to as a drive bracket. The cover 1113 includes a cover body 11131 and an extension 11132 connected to the cover body 11131. A part of the first drive force receiving member (first driving member) 1131 passes through the cover 1113.

Figure 28:
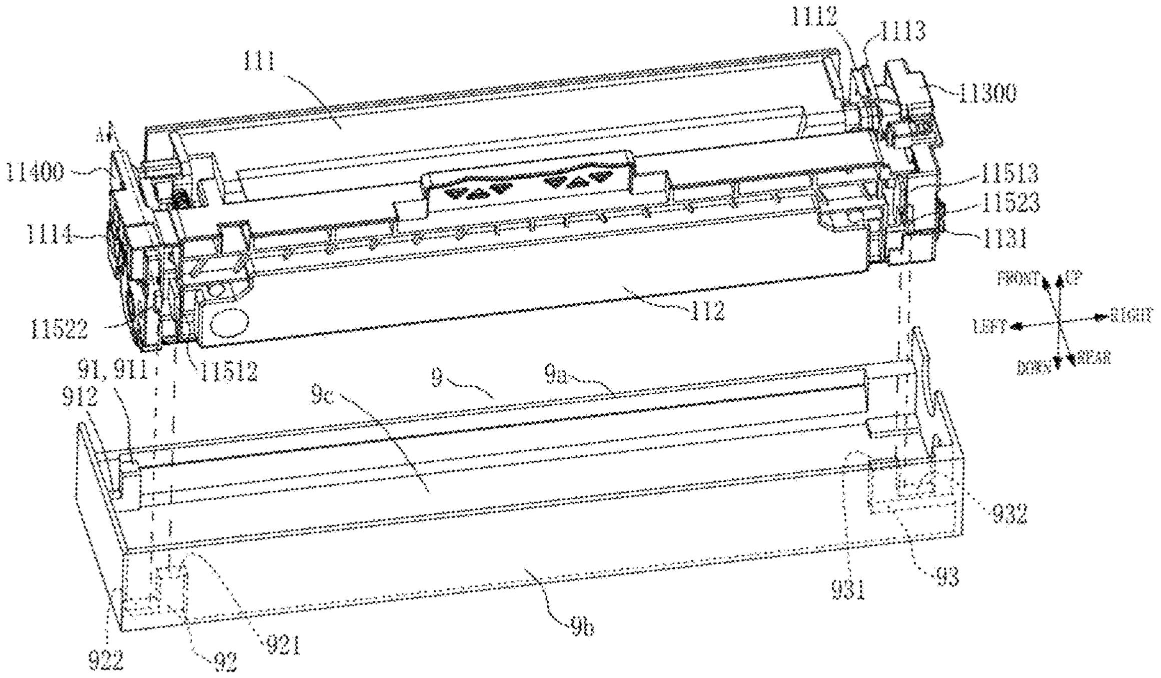
FIG. 28 is a view of the process cartridge according to Embodiment 11 before being mounted into the tray of the image forming apparatus.
Figure 29A:
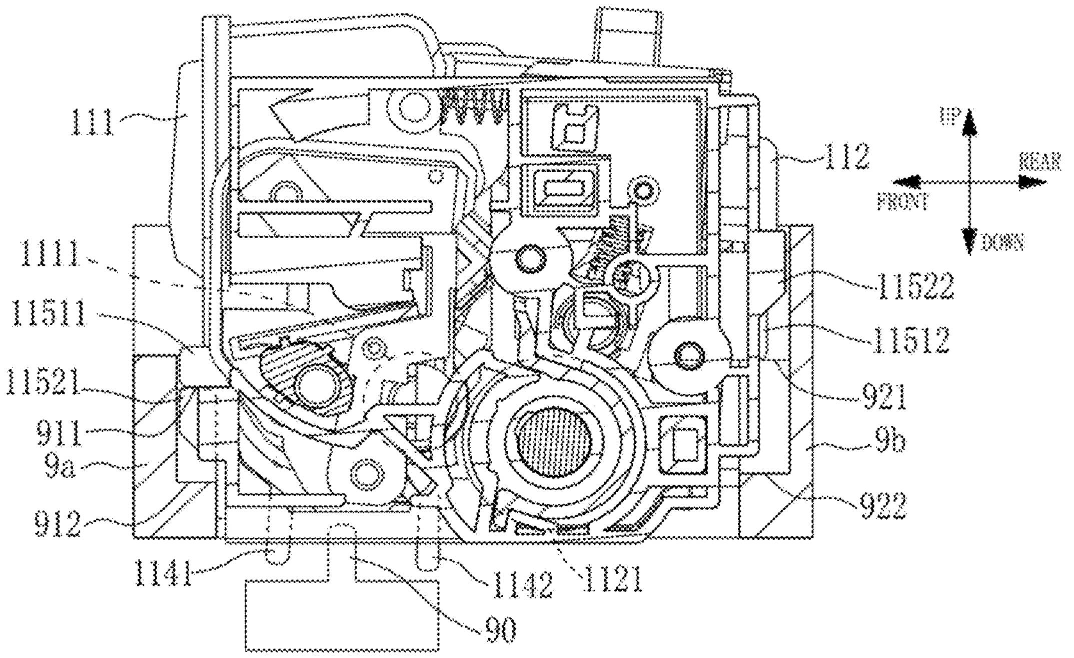
FIG. 29A is a cross-sectional view taken along the line AA in FIG. 28, viewed from left to right, showing the developing roller and photosensitive drum of the process cartridge according to Embodiment 11 in a mutually contacting state.
Figure 29B:
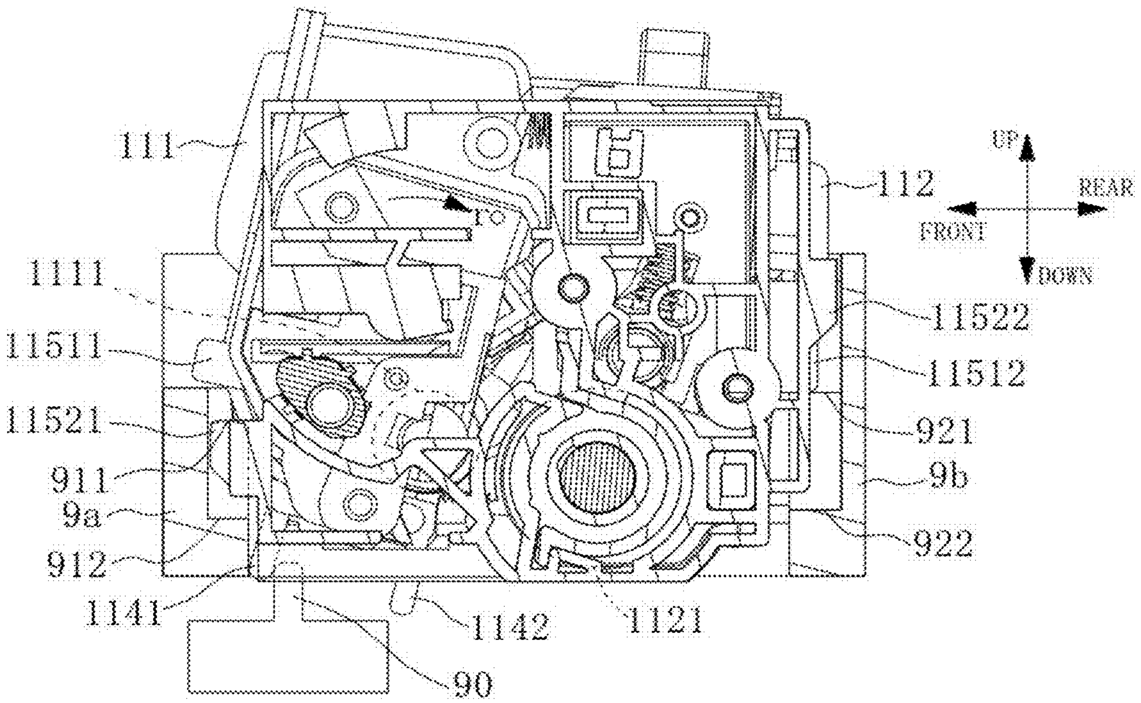
FIG. 29B is a cross-sectional view taken along the line AA in FIG. 28, viewed from left to right, showing the developing roller and photosensitive drum of the process cartridge according to Embodiment 11 in a mutually separated state.

As shown in FIG. 28, FIG. 29A, and FIG. 29B, the process cartridge C may be detachably mounted in a tray 9 of an image forming apparatus, and then the process cartridge C is installed forward along with the tray 9. The tray 9 includes a first side plate 9*a* and a second side plate 9*b* spaced apart in the front-rear direction, forming a process cartridge receiving cavity 9*c* between them.

Further, the tray 9 further includes a support mechanism for supporting the process cartridge C. The support mechanism includes at least a first support member 91, a second support member 92, and a third support member 93. Among these three support members, one is disposed on the first side plate 9*a* or the second side plate 9*b*, and the other two are disposed on the second side plate 9*b* or the first side plate 9*a*. Specifically, the first support member 91 is on the first side plate 9*a*, and the second support member 92 and the third support member 93 are on the second side plate 9*b*. The first support member 91 and the second support member 92 are spaced apart from and opposite to each other in the front-rear direction. The second support member 92 and the third support member 93 are spaced apart from and opposite to each other in the left-right direction. That is, in a plane including the front-rear and left-right directions, the tray 9 is provided with at least three mutually spaced support members, so that three corners of the process cartridge C may be supported.

In some embodiments, the first support member 91 and the third support member 93 may also be spaced apart in the front-rear direction.

Each support member has two support stands of different heights in the up-down direction. As shown in FIG. 28, the first support member 91 has a first high support stand 911 and a first low support stand 912. The second support member 92 has a second high support stand 921 and a second low support stand 922. The third support member 93 has a third high support stand 931 and a third low support stand 932.

Further, the process cartridge C further includes an abutment mechanism 115 for abutting against the tray 9 to ensure that the cartridge C is stably mounted in the tray 9. At least a part of the abutment mechanism 115 abuts against the tray 9.

Continuing with FIGS. 26A, 26B, 27A, 27B, 28, 29A, and 29B, the process cartridge C includes a first end cap (first side member) 11300 and a second end cap (second side member) 11400 disposed at the two ends of the first unit housing (first frame) 111. The abutment mechanism 115 includes a supported assembly 1151 and an abutting assembly 1152. The supported assembly 1151 is not provided on the first end cap 11300 and the second end cap 11400. The abutting assembly 1152 is provided on the first end cap 11300 and the second end cap 11400. When the process cartridge C is mounted in the tray 9, the supported assembly 1151 abuts against the support mechanism. Specifically, the abutting assembly 1152 also abuts against the tray 9. That is, among the supported assembly 1151 and the abutting assembly 1152, the abutment mechanism 115 is provided with at least the supported assembly 1151.

The supported assembly 1151 includes at least a first supported member 11511, a second supported member 11512, and a third supported member 11513. The first supported member 11511 is configured to abut against the first support member 91 (specifically, the first high support stand 911). The second supported member 11512 is configured to abut against the second support member 92 (specifically, the second high support stand 921). The third supported member 11513 is configured to abut against the third support member 93 (specifically, the third high support stand 931). In this way, the process cartridge C may be stably supported in the tray 9.

When the process cartridge C is mounted in the tray 9, the bottom of the process cartridge C is also supported by the bottom of the tray 9. When each supported member abuts against the corresponding high support stand of the support member, it is more conducive to ensuring the stable mounting of the process cartridge C in the tray 9.

Figure 27A:
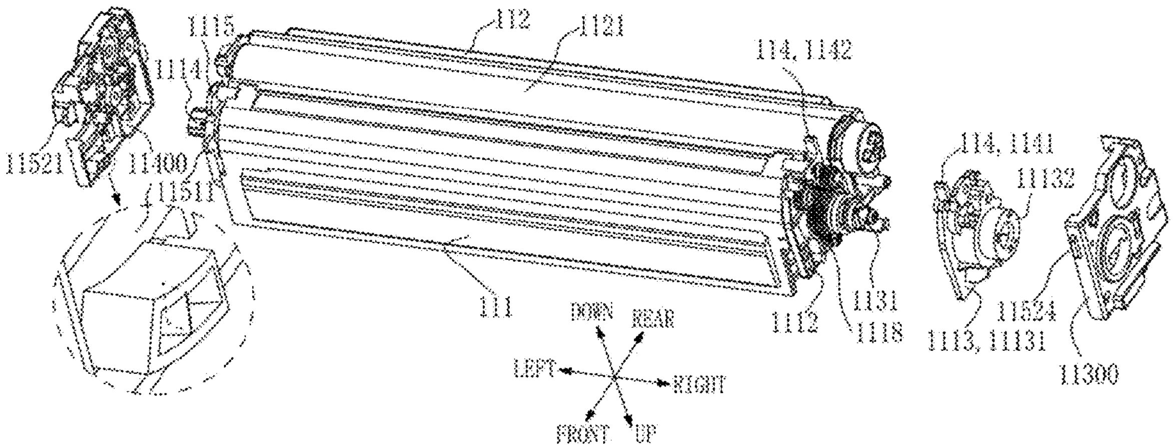
FIG. 27A is a partial exploded view of the process cartridge according to Embodiment 11.
Figure 27B:
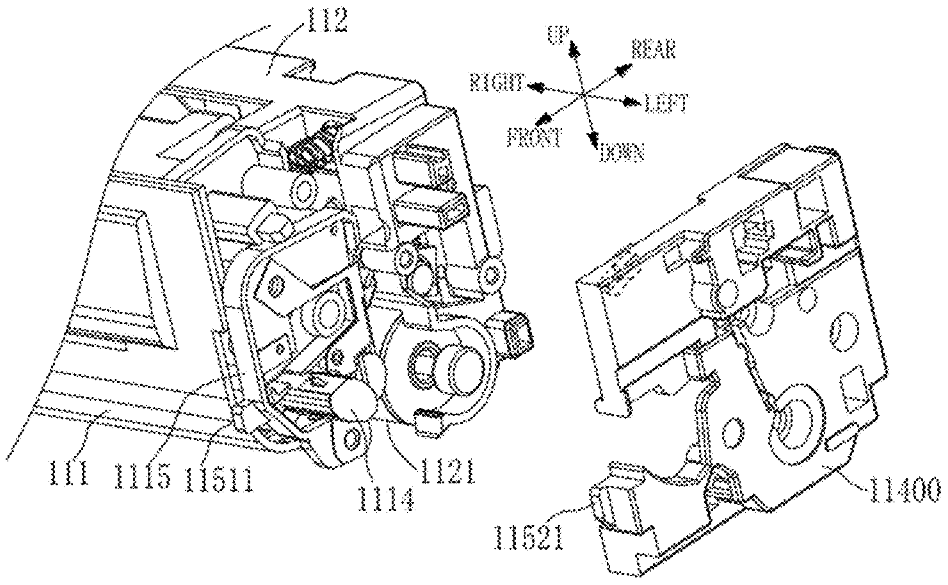
FIG. 27B is a perspective view of the second end cap and the first unit housing after separation in the process cartridge according to Embodiment 11.

Further, since the supported assembly 1151 is not provided on the first end cap 11300 and the second end cap 11400, the size of the first end cap 11300 and the second end cap 11400 may be reduced, which contributes to the miniaturization of the process cartridge C. Specifically, as shown in FIG. 27B, the process cartridge C includes a conductive member (first conductive member) 1114 on the non-driving side (second end) and a second bracket 1115 for supporting the conductive member 1114. The conductive member 1114 is configured for receiving electrical power from the image forming apparatus and supplying it directly or indirectly to the developing roller 1111. Therefore, the second bracket 1115 may also be called a conductive bracket. The first supported member 11511 is provided on the second bracket 1115 or the first unit housing (first frame) 111. The second supported member 11512 and the third supported member 11513 are both provided on the second unit housing (second frame) 112. In the front-rear direction, the first supported member 11511 and the second supported member 11512 are spaced apart. In the left-right direction, the second supported member 11512 and the third supported member 11513 are spaced apart.

In some embodiments, the first supported member 11511 may also be provided on any one of the first bracket 1112, the cover 1113, and the first unit housing (first frame) 111. The second supported member 11512 and the third supported member 11513 are still provided on the second unit housing (second frame) 112. In the front-rear direction, the first supported member 11511 and the third supported member 11513 are spaced apart. In the left-right direction, the second supported member 11512 and the third supported member 11513 are spaced apart.

As shown in FIG. 28, FIG. 29A, and FIG. 29B, the sectioning direction AA in FIG. 28 is parallel to a plane including the front-rear and up-down directions. When the process cartridge C is performing development in the image forming apparatus, the developing roller 1111 and the photosensitive drum 1121 are in mutual contact. A force-applying member 90 is disposed between a first force receiving member 1141 and a second force receiving member 1142 of a separation mechanism 114. The first supported member 11511 is supported by the first high support stand 911, the second supported member 11512 is supported by the second high support stand 921, and the third supported member 11513 is supported by the third high support stand 931 (not shown in the figure).

In some embodiments, when the process cartridge C is mounted in the tray 9, the abutting assembly 1152 also abuts against the side plates 9*a*, 9*b* of the tray 9 to restrict the movement of the process cartridge C in the front-rear direction. Especially when the force-applying member 90 applies a separation force or a restoring force to the separation mechanism 114, the first unit housing (first frame) 111 will be subjected to the effect of the separation force or restoring force, thereby driving the entire process cartridge C to move in the front-rear direction. When the abutting assembly 1152 is provided, the possible movement of the process cartridge C in the front-rear direction may be eliminated, thus allowing the process cartridge C to always be stably positioned in the tray 9 and process cartridge receiving cavity 9*c*.

As stated above, the abutting assembly 1152 is provided on the first end cap (first side member) 11300 and the second end cap (second side member) 11400. Specifically, the abutting assembly 1152 includes a first abutting member (second positioning member) 11521 and a second abutting member (fourth positioning member) 11522 provided on the second end cap 11400, and a third abutting member (third positioning member) 11523 and a fourth abutting member (first positioning member) 11524 provided on the first end cap 11300. In the front-rear direction, the first abutting member 11521 and the second abutting member 11522 are spaced apart, and the third abutting member 11523 and the fourth abutting member 11524 are spaced apart. The first abutting member 11521 and the fourth abutting member 11524 are for abutting against the first side plate 9*a*. The second abutting member 11522 and the third abutting member 11523 are for abutting against the second side plate 9*b*. In this way, when the first unit housing (first frame) 111 receives the separation force or restoring force and rotates relative to the second unit housing (second frame) 112, the process cartridge C as a whole can remain stably positioned in the tray 9 and process cartridge receiving cavity 9*c* through the abutment of the first abutting member 11521 and the fourth abutting member 11524 with the first side plate 9*a*, and the abutment of the second abutting member 11522 and the third abutting member 11523 with the second side plate 9*b*. That is, the process cartridge C as a whole can remain stationary relative to the tray 9 and process cartridge receiving cavity 9*c*.

In some embodiments, the abutting assembly 1152 may not be necessary. Instead, the supported assembly 1151 is configured such that, in the front-rear direction, the maximum distance between two oppositely arranged supported members is equal to the distance between the corresponding locations in the process cartridge receiving cavity 9*c* where those two supported members are located. By the mutual abutment of the supported members with the inner walls of the receiving cavity 9*c* (the inner wall of the first side plate 9*a* and the inner wall of the second side plate 9*b*), the movement of the process cartridge C in the front-rear direction can also be prevented.

In some embodiments, the supported member abuts only against the inner wall of the second side plate 9*b*. When the force-applying member 90 applies a separation force to the separation mechanism 114, the supported member abuts against the inner wall of the second side plate 9*b*, which can also prevent the movement of the process cartridge C in the front-rear direction.

In some embodiments, the abutting assembly 1152 may also be elastic.

According to the above embodiments, the maximum distance between the two oppositely arranged supported members may also be greater than the distance between the corresponding locations in the process cartridge receiving cavity 9*c* where those two supported members are located, but at least one of the two supported members is configured to be elastic. Ultimately, the movement of the process cartridge C in the front-rear direction can also be suppressed.

Embodiment 12

Figure 30:
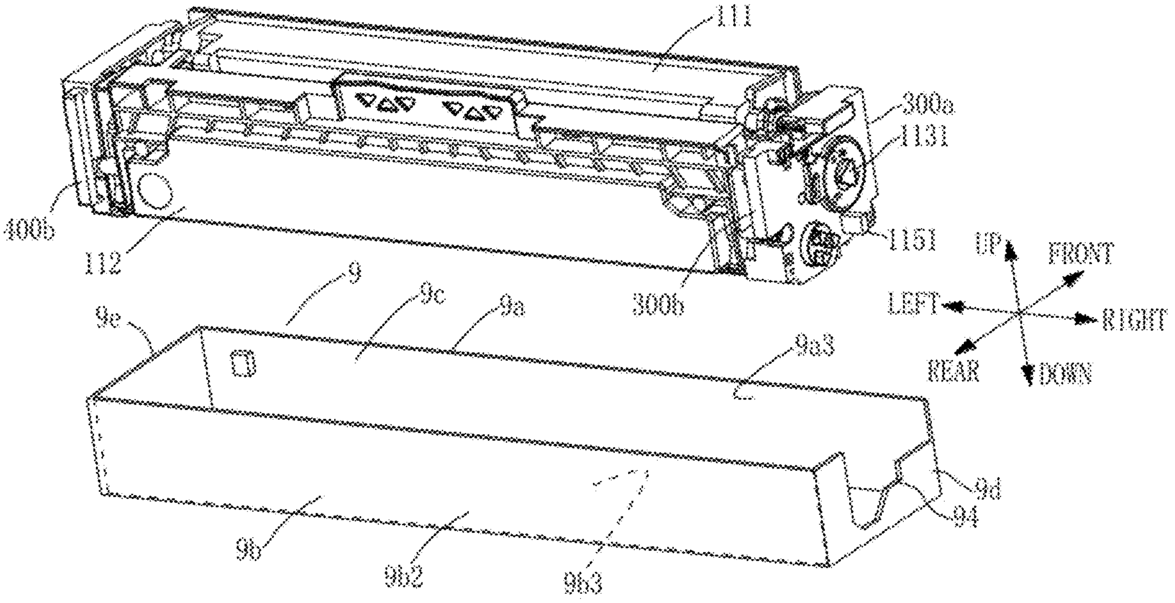
FIG. 30 is a perspective view of the process cartridge and tray after separation according to Embodiment 12.
Figure 31:
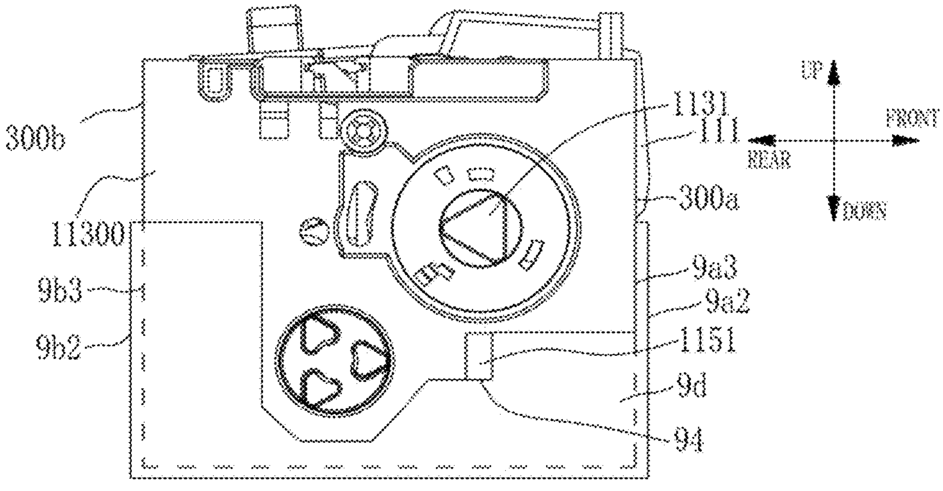
FIG. 31 is a side view of the process cartridge according to Embodiment 12, viewed from the driving end along the left-right direction.

FIG. 30 is a perspective view of the process cartridge and tray after separation according to Embodiment 12 of the present disclosure. FIG. 31 is a side view of the process cartridge according to Embodiment 12, viewed from the driving end along the left-right direction.

This embodiment further optimizes the abutment mechanism 115 based on the inventive concept of Embodiment 11.

As shown in FIG. 30, the support mechanism in this embodiment is a support stand 94 provided on at least one of a third side plate 9*d* and a fourth side plate 9*e*. Accordingly, the supported assembly 1151 is a protrusion capable of being supported by the support stand 94. Specifically, the protrusion 1151 is disposed on one of the first unit housing 111, the first bracket 1112, the cover 1113, the first end cap 11300, the second bracket 1115, the second unit housing 112, and other components of the process cartridge C, as long as the process cartridge C may be supported through the cooperation of the protrusion 1151 and the support stand 94.

In this embodiment, the abutting assembly 1152 is still provided on the first end cap 11300 and the second end cap 11400. Different from the previous embodiment, in this embodiment, the first abutting member (second positioning member) and the second abutting member (fourth positioning member) 11522 are the front end face (second front surface) and the rear end face (second rear surface) 400*b* of the second end cap 11400, respectively. The fourth abutting member (first positioning member) 11524 and the third abutting member (third positioning member) 11523 are the front end face (first front surface) 300*a* and the rear end face (first rear surface) 300*b* of the first end cap 11300, respectively. When the process cartridge C is mounted in the tray 9, in the up-down direction, the protrusion 1151 is supported by the support stand 94. In the front-rear direction, the first abutting member (second positioning member) and the fourth abutting member (first positioning member) 11524 both abut against the inner surface 9*a*3 of the first side plate, and they have an interference fit with the inner surface 9*a*3 of the first side plate. The second abutting member (fourth positioning member) 11522 and the third abutting member (third positioning member) 11523 both abut against the inner surface 9*b*3 of the second side plate, and they have an interference fit with the inner surface 9*b*3 of the second side plate. Consequently, the process cartridge C is stably positioned in the process cartridge receiving cavity 9*c*, and its possible rotation is suppressed.

The inner surface 9*a*3 of the first side plate and the outer surface 9*a*2 of the first side plate are opposite to each other in the front-rear direction. The inner surface 9*a*3 of the first side plate faces the process cartridge receiving cavity 9*c*, and the outer surface 9*a*2 of the first side plate faces away from the process cartridge receiving cavity 9*c*. The inner surface 9*b*3 of the second side plate and the outer surface 9*b*2 of the second side plate are opposite to each other in the front-rear direction. The inner surface 9*b*3 of the second side plate faces the process cartridge receiving cavity 9*c*, and the outer surface 9*b*2 of the second side plate faces away from the process cartridge receiving cavity 9*c*.

When the door of the image forming apparatus is closed and it is ready for development, the tray 9 will move downward, and the protrusion 1151 will no longer be supported by the support stand 94. However, because the first abutting member (second positioning member), the second abutting member (fourth positioning member) 11522, the third abutting member (third positioning member) 11523, and the fourth abutting member (first positioning member) 11524 respectively abut against the corresponding inner surfaces of the side plates, the process cartridge C can still be positioned in the process cartridge receiving cavity 9*c*, and its possible rotation can still be suppressed.

Embodiment 13

Figure 32:
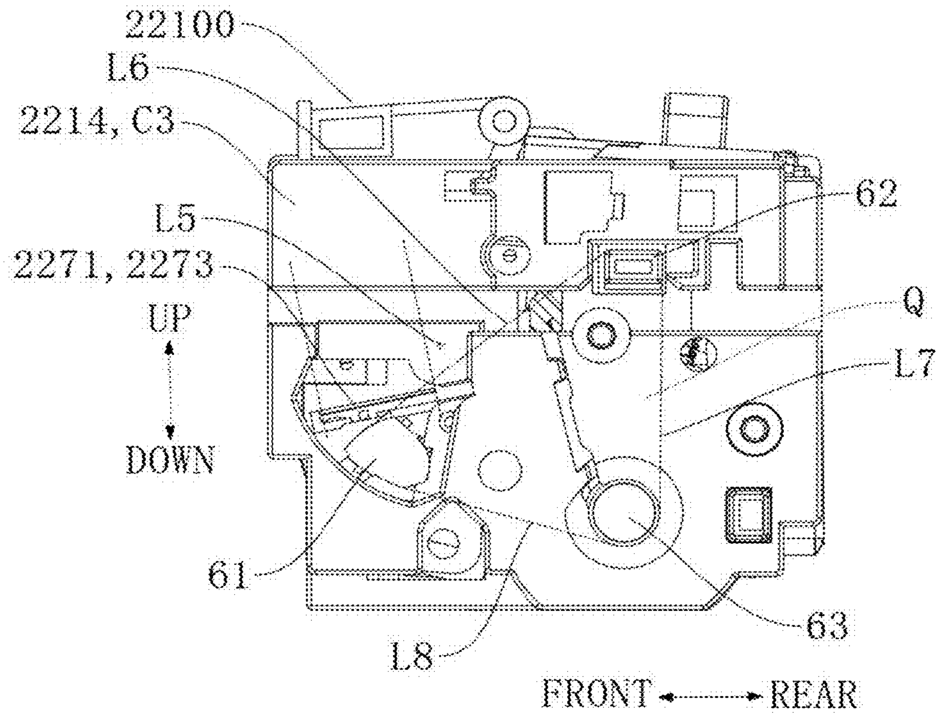
FIG. 32 is a schematic structural view of the process cartridge according to Embodiment 13.
Figure 33:
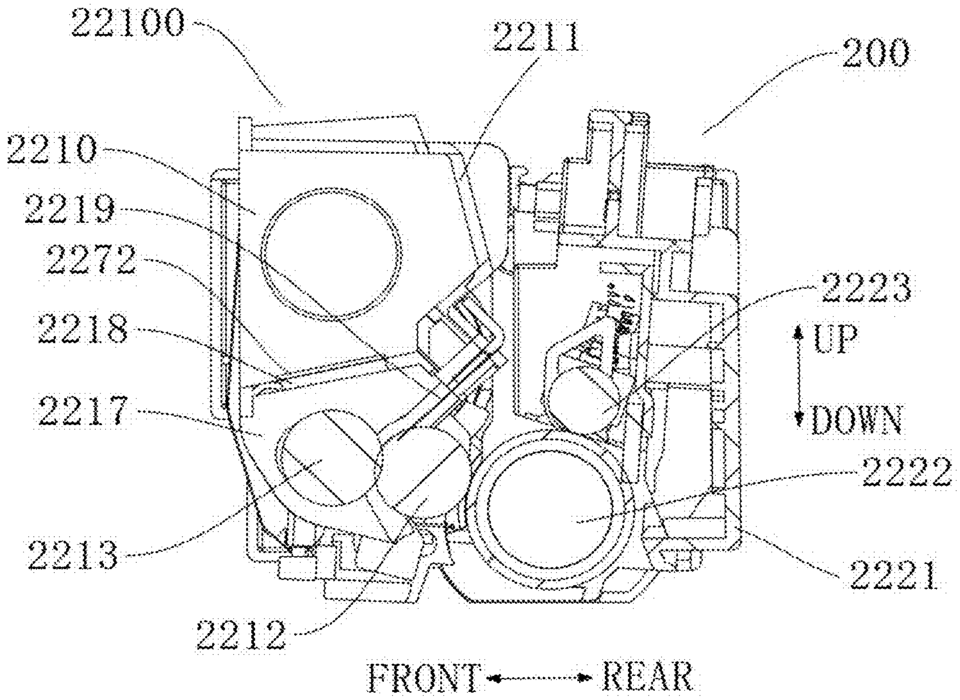
FIG. 33 is a cross-sectional view of the process cartridge according to Embodiment 13.

As shown in FIG. 32 and FIG. 33, the process cartridge C includes a developing unit 22100 and a photosensitive unit

200 connected by an end cap (side member) 2214. The developing unit 22100 can rotate relative to the photosensitive unit 200 about a developing rotation axis L5. The end cap (side member) 2214 includes a first side member at the driving end of the photosensitive unit 200 and a second side member C3 at the non-driving end of the photosensitive unit 200. The first side member and/or the second side member C3 may be integrally formed with the photosensitive housing (second frame) 2221 or may be formed as separate parts. The non-driving side of the process cartridge C further includes a plurality of exposed electrode contacts 61, 62, 63. The plurality of electrode contacts 61, 62, 63 pass through the second side member C3 and are exposed to the outside.

The electrode contacts 61, 62, 63 include at least one of a developing electrode contact 61, a charging electrode contact 62, and a ground electrode contact 63. The plurality of electrode contacts 61, 62, 63 may be formed from metal sheets or conductive resin. The developing electrode contact 61 and the charging electrode contact 62 are configured to respectively contact the image forming apparatus and receive electrical power from it. The ground electrode contact 63 is configured for electrical connection with a ground portion of the image forming apparatus. The charging electrode contact 62 is electrically connected to a charging roller (charging member) 2223. The ground electrode contact 63 is electrically connected to a photosensitive drum (photosensitive member) 2222. There is at least one developing electrode contact 61. When there is one developing electrode contact 61, it is electrically connected to at least one of the developing roller (developing member) 2212, the toner supplying roller (toner supplying member) 2213, and the developing blade 2219. When there are two developing electrode contacts 61, one is electrically connected to the developing roller 2212, and the other is electrically connected to the toner supplying roller 2213 and the developing blade 2219. When there are three developing electrode contacts 61, they are respectively connected to the developing roller 2212, the toner supplying roller 2213, and the developing blade 2219.

As shown in FIG. 32, when projected onto a plane perpendicular to the rotation axis L5, the outlines of the plurality of electrode contacts 61, 62, 63 and the straight lines connecting them form a polygon Q with the largest area. The rotation axis L5 does not pass through this area Q. In other words, the rotation axis L5 of the developing unit 22100 is located outside of the polygon Q having a largest area that can be formed by connecting the plurality of electrode contacts. Specifically, the line connecting the developing electrode contact 61 and the charging electrode contact 62 is a first straight line L6. The line connecting the charging electrode contact 62 and the ground electrode contact 63 is a second straight line L7. The line connecting the ground electrode contact 63 and the developing electrode contact 61 is a third straight line L8. The area Q is the largest area enclosed by the developing electrode contact 61, the first straight line L6, the charging electrode contact 62, the second straight line L7, the ground electrode contact 63, and the third straight line L8. In this embodiment, the rotation axis L5 does not pass through the area Q, which is advantageous for the arrangement of the multiple electrode contacts of the process cartridge and reduces the interference of cartridge movement on the electrical connections.

In some embodiments, the developing unit 22100 includes a developing housing (first frame) 2211 and a sealing member 2271. A toner storage chamber 2210 for storing toner is formed in the developing housing 2211. A developing chamber 2217 is formed below the toner storage chamber 2210. A toner supply opening 2218 is provided between the toner storage chamber 2210 and the developing chamber 2217. A rotatably supported toner supplying roller 2213 and developing roller 2212 are disposed within the developing chamber 2217.

The sealing member 2271 includes a sealing portion 2272 and a pull tab 2273. The sealing portion 2272 seals the toner supply opening 2218. The pull tab 2273 is exposed at the non-driving end of the developing housing 2211. By pulling the pull tab 2273 in the axial direction of the developing roller 2212, the sealing member 2271 may be removed from the process cartridge C. In other words, pulling the pull tab 2273 can remove the sealing portion 2272 that seals the toner supply opening 2218. Viewed in a direction perpendicular to the surface of the sealing member 2271, the developing rotation axis L5 is located outside of the width dimension of the sealing member 2271 defined in the direction perpendicular to the developing rotation axis L5. In other words, viewed in a direction perpendicular to the surface of the sealing portion 2272, the developing rotation axis L5 is located outside of the width dimension of the sealing portion 2272 defined in the direction perpendicular to the developing rotation axis L5. By designing the toner supply opening 2218 to be far from the developing rotation axis L5, when the developing unit swings, the swing amplitude of the toner supply opening 2218 increases, causing greater agitation of the toner in the toner storage chamber 2210, which facilitates its entry into the developing chamber 2217 from the toner supply opening 2218, thus ensuring sufficient toner supply.

Embodiment 14

Figure 34:
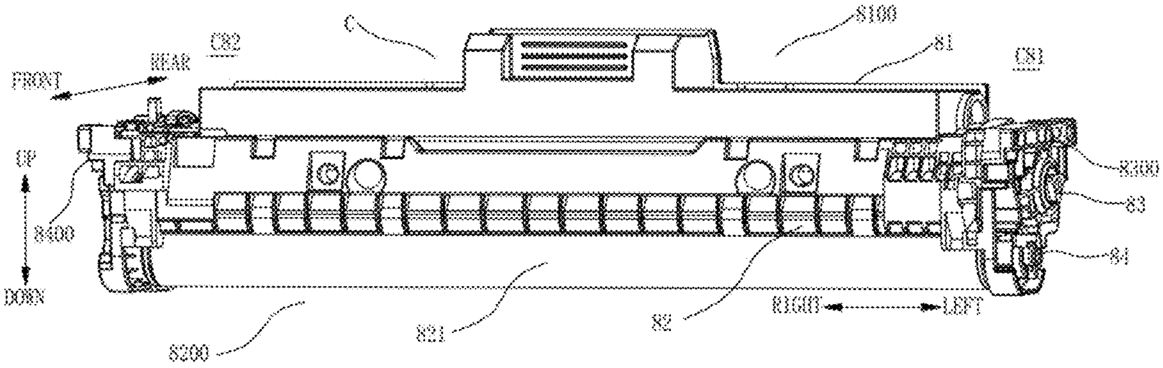
FIG. 34 is a perspective view of the process cartridge according to Embodiment 14.
Figure 35:
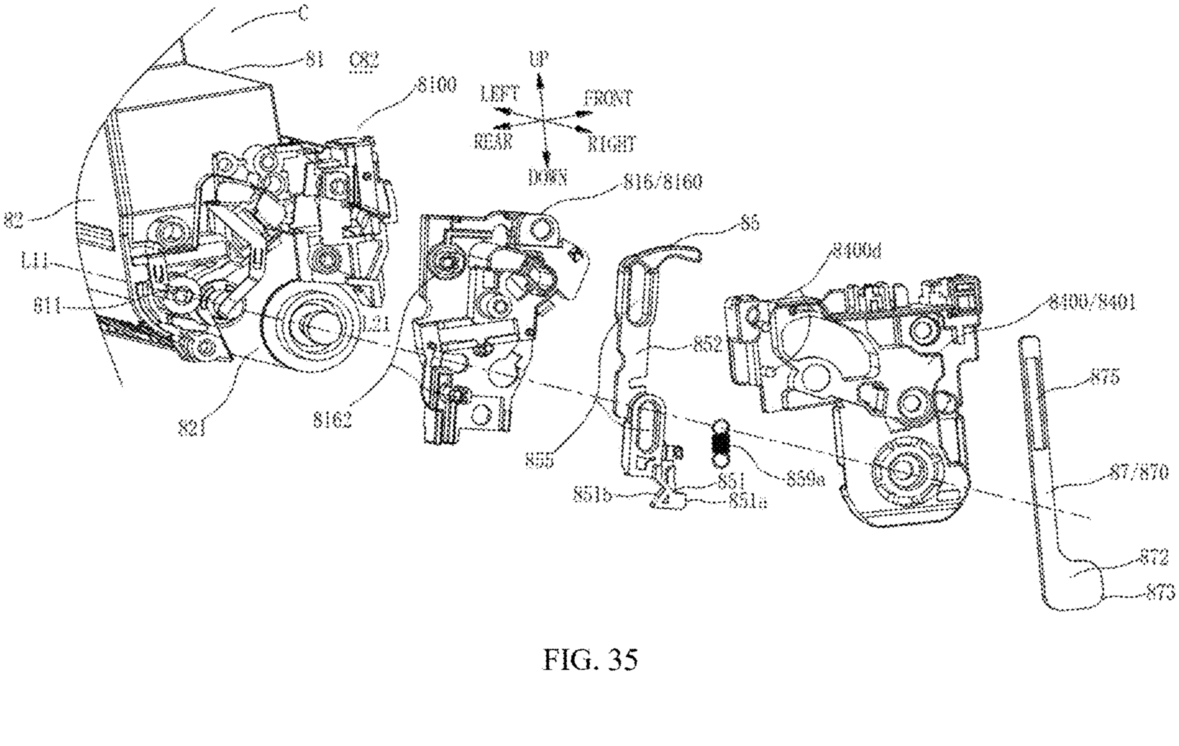
FIG. 35 is a partial exploded view of the non-driving end of the process cartridge according to Embodiment 14.

As shown in FIG. 34 and FIG. 35, the process cartridge C includes a mutually coupled first unit (developing unit) 8100 and a second unit (photosensitive unit) 8200. The first unit 8100 includes a first unit housing (first frame) 81 and a developing roller (developing member) 811 rotatably mounted in the first unit housing 81. The developing roller 811 is configured for carrying toner stored in the first unit housing 81. The second unit 8200 includes a second unit housing (second frame) 82 and a photosensitive drum (photosensitive member) 821 rotatably mounted in the second unit housing 82. The developing roller 811 supplies toner to the photosensitive drum 821 to develop the electrostatic latent image formed on the surface of the photosensitive drum 821.

To make the following description clearer, the extension direction of the rotation axis L11 of the developing roller 811 is defined as the left-right direction. The arrangement direction of the first unit 8100 and the second unit 8200 is the front-rear direction. The direction from the first unit 8100 toward the second unit 8200 is the front direction, and the opposite is the rear direction. The side of the process cartridge C where the developing roller 811 is mounted is the lower side, and the opposite is the upper side. The rotation axis L21 of the photosensitive drum 821 extends parallel to the left-right direction.

As shown in FIG. 34, the process cartridge C also includes a first drive force receiving member (first driving member) 83 and a second drive force receiving member (second driving member) 84 for receiving rotational driving force output from the image forming apparatus. The first drive force receiving member 83 directly or indirectly drives the rotation of the developing roller 811. The second drive force receiving member 84 directly or indirectly drives the rotation of the photosensitive drum 821. In the left-right direction, one end of the process cartridge C that receives the rotational driving force from the image forming apparatus is defined as the driving end (first end) C81/left side, and the opposite end is the non-driving end (second end) C82/right side. In the left-right direction, the process cartridge C also has a first end cap (first side member) 8300 at the driving end C81 and a second end cap (second side member) 8400 at the non-driving end C82. Both the first drive force receiving member 83 and the second drive force receiving member 84 are exposed through the first end cap 8300. The first unit 8100 and the second unit 8200 are connected via the first end cap 8300 and the second end cap 8400. The first end cap 8300 and the second end cap 8400 may be formed as separate parts from the second unit housing 82 or may be integrally formed with it. When the first end cap 8300 and the second end cap 8400 are both integrally formed with the second unit housing 82, they may be considered as part of the second unit housing 82.

Figure 36:
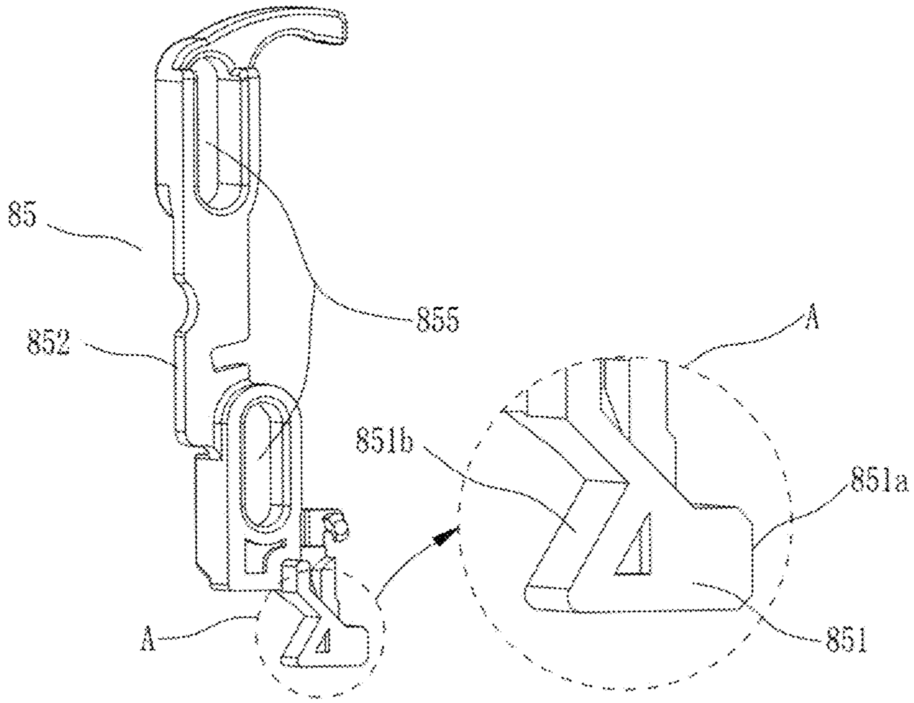
FIG. 36 is a perspective view of the separation contact member according to Embodiment 14.

As shown in FIG. 35 and FIG. 36, the process cartridge C includes a separation contact assembly for causing the developing roller 811 to move with the first unit housing 81. Specifically, the separation contact assembly includes a separation contact member (separation force receiving member) 85 that is configured to interact a force-applying member in the image forming apparatus. The separation contact member 85 is movable relative to the first unit housing 81. Further, the separation contact member 85 has a mechanism body 852, with a long slot or groove 855 and an acting portion 851 disposed at the two ends of the mechanism body 852. The non-driving end C82 of the process cartridge C also includes a second bracket 816. The second bracket 816 is at least for supporting the developing roller 811. The second bracket 816 has a second main body 8160 and a second support body 8162 formed on the second main body 8160. The second support body 8162 cooperates with the long slot or groove 855 to guide the separation contact member 85 to move relative to the second bracket 816. The separation contact member 85 has an acting position and a non-acting position. In the acting position, the acting portion 851 can receive the force applied by the force-applying member. In the non-acting position, the acting portion 851 cannot receive the force applied by the force-applying member. The acting portion 851 includes a first acting portion 851*a* and a second acting portion 851*b* configured for receiving the force applied by the force-applying member in the image forming apparatus. The first acting portion 851*a* is configured for receiving a separation force applied by the force-applying member to cause the developing roller 811 and the photosensitive drum 821 to separate from each other. The second acting portion 851*b* is configured for receiving a contact/restoring force applied by the force-applying member to cause the developing roller 811 and the photosensitive drum 821 to contact each other. This technical solution is also applicable to a process cartridge C that does not include the second unit 8200.

Figure 38:
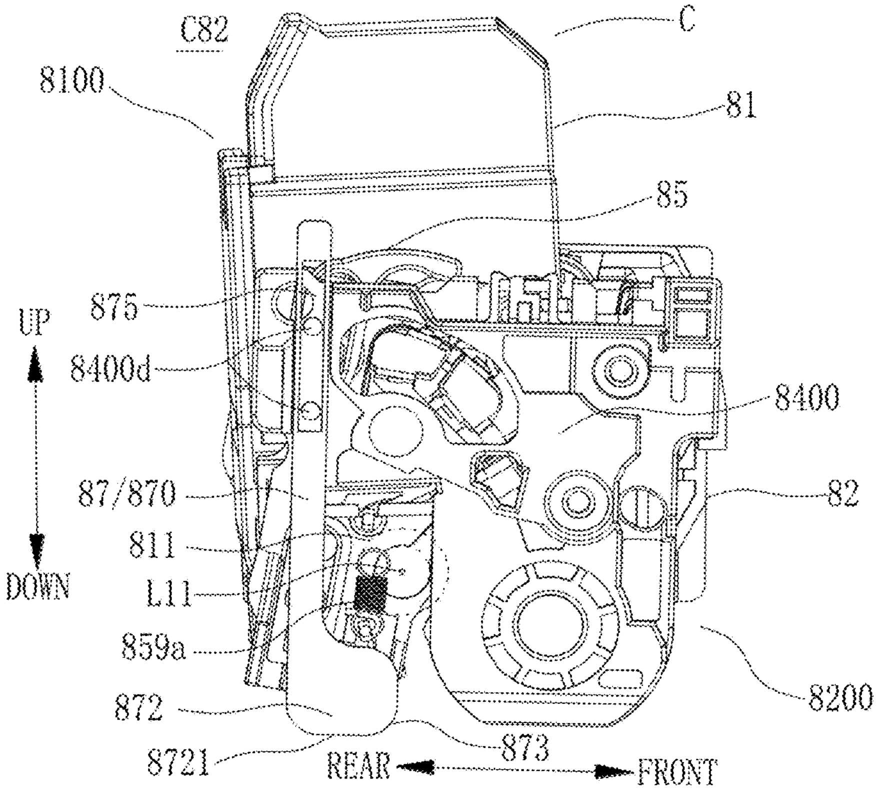
FIG. 38 is a schematic view of the process cartridge according to Embodiment 14 during installation into the image forming apparatus, viewed along the left-right direction.
Figure 39:
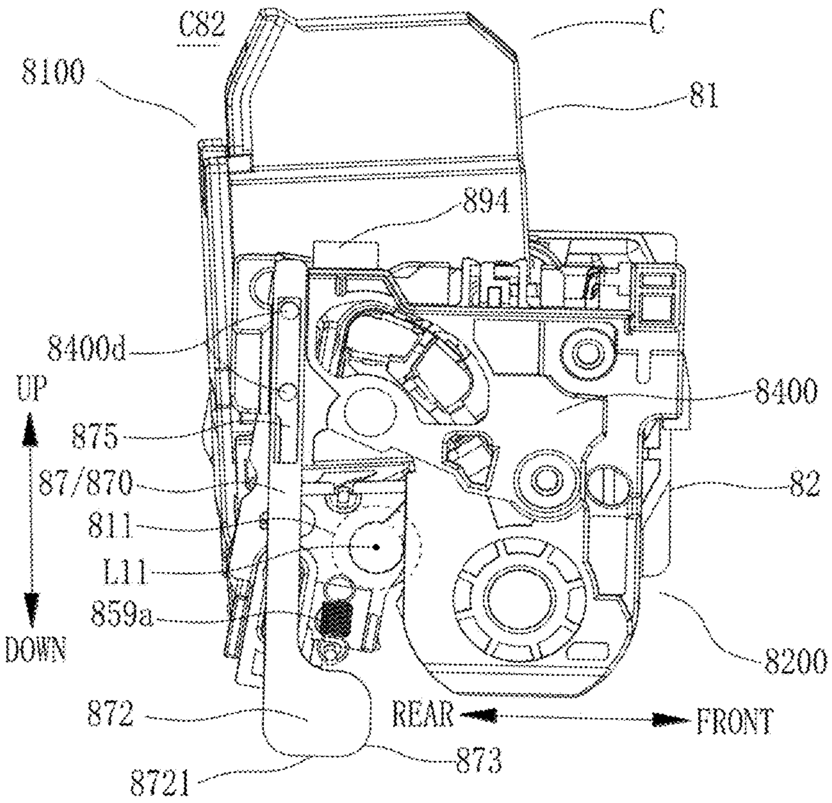
FIG. 39 is a schematic view of the process cartridge according to Embodiment 14 after installation is complete, viewed along the left-right direction.

As shown in FIG. 35, FIG. 38, and FIG. 39, the separation contact assembly also includes a first elastic force applying member 859*a*. The first elastic force applying member 859*a* is configured for resetting the separation contact member 85. The first elastic force applying member 859*a* deforms with the movement of the separation contact member 85. Specifically, one end of the first elastic force applying member 859*a* is connected to the separation contact member 85, and the other end is connected to the second end cap 8400, bracket 816, or first unit housing 81. The first elastic force applying member 859*a* is preferably a tension spring.

Figure 37:
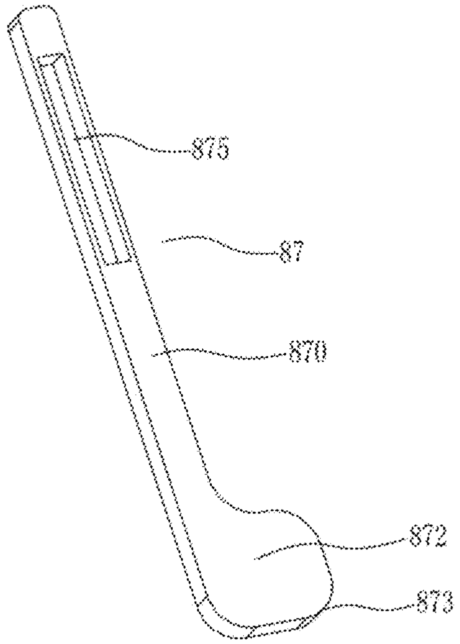
FIG. 37 is a perspective view of the shielding member according to Embodiment 14.

As shown in FIG. 35 and FIG. 37, the process cartridge C further includes a shielding member 87. The shielding member 87 is movably provided relative to the first unit housing 81, second unit housing 82, second end cap 8400, or bracket 816. Hereinafter, the case where the shielding member 87 is movably provided on the second end cap 8400 is for illustrative purposes.

Specifically, the shielding member 87 has a main body 870 and a guided portion 875 and a shielding portion 872 respectively disposed at the two ends of the main body 870. The main body 870 is movably provided relative to the first unit housing 81, second unit housing 82, second end cap 8400, or bracket 816. The second end cap 8400 has a second end cap body 8401 and a guide portion 8400*d* formed on the second end cap body 8401. The guide portion 8400*d* is configured for coupling with the guided portion 875 to allow them to be movably connected. Viewing the process cartridge C along the left-right direction, the shielding portion 872 is configured for shielding the acting portion 851. The shielding member 87 has a first position and a second position. The lowermost end 8721 (as shown in FIG. 38) of the shielding portion 872 in the second position is closer to the rotation axis L11 of the developing roller 811 than in the first position. Under its own weight, the shielding member 87 remains in the first position. Viewing the process cartridge C along the left-right direction, the acting portion 851 does not protrude below the shielding member 87. The acting portion 851 is always shielded by the shielding member 87/shielding portion 872, so that the separation contact member 85 may be more effectively protected. The shielding member 87 also has an abutting portion 873 adjacent to the shielding portion 872. During the process of installing the process cartridge C into or removing it from the image forming apparatus, if the abutting portion 873 interferes with an interfering component in the image forming apparatus (e.g., they mutually abut), the interfering component can push the abutting portion 873 to cause the shielding member 87 to move from the first position to the second position along the guide portion 8400*d* to avoid the interfering component, thereby allowing the process cartridge C to be installed smoothly. The abutting portion 873 may be a curved or inclined edge adjacent to the shielding portion 872, or it may be a protrusion provided on the shielding portion 872.

When the process cartridge C is not installed in the image forming apparatus, in the up-down direction, the separation contact member 85 is maintained in the non-acting position by the action of the first elastic force applying member 859*a*. Under its own weight, the shielding member 87 remains in the first position. Viewing the process cartridge C along the left-right direction, the acting portion 851 does not protrude below the shielding member 87, and the shielding member 87/shielding portion 872 shields the acting portion 851.

As shown in FIG. 38, during the process of installing the process cartridge C into the image forming apparatus, the shielding member 87 moves from the first position to the second position under the action of an interfering component in the image forming apparatus, and the separation contact member 85 is maintained in the non-acting position. In this state, viewing the process cartridge C along the left-right direction, the acting portion 851 does not protrude below the shielding member 87. In other words, in the second position, the shielding member 87/shielding portion 872 still shields the acting portion 851.

As shown in FIG. 39, when the process cartridge C is installed at a predetermined position in the image forming apparatus, under its own weight, the shielding member 87 remains in the first position. Then, the door of the image forming apparatus is closed. After the door is closed, under the action of a top plate 894, the separation contact member 85 is maintained in the acting position. In this state, viewing the process cartridge C along the left-right direction, the acting portion 851 does not protrude below the shielding member 87, and the shielding member 87/shielding portion 872 still shields the acting portion 851. The predetermined position is the position where the process cartridge C is installed inside the image forming apparatus, just before the door of the image forming apparatus is closed.

In some embodiments, when the process cartridge C is installed at the predetermined position in the image forming apparatus, the shielding member 87 is moved from the first position to the second position by the action of an interfering component in the image forming apparatus. Then, the door of the image forming apparatus is closed. After the door is closed, under the action of the top plate 894, the separation contact member 85 is maintained in the acting position. In this state, viewing the process cartridge C along the left-right direction, the acting portion 851 does not protrude below the shielding member 87, and the shielding member 87/shielding portion 872 is still able to shield the acting portion 851.

In some embodiments, when the process cartridge C is installed at the predetermined position in the image forming apparatus, the shielding member 87 is moved from the first position to the second position by the action of an interfering component in the image forming apparatus. Then, the door of the image forming apparatus is closed. After the door is closed, under the action of the top plate 894, the separation contact member 85 is maintained in the acting position. In this state, viewing the process cartridge C along the left-right direction, the acting portion 851 is not shielded by the shielding member 87/shielding portion 872.

In some embodiments, the shielding member 87 further includes an extension connected to the shielding portion 872. When viewing the process cartridge C along the front-rear direction, the acting portion 851 is shielded by the extension, thus providing more comprehensive protection for the acting portion 851.

In some embodiments, the shielding member 87 may also be movably connected to other components, as long as it is guaranteed that during the up-down movement of the shielding member 87, when viewing the process cartridge C along the left-right direction, the separation contact member 85 does not protrude below the shielding member 87, and the shielding member 87/shielding portion 872 is always able to shield the acting portion 851.

As described above, in this embodiment, at least before the process cartridge C is installed in the image forming apparatus, when viewing the process cartridge C along the left-right direction, the separation contact member 85 does not protrude below the shielding member 87, and the acting portion 851 of the separation contact member 85 is shielded by the shielding portion 872 of the shielding member 87. This can provide more effective protection for the separation contact member 85 and prevent the process cartridge C from being damaged by collision with other components during transportation or installation into the image forming apparatus.

Embodiment 15

Figure 40:
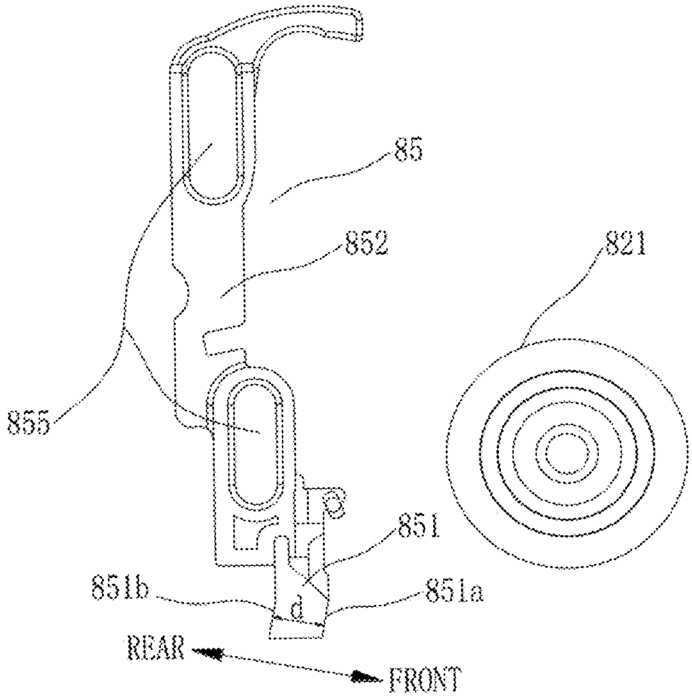
FIG. 40 is a schematic view of the separation contact member and photosensitive drum according to Embodiment 15, viewed along the left-right direction.

As shown in FIG. 40, the following will introduce Embodiment 15 of the present disclosure. Parts that are the same as in the above embodiments will not be described again. The difference from the above embodiments lies in the configuration of the separation contact member (separation force receiving member) 85.

As shown in FIG. 40, the plane in which the first acting portion 851*a* is located is parallel to the plane in which the second acting portion 851*b* is located. In the front-rear direction, the planes of both the first acting portion 851*a* and the second acting portion 851*b* are inclined in a direction away from the photosensitive drum 821.

In some embodiments, the acting portion 851 is formed by extending vertically downward, as long as it is guaranteed that the plane of the first acting portion 851*a* is always parallel to the plane of the second acting portion 851*b*.

As shown in FIG. 40, when the acting portion 851 is sectioned by a plane parallel to the front-rear and left-right directions, in the up-down direction, the dimension d of the section in the front-rear direction remains unchanged. This ensures that the strength of the acting portion 851 is uniform throughout, preventing fracture when it is subjected to force.

As described above, when the acting portion 851 is sectioned by a plane parallel to the front-rear and left-right directions, in the up-down direction, the dimension d of the section in the front-rear direction remains unchanged, which can effectively prevent the acting portion 851 from fracturing when subjected to force.

Embodiment 16

Figure 41:
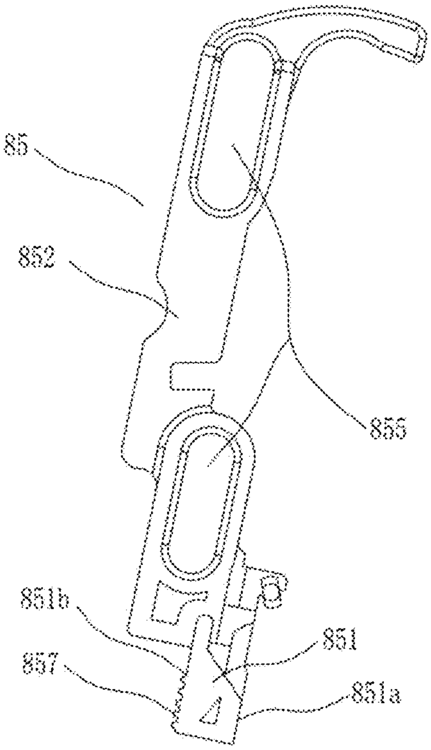
FIG. 41 is a schematic view of the separation contact member according to Embodiment 16, viewed along the left-right direction.

As shown in FIG. 41, the following will introduce Embodiment 16 of the present disclosure. Parts that are the same as in the above embodiments will not be described again. The difference from the above embodiments lies in the configuration of the separation contact member (separation force receiving member) 85.

As shown in FIG. 41, the plane in which the first acting portion 851*a* is located is parallel to the plane in which the second acting portion 851*b* is located. The second acting portion 851*b* is provided with an anti-disengagement portion 857 for increasing friction. The anti-disengagement portion 857 is preferably a coating, densely packed dots, or ribs, configured to increase the friction between the second acting portion 851*b* and the force-applying member, preventing them from slipping and disengaging.

As described above, providing the anti-disengagement portion 857 on the second acting portion 851*b* prevents slipping and disengagement when the force-applying member applies force to the second acting portion 851*b*.

Embodiment 17

Components and numbers that are the same as in the above embodiments will be directly referenced in this embodiment. Different from the above embodiments, in this embodiment, the surface of the first acting portion 851*a* for receiving the separation force is configured as a plane inclined with respect to the front-rear direction, and at least a part of the surface faces downward.

Figure 43:
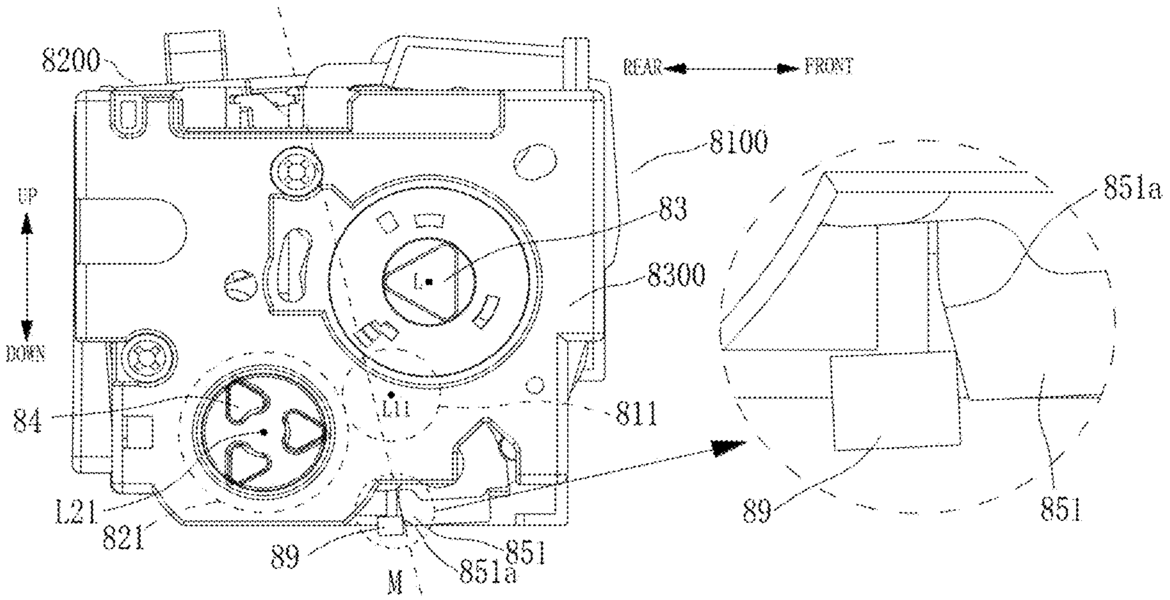
FIG. 43 is a plan view of the process cartridge according to Embodiment 18, viewed from left to right along the left-right direction.

As described above, the first acting portion 851*a* is configured for receiving the separation force applied by a force-applying member 89 (as shown in FIG. 43) in the image forming apparatus. This force causes the first unit housing (first frame) 81 to move relative to the second unit housing (second frame) 82, thereby achieving the separation of the developing roller 811 and the photosensitive drum 821. Under the condition that the stroke of the force-applying member 89 remains unchanged, compared to a plane where at least a part faces upward or is parallel to the up-down direction, when at least a part of the plane faces downward, the timing for the first acting portion 851*a* to receive the separation force may be delayed. Consequently, the time for the first unit 8100 to move relative to the second unit 8200 may be reduced, and accordingly, the stroke of the first unit 8100 is also reduced. This reduces the stroke of the first drive force receiving member 83 that moves with the first unit 8100/first unit housing 81, which is beneficial for reducing the reaction force exerted by the first drive force receiving member 83 on the corresponding drive output member in the image forming apparatus, making the drive output member less prone to damage.

Figure 42:
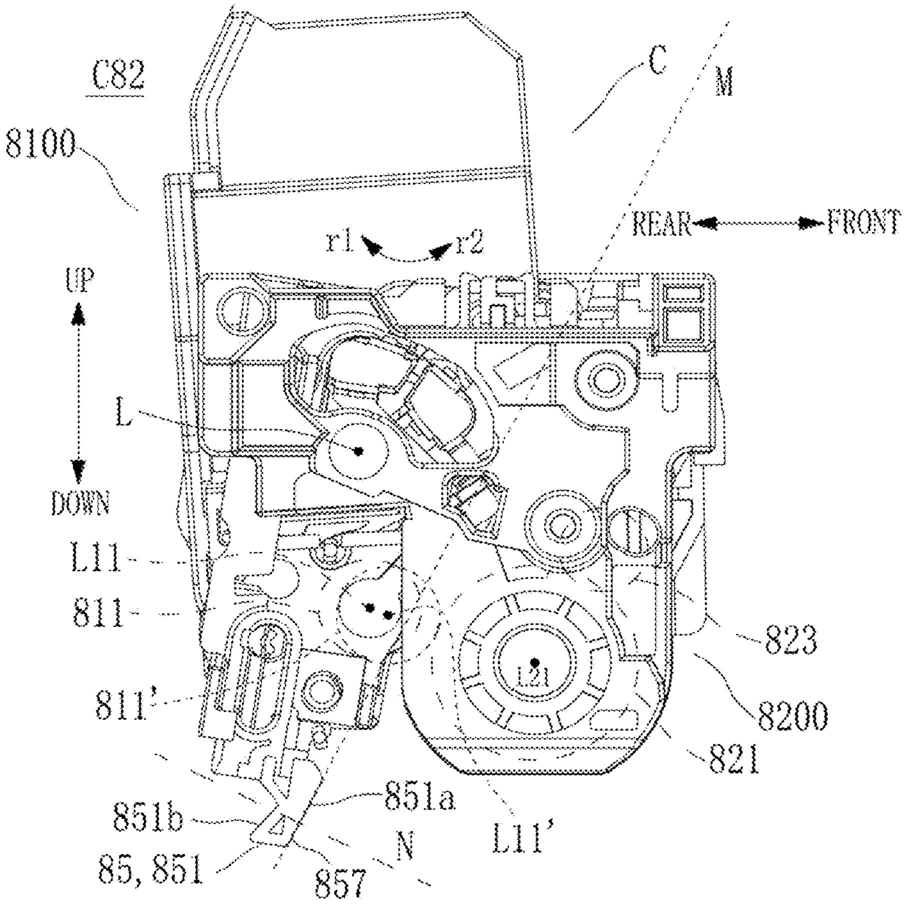
FIG. 42 is a plan view of the process cartridge according to Embodiment 17, viewed from left to right along the left-right direction.

As shown in FIG. 42, the developing roller 811 and the photosensitive drum 821 are in a mutually separated state. At this time, the rotation axis of the developing roller 811 is L11. To more clearly describe the position of the first acting portion 851*a*, the developing roller in a state of mutual contact with the photosensitive drum 821 is denoted by reference numeral 811', and its rotation axis is L11'.

When viewed along the left-right direction, a line M passes through the line segment formed by the projection of the surface of the first acting portion 851*a* for receiving the separation force. In some embodiments, this line M passes between the rotation axis L11/L11' of the developing roller 811 and the rotation axis L21 of the photosensitive drum 821. Since the surface is formed as a plane, the line M may be considered as the tangent to this plane.

In this embodiment, when the first acting portion 851*a* receives the separation force, the first unit 8100/first unit housing 81 rotates about a rotation axis L in the direction r1, thereby achieving the separation of the developing roller 811 and the photosensitive drum 821. When the second acting portion 851*b* receives the contact force, the first unit 8100/first unit housing 81 rotates about the rotation axis L in the direction r2, thereby achieving contact between the developing roller 811 and the photosensitive drum 821. The rotation directions r1 and r2 are opposite.

In some embodiments, the rotation axis L and the rotation axis L11/L11' are both on the same side of the line M, and the rotation axis L21 is on the other side of the line M. When the developing roller 811 and the photosensitive drum 821 are separated, this design can reduce the required separation force, thus lowering the output power of the image forming apparatus and also reducing wear on the force-applying member 89.

In some embodiments, a line N is perpendicular to the line M. As shown in FIG. 42, the line N also passes through the first acting portion 851*a*. When viewed along the left-right direction, the rotation axis L11/L11' of the developing roller 811, the rotation axis L21 of the photosensitive drum 821, and the charging roller (charging member) 823 are all on the same side of the line N. The charging roller 823 is rotatably mounted in the second unit housing 82, and the charging roller 823 is configured for charging the surface of the photosensitive drum 821, so that after being charged, the photosensitive drum 821 can form an electrostatic latent image upon laser exposure.

In some embodiments, the process cartridge C also includes an anti-disengagement portion 857 provided on the first acting portion 851*a* to prevent the force-applying member 89 from disengaging from the first acting portion 851*a*. Specifically, the anti-disengagement portion 857 is configured as a friction pad, rubber, silicone, or other composite material. By using materials with a high friction coefficient, the friction between the force-applying member 89 and the anti-disengagement portion 857 is increased. The anti-disengagement portion 857 is mounted on the surface of the first acting portion 851*a* for receiving the separation force.

In some embodiments, the anti-disengagement portion 857 may also be a high-friction-coefficient coating applied to the surface of the first acting portion 851*a* for receiving the separation force, such as rubber, ceramic coating, etc.

In some embodiments, the surface of the first acting portion 851*a* for receiving the separation force may be roughened to make the surface itself form the anti-disengagement portion 857. For example, through mechanical processing (such as sanding, sandblasting, etc.) or chemical treatment (such as etching), the surface roughness of the first acting portion 851*a* is increased to enhance friction.

Embodiment 18

Differing from Embodiment 17, in this embodiment, the surface of the first acting portion 851*a* for receiving the separation force is no longer configured as a plane but as a curved surface. In the up-down direction, at least a part of this curved surface faces downward. In other words, the center of this curved surface points to at least one point on the curved surface in a direction facing downward. It should be noted that "facing downward" includes directions parallel to the up-down direction and pointing downward, as well as directions inclined with respect to the up-down direction but having a downward component.

As shown in FIG. 43, a tangent to any point on this curved surface is M. The rotation axis L and the rotation axis L11 are both on the same side of the line M, and the rotation axis L21 is on the other side of the line M.

Figure 44:
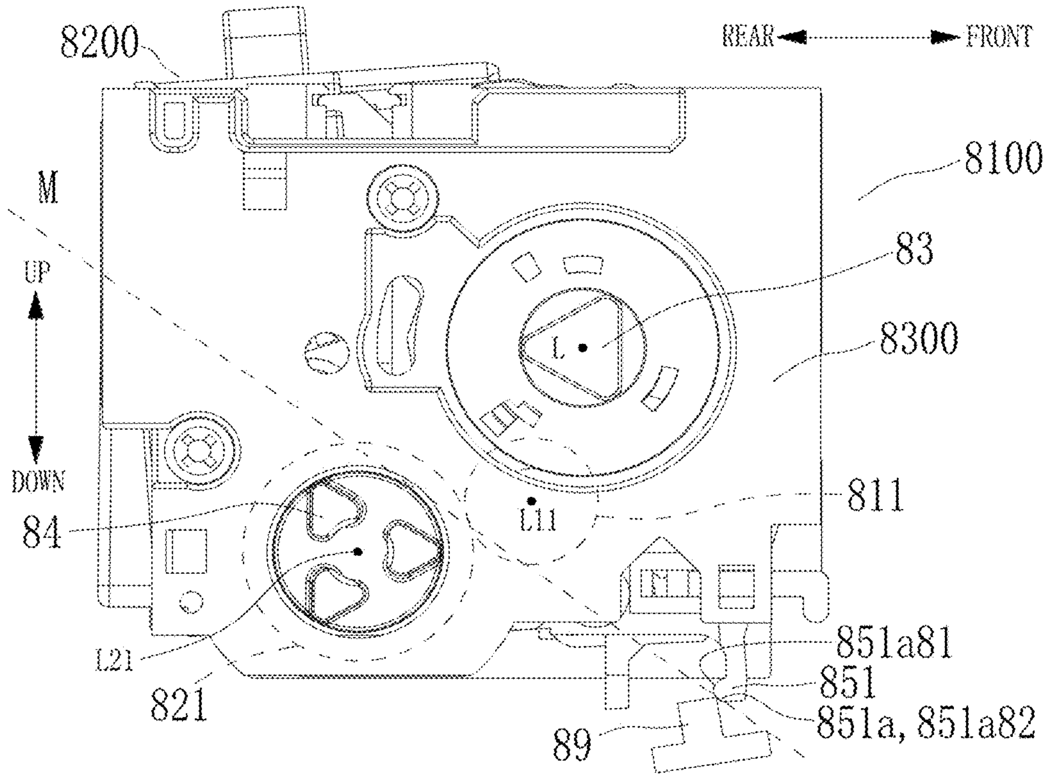
FIG. 44 is a plan view of another type of process cartridge according to Embodiment 18, viewed from left to right along the left-right direction.

As shown in FIG. 44, in a variant embodiment, the surface of the first acting portion 851*a* includes an upward-facing upper surface 851*a*81 and a downward-facing lower surface 851*a*82. The force-applying member 89 contacts the curved lower surface 851*a*82, causing the acting portion 851 to receive the separation force, and the force-applying member 89 does not contact the upper surface 851*a*81. The curved upper surface 851*a*81 can enhance the strength of the acting portion 851.

Similarly, the "upward-facing" upper surface 851*a*81 should be understood as: the center of the upper surface 851*a*81 points to at least one point on the upper surface 851*a*81 in a direction that is inclined with respect to the up-down direction but has an upward component.

Embodiment 19

Figure 45:
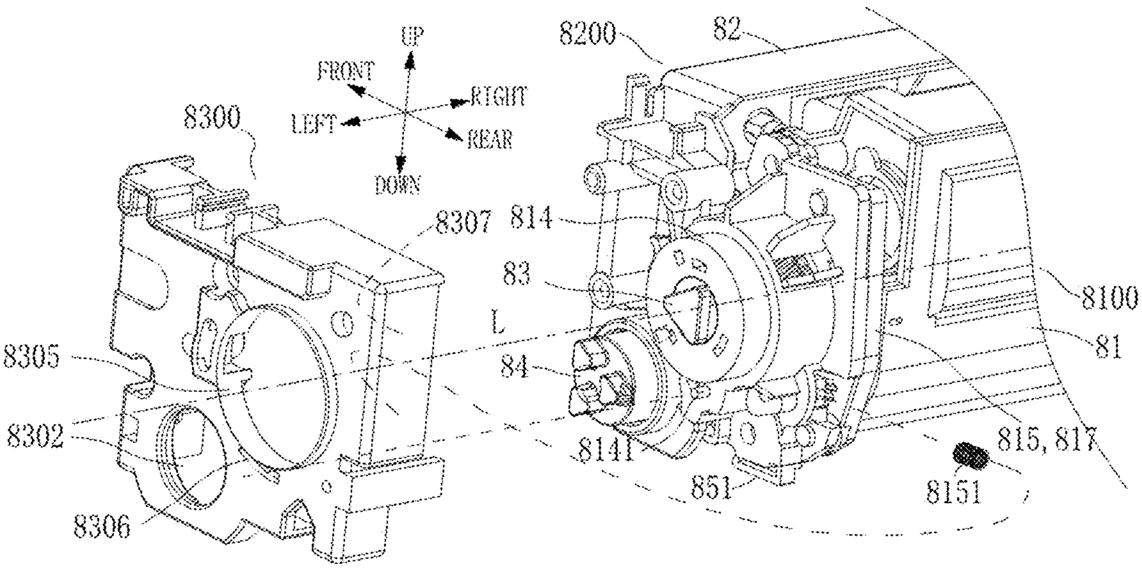
FIG. 45 is an exploded view of the first end cap and the first unit housing after separation in the process cartridge according to Embodiment 19.

As shown in FIG. 45, the process cartridge C also includes a cover 814 and a first bracket 817. In the left-right direction, the first unit housing 81, the first bracket 817, the cover 814, and the first end cap 8300 are arranged sequentially from right to left. The first bracket 817 is fixedly connected to the first unit housing 81 and can serve as a gear mounting plate for supporting gears. The driving force received by the first drive force receiving member 83 may be transmitted to various components of the first unit 8100 through these gears. The cover 814 is fixedly mounted on the first bracket 817 or the first unit housing 81 to protect the gears and expose the first drive force receiving member 83.

The first end cap 8300 is provided with a second exposure hole (second exposure portion) 8302 and a first exposure hole (first exposure portion) 8305. The first drive force receiving member 83 is exposed through the first exposure hole 8305. The second drive force receiving member 84 is exposed through the second exposure hole 8302. In this embodiment, the process cartridge C also includes a first guide portion 8141 and a second guide portion 8306 cooperating with each other. In the radial direction of the first exposure hole 8305, there is a movement gap between the cover 814 and the inner wall of the first exposure hole 8305. Through the cooperation of the first guide portion 8141 and the second guide portion 8306, the first unit 8100/first unit housing 81 can slide relative to the second unit housing 82.

When the developing roller 811 separates from the photosensitive drum 821 by rotating the first unit 8100/first unit housing 81 about the rotation axis L, one of the first guide portion 8141 and the second guide portion 8306 is configured as an arc-shaped groove or hole extending around the rotation axis L, and the other is configured as a protrusion guided by the arc-shaped groove or hole.

When the developing roller 811 separates from the photosensitive drum 821 by moving the first unit 8100/first unit housing 81 rearward in a direction parallel to the front-rear direction, one of the first guide portion 8141 and the second guide portion 8306 is configured as a straight groove or hole extending in the front-rear direction, and the other is configured as a protrusion guided by the straight groove or hole. FIG. 45 shows the first guide portion 8141 as a protrusion and the second guide portion 8306 as an arc-shaped hole. The first guide portion 8141 may protrude leftward from any one of the first unit housing 81, the cover 814, and the first bracket 817. The second guide portion 8306 is disposed on the first end cap 8300.

Further, the process cartridge C also includes a pushing member (resetting member) 8151. This pushing member 8151 is configured for urging the developing roller 811 and the photosensitive drum 821 to remain in a state of mutual contact. Specifically, the pushing member 8151 is provided between at least one of the first unit housing 81, the first bracket 817, and the cover 814, and the first end cap 8300. Thus, through the pushing force generated by the pushing member 8151, the developing roller 811 and the photosensitive drum 821 remain in mutual contact.

In some embodiments, the pushing member 8151 is configured as an elastic member. One end of the elastic member 8151 contacts the first unit 8100, and the other end contacts the first end cap 8300. Specifically, one end of the pushing member 8151 abuts against at least one of the first unit housing 81, the first bracket 817, and the cover 814, and the other end abuts against the inner wall 8307 of the first end cap 8300. Preferably, at least a part of the inner wall 8307 faces forward. When the first end cap 8300 is configured as part of the second unit 8200, the elastic member 8151 in the process cartridge C is configured with one end contacting the first unit 8100 and the other end contacting the second unit 8200.

In some embodiments, in the up-down direction, the position where at least one of the first unit housing 81, the first bracket 817, and the cover 814 abuts against the elastic member 8151 is located below the rotation axis L.

Embodiment 20

As shown in FIGS. 46 to 49, in this embodiment, the separation contact member (separation force receiving member) 85 includes an acting portion 851, a mechanism body 852, and a rotating portion 854. The rotating portion 854, which is provided on the mechanism body 852, cooperates with a rotated portion 8143 provided on the cover 814, hereby enabling the mechanism body 852 to rotate relative to the cover 814. The acting portion 851 includes a first acting portion 851*a* and a second acting portion 851*b* for receiving the force applied by a force-applying member in the image forming apparatus. The first acting portion 851*a* is configured for receiving the separation force from the force-applying member to rotate in the direction r1, thus causing the developing roller 811 and the photosensitive drum 821 to separate from each other. The second acting portion 851*b* is configured for receiving the contact/restoring force from the force-applying member to rotate in the direction r2, thus causing the developing roller 811 and the photosensitive drum 821 to contact each other. Further, the first acting portion 851*a* is provided on the cover 814, and the second acting portion 851*b* is provided on the mechanism body 852. The second acting portion 851*b* can rotate relative to the first acting portion 851*a*.

As shown in FIG. 47, FIG. 48A, FIG. 48B, and FIG. 49, the process cartridge C also includes a holding member 881. The holding member 881 is configured for keeping the developing roller 811 and the photosensitive drum 821 in a mutually separated position. Specifically, the holding member 881 includes a holding portion 8811 and a held portion 8812. In the left-right direction, the holding portion 8811 and the held portion 8812 are arranged opposite to each other. The holding portion 8811 and the held portion 8812 interact to enable the first unit 8100 to move in the left-right direction. Further, the holding portion 8811 is configured as a protrusion, and the held portion 8812 includes a first receiving portion 88121, a second receiving portion 88122, and a middle portion 88123. In the front-rear direction, the first receiving portion 88121 is located to the rear of the second receiving portion 88122. The first receiving portion 88121 and the second receiving portion 88122 are formed as grooves, and the middle portion 88123 is a protrusion formed between the first and second receiving portions. Still further, the first and second receiving portions 88121, 88122 are for receiving the holding portion 8811, and the middle portion 88123 is configured for abutting against the holding portion 8811.

Figure 48A:
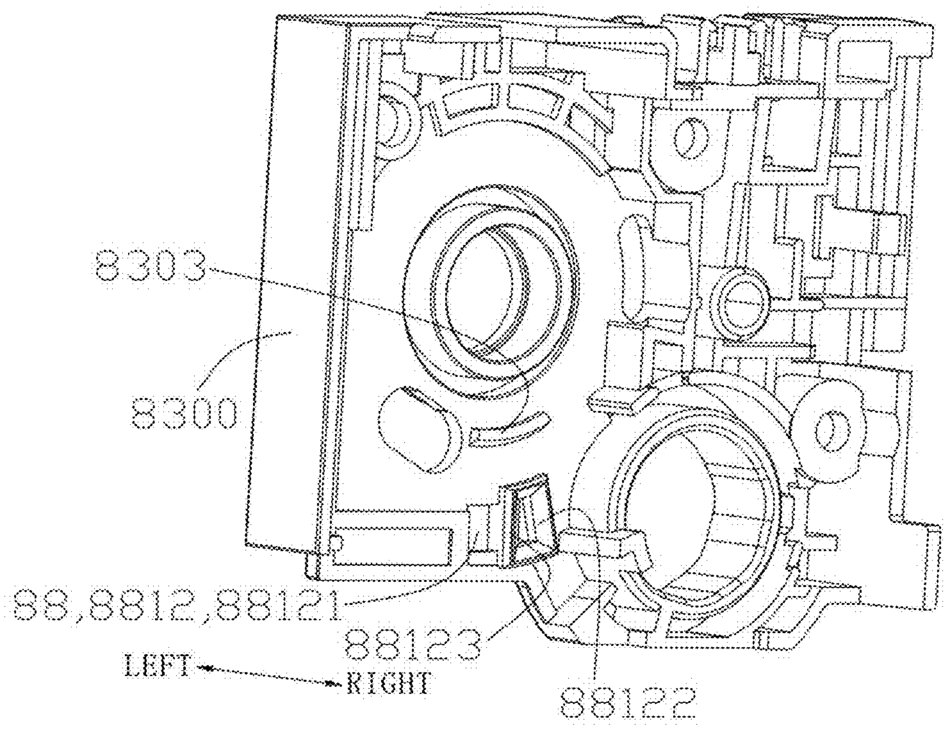
FIG. 48A and FIG. 48B are perspective views of the first end cap in the process cartridge according to Embodiment 20.
Figure 48B:
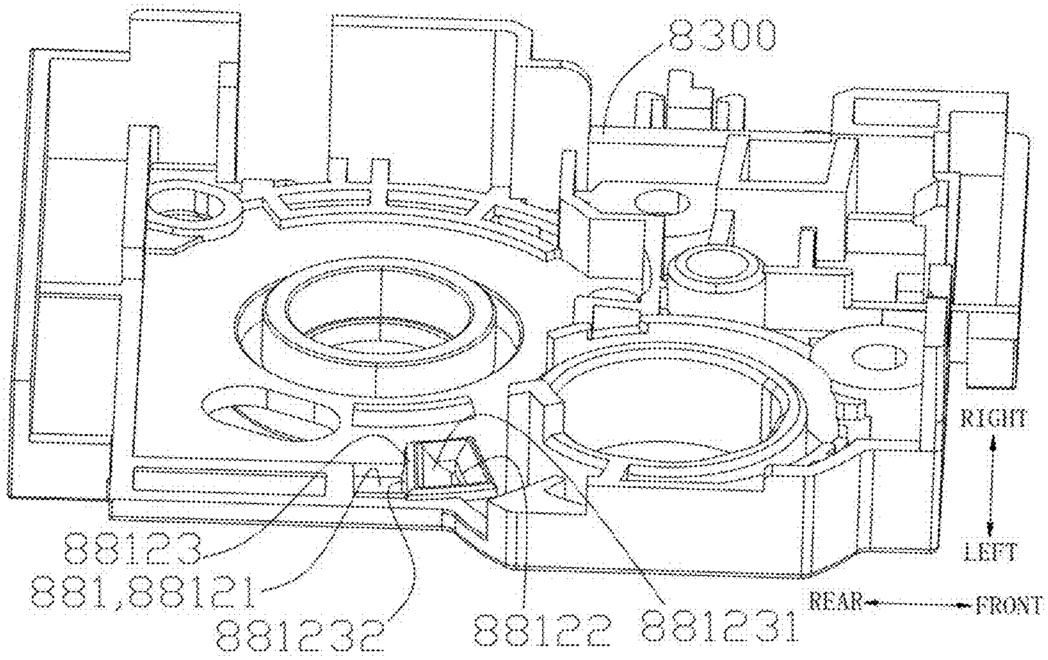

In some embodiments, as shown in FIG. 48A and FIG. 48B, the middle portion 88123 has a front end face 881231 and a rear end face 881232. The front end face 881231 is configured as an inclined surface. Specifically, the front end face 881231 is not parallel to the left-right direction and is not parallel to the front-rear direction. Preferably, the front end face 881231 faces to the right and forward. Further, the front end face 881231 is disposed in the second receiving portion 88122, and the rear end face 881232 is disposed in the first receiving portion 88121.

Figure 47:
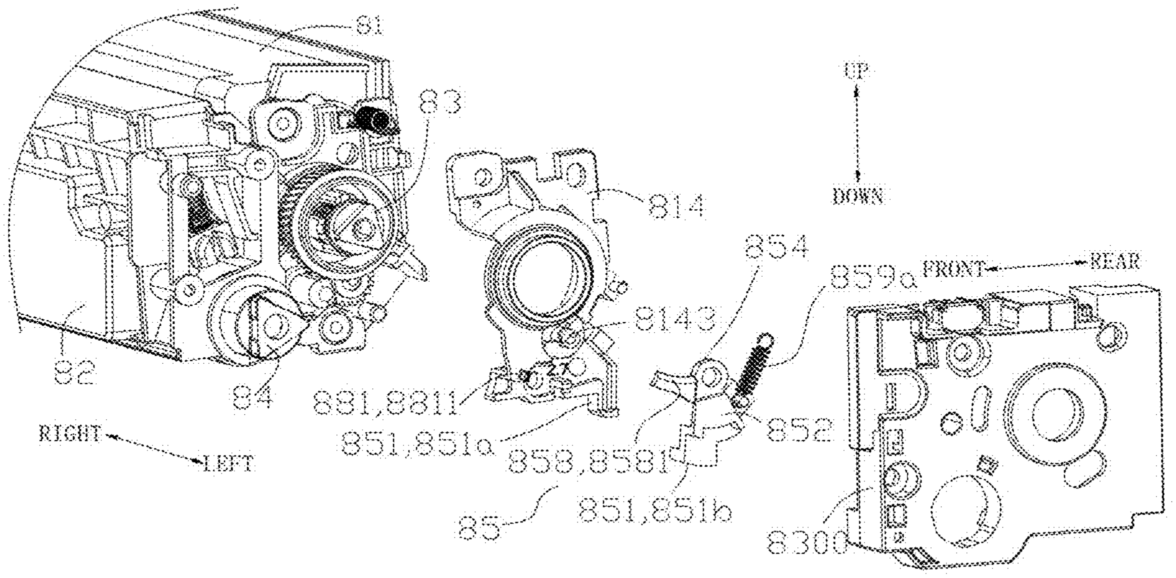
FIG. 47 is a partial exploded view of the driving end of the process cartridge according to Embodiment 20.

In some embodiments, as shown in FIG. 47, FIG. 48A, and FIG. 48B, the holding portion 8811 is provided on the cover 814, and the held portion 8812 is provided on the first end cap 8300. In the left-right direction, the holding portion 8811 extends from the cover 814 toward the first end cap 8300. The first and second receiving portions 88121, 88122 are recessed from the first end cap 8300 in a direction away from the cover 814.

In some embodiments, the holding portion 8811 and the held portion 8812 may be interchanged. That is, the holding portion 8811 is on the first end cap 8300, and the held portion 8812 is on the cover 814.

Figure 49:
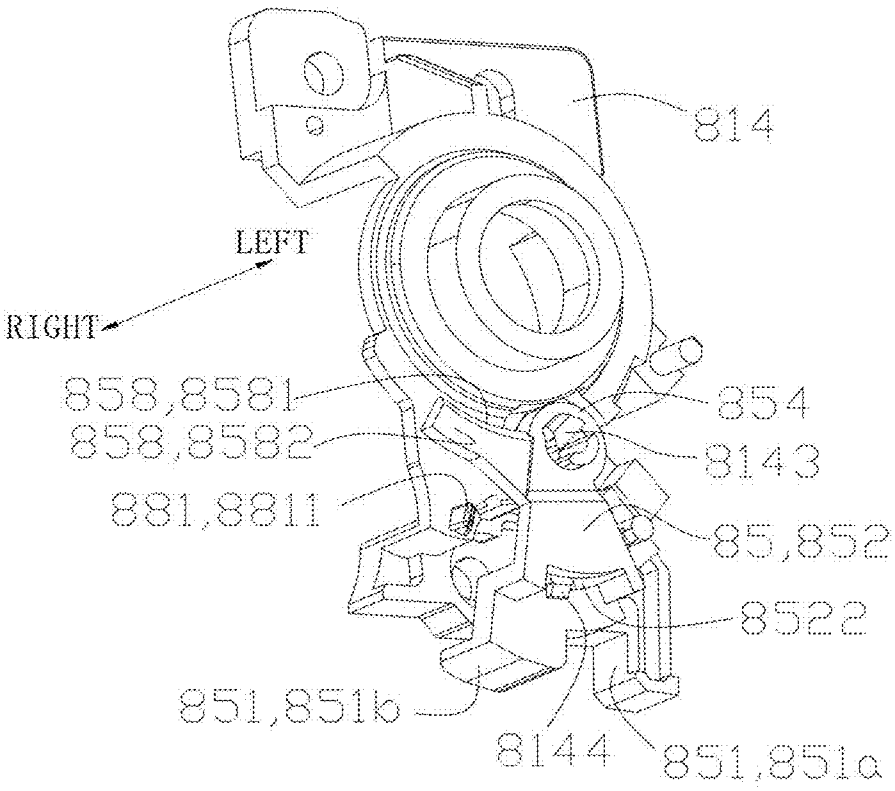
FIG. 49 is a schematic view of the cover and the separation contact member when coupled in the process cartridge according to Embodiment 20.
Figure 50A:
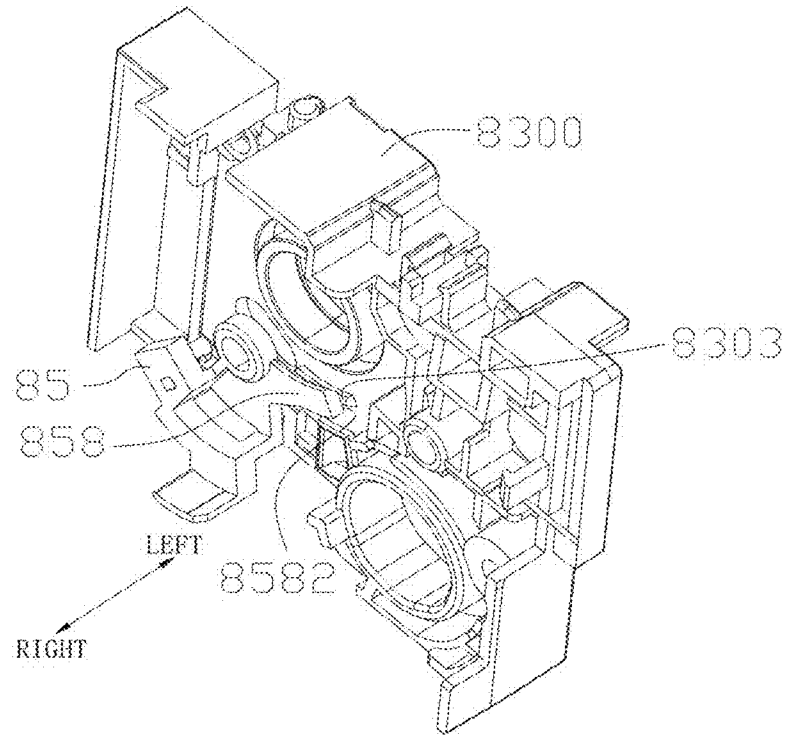
FIG. 50A is a schematic view of the first end cap and the separation contact member after some components are hidden, when the process cartridge according to Embodiment 20 is in the developing state.
Figure 51A:
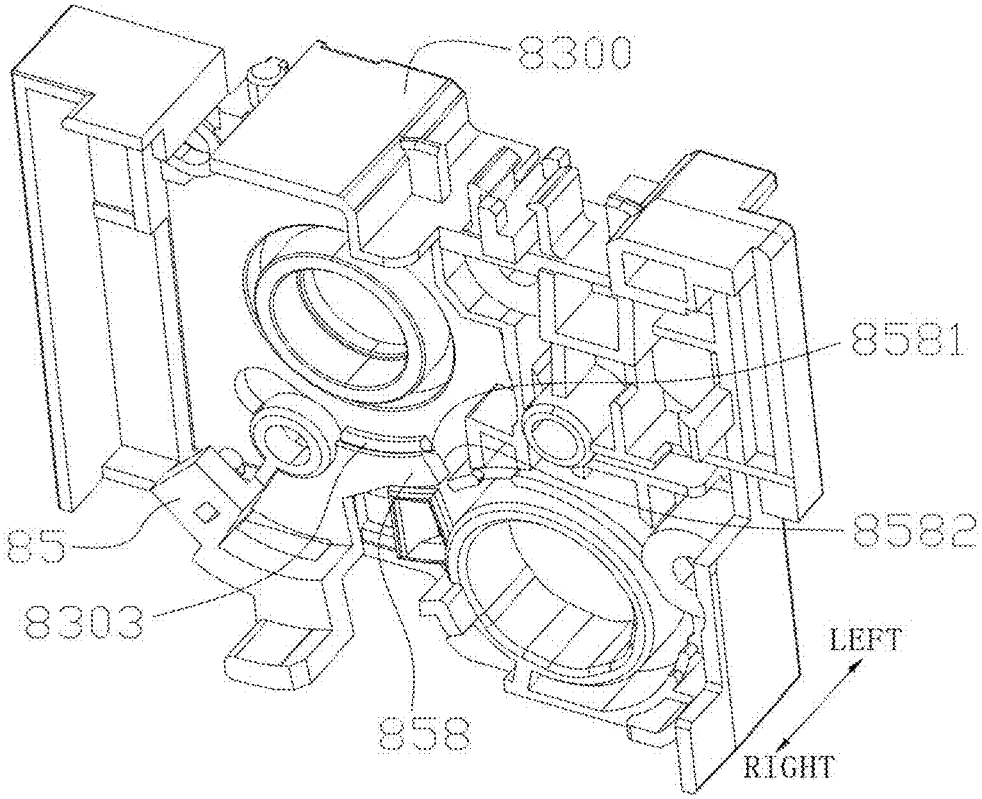
FIG. 51A is a schematic view of the first end cap and the separation contact member after some components are hidden, when the process cartridge according to Embodiment 20 is in the non-developing state.

As shown in FIG. 49, FIG. 50A, and FIG. 51A, the process cartridge C also includes a pushing member. The pushing member is configured for enabling the first unit 8100 to move in the left-right direction. Specifically, the pushing member includes a pushed portion 858 and a pushing portion 8303. Preferably, the pushed portion 858 is provided on the mechanism body 852, and the pushing portion 8303 is provided on the first end cap 8300. The pushed portion 858 is configured for interacting with the pushing portion 8303. Further, the pushed portion 858 has a first pushed surface 8581 and a second pushed surface 8582.

The first pushed surface 8581 is configured as an inclined surface. The first pushed surface 8581 is not parallel to the up-down direction and faces toward the side where the first end cap 8300 is located. In the left-right direction, the pushed portion 858 protrudes toward the mechanism body 852. When the second acting portion 851*b* receives a restoring force and rotates in the direction r2, the pushed portion 858 rotates with the mechanism body 852 and drives the cover 814 to rotate, thereby driving the first unit 8100 to rotate, which causes the developing roller 811 and the photosensitive drum 821 to contact each other. During this rotation, the first pushed surface 8581 abuts against the pushing portion 8303. Along the first pushed surface 8581, the mechanism body 852 drives the first unit 8100 to move to the right in the left-right direction. At this time, the second pushed surface 8582 abuts against the pushing portion 8303. In the left-right direction, the pushed portion 858 is opposite the pushing portion 8303. When the first acting portion 851*a* receives a separation force and rotates in the direction r1, it drives the cover 814 to rotate, thereby driving the first unit 8100 to rotate, which causes the developing roller 811 and the photosensitive drum 821 to separate from each other. The pushed portion 858 rotates in the direction r1. Along the pushed surface 8581, the mechanism body 852 drives the first unit 8100 to move to the left in the left-right direction for resetting.

Figure 46:
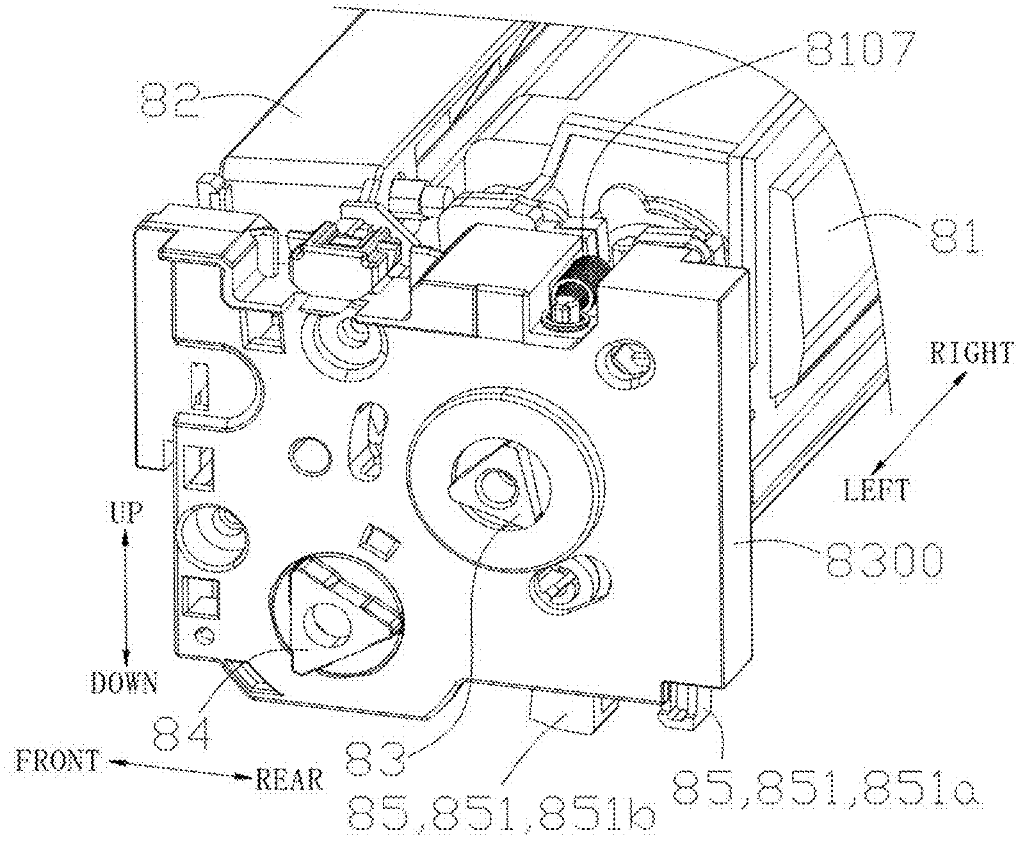
FIG. 46 is a perspective view of the process cartridge according to Embodiment 20.

In some embodiments, as shown in FIG. 46, a second elastic force applying member 8107 is provided in the first unit 8100. When the second acting portion 851*b* receives a restoring force and rotates in the direction r2, causing the first unit 8100 to move to the right in the left-right direction, the second elastic force applying member 8107 undergoes elastic deformation. When the first acting portion 851*a* receives a separation force and rotates in the direction r1, under the elastic force of the second elastic force applying member 8107, the first unit 8100 moves to the left in the left-right direction for resetting. In addition, when the process cartridge C is developing, the second elastic force applying member 8107 can cause the first unit 8100 to move closer to the side where the drive output member is located.

In some embodiments, as shown in FIG. 46, the second elastic force applying member 8107 may be a tension spring. In this case, it is disposed at the driving end C81. It can also be a compression spring, in which case it is disposed at the non-driving end C82.

In some embodiments, as shown in FIG. 47, the separation contact assembly also includes a first elastic force applying member 859*a*. The first elastic force applying member 859*a* is configured for resetting the second acting portion 851*b*. The first elastic force applying member 859*a* deforms with the movement of the second acting portion 851*b*. Specifically, one end of the first elastic force applying member 859*a* is connected to the mechanism body 852, and the other end is connected to the first end cap 8300, cover 814, or first unit housing 81. The first elastic force applying member 859*a* is preferably a tension spring.

Figure 50B:
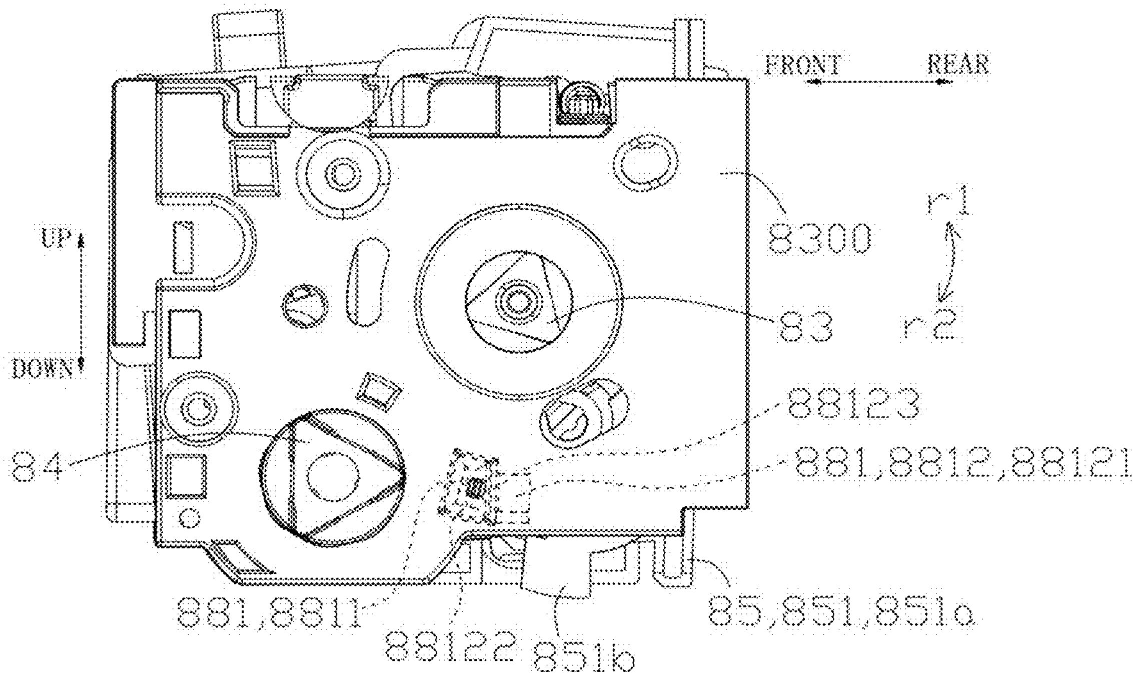
FIG. 50B is a schematic view of the process cartridge according to Embodiment 20 when in the developing state, viewed from left to right along a first direction.

As shown in FIG. 50B, when the process cartridge C is in the developing state, the holding portion 8811 is opposite the second receiving portion 88122, and the front end face 881231 of the middle portion 88123 abuts against the holding portion 8811. The developing roller 811 and the photosensitive drum 821 remain in contact. At this time, as shown in FIG. 50A, the second pushed surface 8582 of the pushed portion 858 abuts against the pushing portion 8303.

Figure 51B:
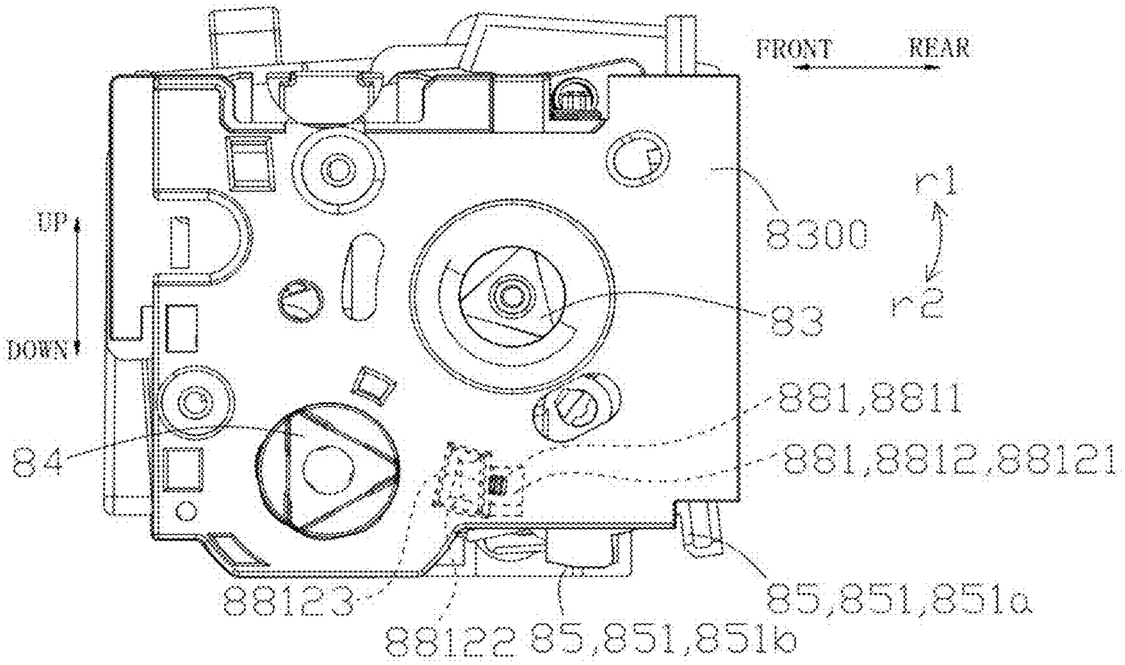
FIG. 51B is a schematic view of the process cartridge according to Embodiment 20 when in the non-developing state, viewed from left to right along a first direction.

As shown in FIG. 51B, when the process cartridge C does not need to develop, the first acting portion 851*a* receives a separation force and rotates in the direction r1, driving the cover 814 to rotate in the direction r1. This causes the holding portion 8811 to rotate in the direction r1. Along the front end face 881231 of the middle portion 88123, the first unit 8100/cover 814/holding portion 8811 first moves to the right in the left-right direction, while the holding portion 8811 moves rearward past the middle portion 88123. Under the elastic force of the first elastic force applying member 859*a*, the first unit 8100/cover 814/holding portion 8811 moves to the left in the left-right direction to reset, thereby causing the holding portion 8811 to enter the first receiving portion 88121 and abut against the rear end face 881232 of the middle portion 88123. This keeps the developing roller 811 and the photosensitive drum 821 in a separated state. At this time, as shown in FIG. 51A, the second pushed surface 8582 of the pushed portion 858 disengages from the pushing portion 8303.

When the process cartridge C needs to develop, as shown in FIG. 50B, the second acting portion 851*b* receives a restoring force and rotates in the direction r2. This rotation causes the cover 814/holding portion 8811 to rotate in the direction r2. The first pushed surface 8581 of the pushed portion 858 abuts against the pushing portion 8303. Guided by the first pushed surface 8581, the pushed portion 858/cover 814/holding portion 8811/first unit 8100 moves to the right in the left-right direction. At the same time, the holding portion 8811 moves forward past the middle portion 88123 and enters the second receiving portion 88122, abutting against the front end face 881231 of the middle portion 88123. The developing roller 811 and the photosensitive drum 821 remain in contact. At this time, as shown in FIG. 50A, the second pushed surface 8582 of the pushed portion 858 abuts against the pushing portion 8303.

In some embodiments, as shown in FIG. 49, the separation contact member 85 also includes a first restricted portion 8522. The first restricted portion 8522 interacts with a first restricting portion 8144 provided on the cover 814 to limit the rotation range of the mechanism body 852.

Embodiment 21

Figure 52:
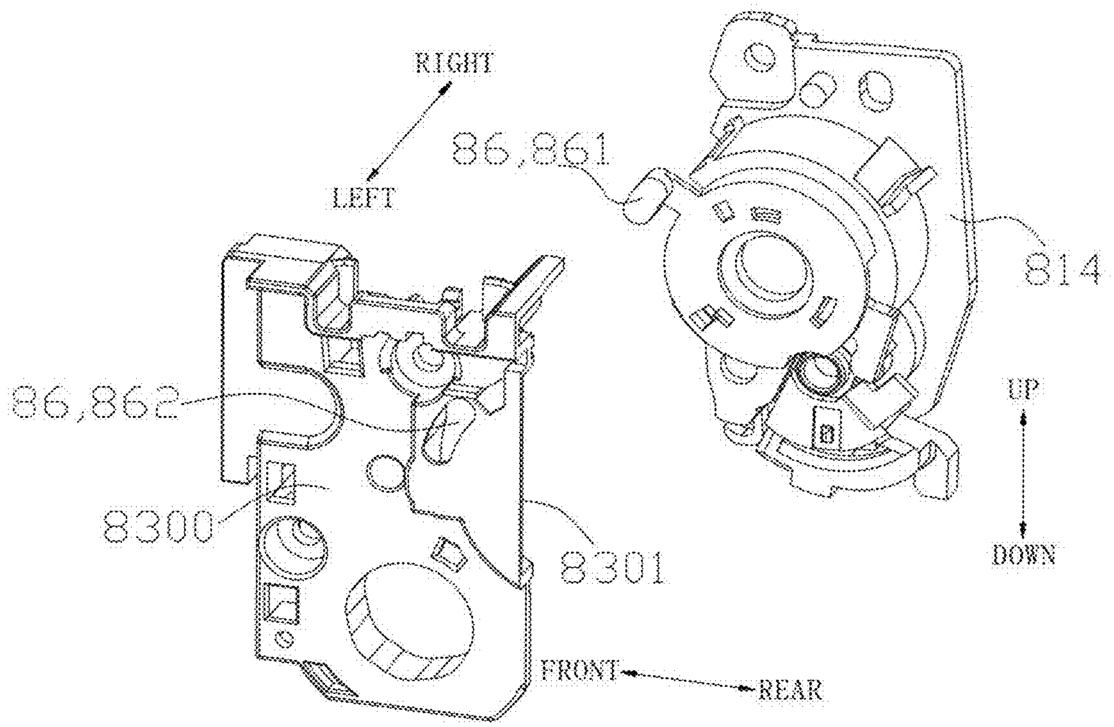
FIG. 52 is a partial exploded view of the driving end after some components are hidden in the process cartridge according to Embodiment 21.
Figure 53:
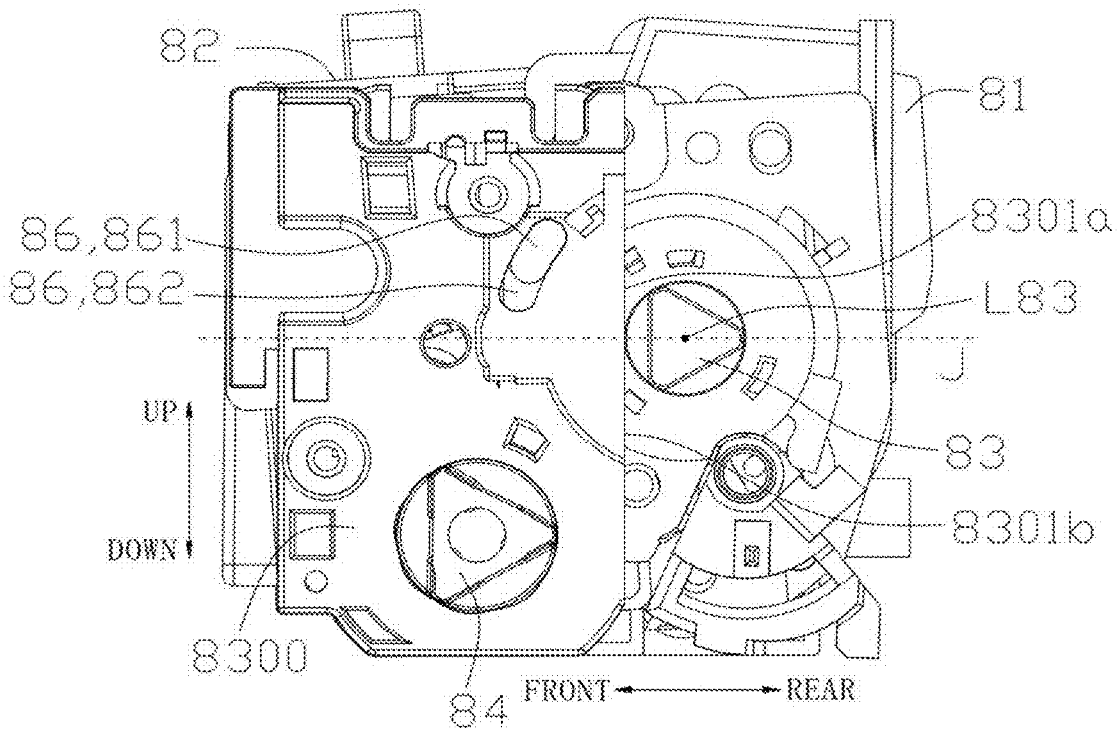
FIG. 53 is a schematic view of the process cartridge according to Embodiment 21, viewed from left to right along a first direction.
Figure 54:
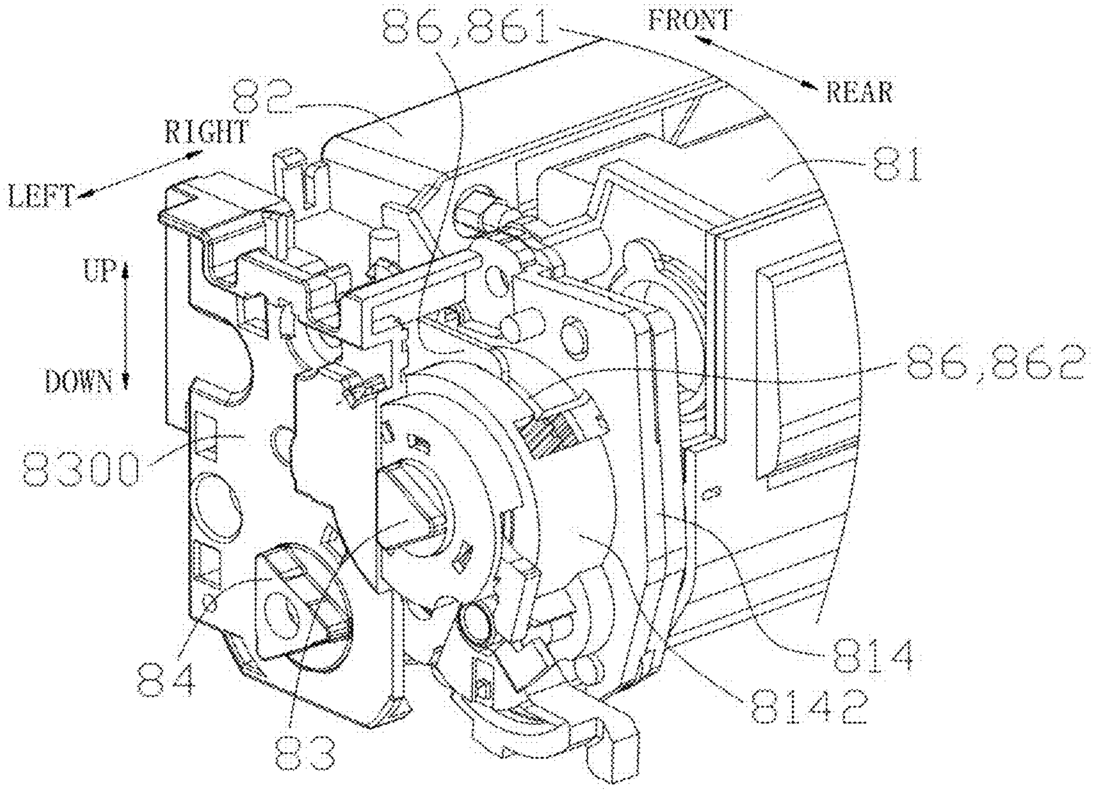
FIG. 54 is a perspective view of a variant of the process cartridge according to Embodiment 21.
Figure 55:
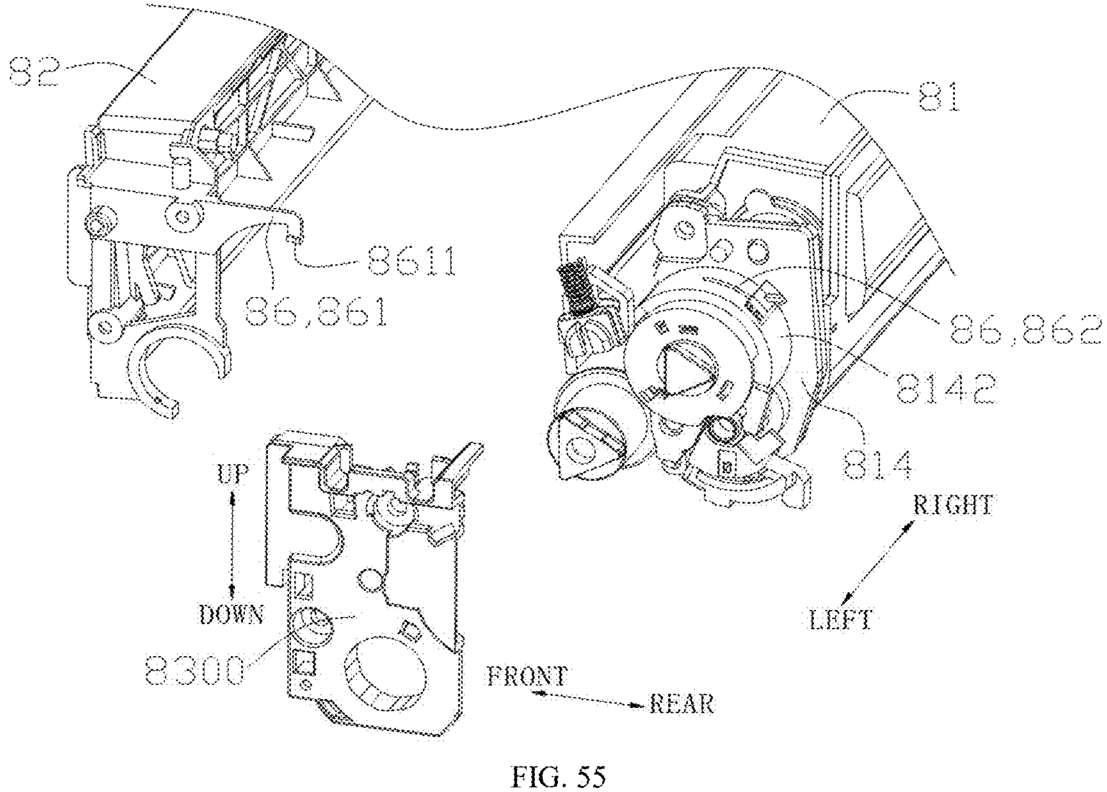
FIG. 55 is a partial exploded view of a variant of the process cartridge according to Embodiment 21.
Figure 56:
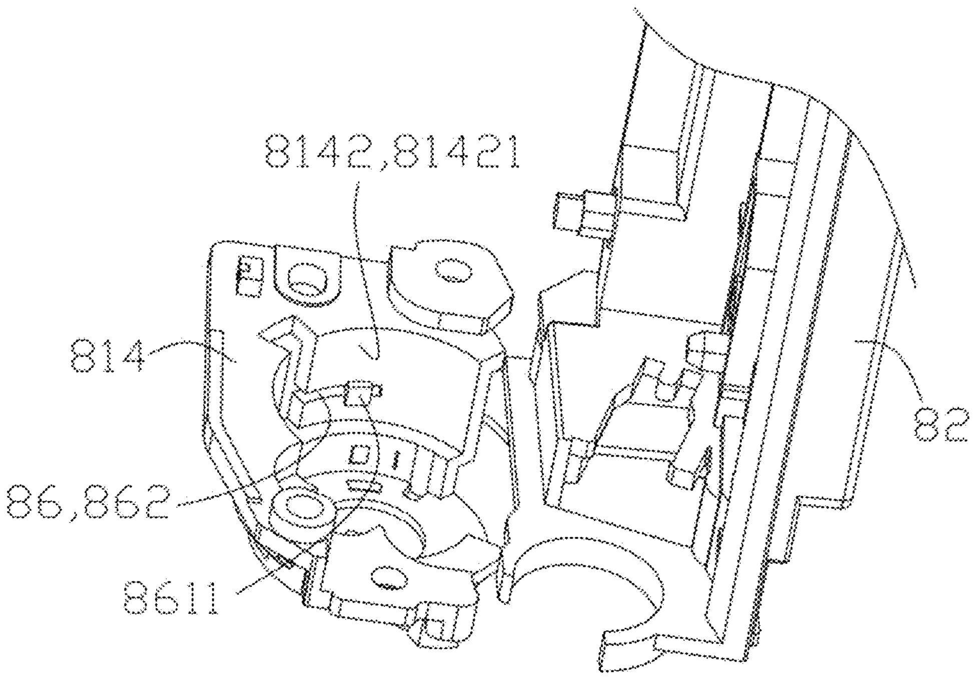
FIG. 56 and FIG. 57 are schematic views of the coupling of the cover and the second unit housing after some components are hidden in a variant of the process cartridge according to Embodiment 21.
Figure 57:
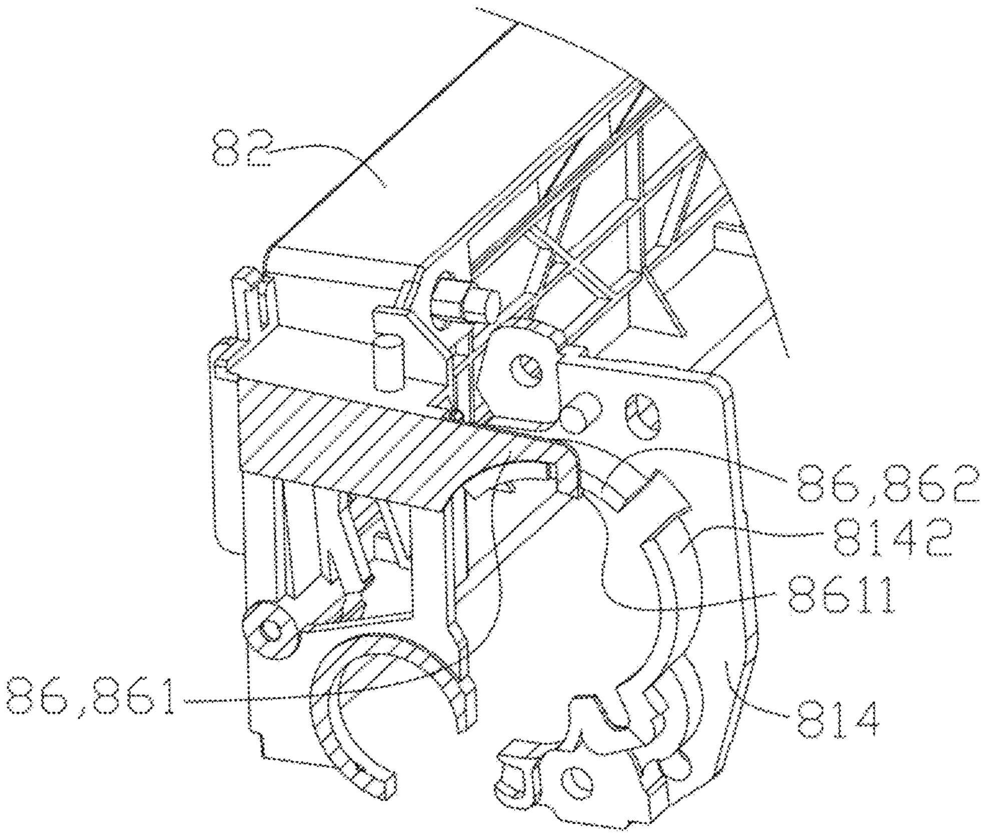
Figure 58:
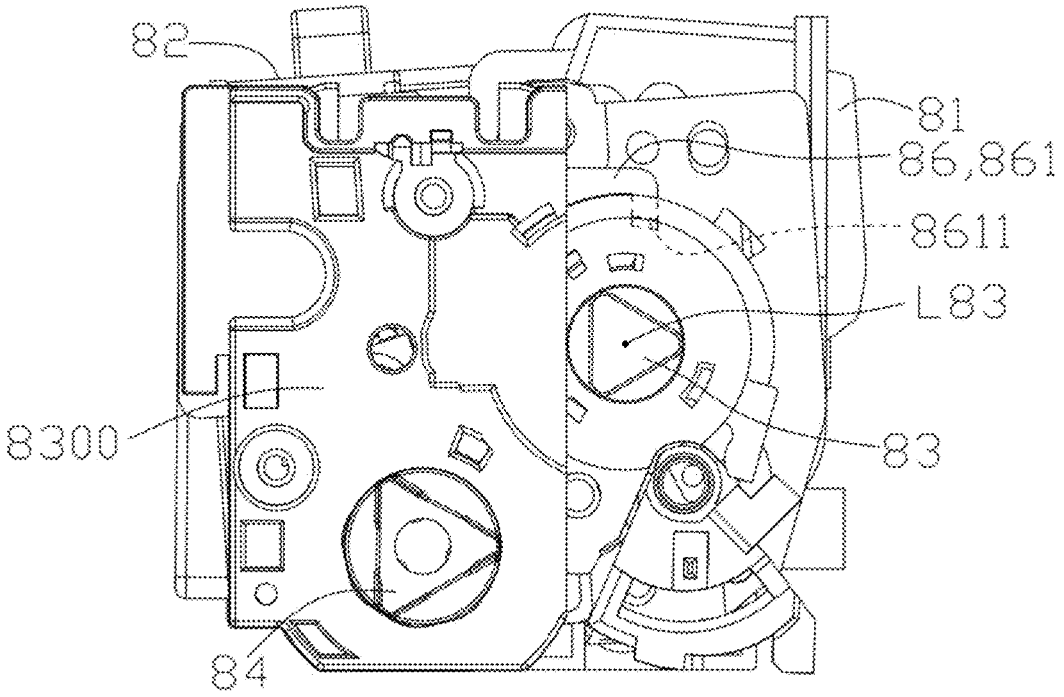
FIG. 58 is a schematic view of a variant of the process cartridge according to Embodiment 21, viewed from left to right along a first direction.

As shown in FIG. 52 and FIG. 53, in this embodiment, when viewed from left to right along the left-right direction, in the front-rear direction, at least a part of the first drive force receiving member 83 is located to the rear of the rear end 8301 of the first end cap 8300. In other words, compared to the above embodiments, the first end cap 8300 in this embodiment has a smaller volume, which can reduce material usage, lower costs, and also reduce the volume of the process cartridge C, contributing to its miniaturization.

Further, as shown in FIG. 53, when viewed from left to right along the left-right direction, a line J is drawn passing through the rotation axis L83 of the first drive force receiving member 83 and the first end cap 8300. The line J is parallel to the front-rear direction. The rear end 8301 is divided by the line J into a first portion 8301*a* and a second portion 8301*b*. In the up-down direction, the first portion 8301*a* is located above the rotation axis L83 or line J, and the second portion 8301*b* is located below the rotation axis L83 or line J. Still further, the included angle between the first portion 8301*a* and the second portion 8301*b* is greater than 90°, for example, the included angle between them is 180°.

Continuing with FIG. 52 and FIG. 53, the process cartridge C includes a connecting member 86. Through the connecting member 86, the first unit 8100 can move relative to the second unit 8200. In the up-down direction, the connecting member 86 is located above the rotation axis L83 of the first drive force receiving member 83. Specifically, the connecting member 86 includes a connecting portion 861 and a connected portion 862. The connecting portion 861 is provided on the first unit 8100, for example, on the cover 814. The connected portion 862 is provided on the first end cap 8300. The connecting portion 861 and the connected portion 862 cooperate. Further, the connecting portion 861 is configured as a slider, and the connected portion 862 is configured as a sliding groove. The connecting portion 861 can move along the connected portion 862. Still further, the connecting portion 861 is preferably an arc-shaped slider, and the connected portion 862 is preferably an arc-shaped sliding groove, so that the first unit 8100 can swing relative to the second unit 8200.

In some embodiments, the connecting portion 861 may be an arc-shaped sliding groove, and the connected portion 862 may be an arc-shaped slider.

As shown in FIGS. 54 to 58, in a variant of this embodiment, in the up-down direction, the connecting member 86 is also located above the rotation axis L83 of the first drive force receiving member 83. Specifically, the connecting portion 861 is provided on the second unit 8200, for example, on the second unit housing 82. The connected portion 862 is provided on the first unit 8100, for example, on the cover 814. Further, the connecting portion 861 is a slider formed integrally or separately with the second unit housing 82. The connected portion 862 is a sliding groove on a neck portion 8142 of the cover 814. At least a part of the connecting portion 861 fits into the connected portion 862, so that the first unit 8100 can swing relative to the second unit 8200. Still further, the free end of the connecting portion 861 has a second restricting portion 8611. After at least a part of the connecting portion 861 fits into the connected portion 862, the second restricting portion 8611 is configured for abutting against the inner surface 81421 of the neck portion 8142 to prevent the connecting portion 861 and the connected portion 862 from disengaging. The inner surface 81421 faces the rotation axis L83 of the first drive force receiving member 83.

In some embodiments, the arc curvature of the connecting portion 861 is the same as the arc curvature of the neck portion 8142.

Embodiment 22

Figure 59:
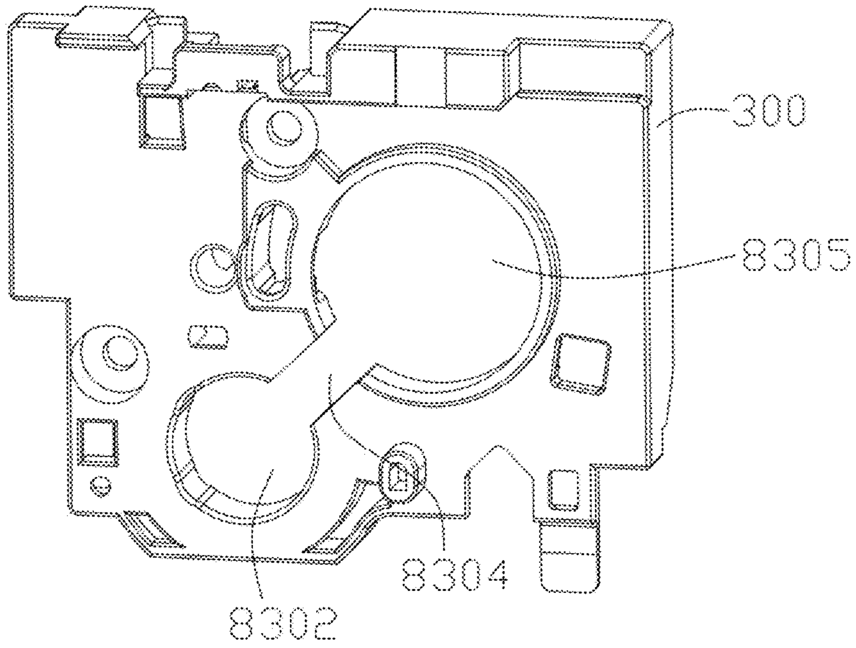
FIG. 59 is a perspective view of the first end cap in the process cartridge according to Embodiment 22.

As shown in FIG. 59, the first end cap 8300 further includes a third exposure hole 8304. The third exposure hole 8304 is connected to both the second exposure hole (second exposure portion) 8302 and the first exposure hole (first exposure portion) 8305. In other words, the second exposure hole 8302 and the first exposure hole 8305 on the first end cap 8300 are interconnected. That is, the second exposure hole 8302, the first exposure hole 8305, and the third exposure hole 8304 form a single exposure hole. Both the first drive force receiving member 83 and the second drive force receiving member 84 are exposed through this exposure hole. Such a design does not affect the function of the first drive force receiving member 83 and the second drive force receiving member 84, saves material for the first end cap 8300, and at the same time, this exposure hole has a certain elastic deformation capability, making it easier to install the first unit 8100 and the second drive force receiving member 84 with the exposure hole.

Although the present disclosure has been described through the above embodiments, it should be understood that the above embodiments are only for exemplifying the feasible solutions of the present disclosure and should not be interpreted as limiting the scope of protection of the present disclosure. Unless there are contradictions or exclusions, the different embodiments disclosed above and their modifications may be mutually cited, referenced, or combined, and the technical features of different embodiments and their modifications can also be mutually combined and/or replaced.

What is claimed is:

1. A process cartridge detachably mountable in an image forming apparatus, the image forming apparatus comprising a tray configured to mount the process cartridge, the tray being movable into and out of a main assembly of the image forming apparatus, the process cartridge comprising:

a developing unit provided with a developing member;

a photosensitive unit provided with a photosensitive member;

a side member disposed at a longitudinal end of the process cartridge, the developing unit and the photosensitive unit being arranged along a front-rear direction and movably connected by the side member;

a separation force receiving member configured to receive a separation force from the image forming apparatus thereby causing the developing unit to move relative to the photosensitive unit;

a resetting member configured to elastically deform and apply a force to the photosensitive unit when the developing unit moves relative to the photosensitive unit; and a positioning member provided on at least one of the side member and the photosensitive unit;

wherein when the separation force receiving member receives the separation force, as the developing unit moves, the positioning member abuts the tray in the front-rear direction by the force of the resetting member.

2. The process cartridge according to claim 1, wherein the photosensitive unit further comprises a frame, and the photosensitive member is rotatable relative to the frame; and when the separation force receiving member receives the separation force, as the developing unit moves, the resetting member elastically deforms and applies a rearward pushing force to the frame, and the positioning member abuts the tray in the front-rear direction by the pushing force, such that the process cartridge is positioned; wherein the rearward direction is a direction from the developing unit toward the photosensitive unit.

3. The process cartridge according to claim 2, wherein the tray comprises a plurality of side plates and a process cartridge receiving cavity formed by the plurality of side plates, and the positioning member is configured to abut an inner surface of at least one of the plurality of side plates, the inner surface faces the process cartridge receiving cavity.

4. The process cartridge according to claim 1, wherein the positioning member is configured as a protrusion.

5. The process cartridge according to claim 3, wherein the positioning member comprises a front positioning member and a rear positioning member, the tray comprises a tray frame and a support portion provided on the tray frame for supporting the process cartridge; the tray frame comprises a first side plate, a second side plate, a third side plate, and a fourth side plate;

the first side plate and the second side plate are spaced apart from and opposite to each other in the front-rear direction, the third side plate and the fourth side plate are spaced apart from and opposite to each other in a longitudinal direction of the process cartridge, and the first side plate, the second side plate, the third side plate, and the fourth side plate enclose and form the process cartridge receiving cavity;

along the front-rear direction, the first side plate is located in front of the second side plate, the first side plate has a first inner surface facing the process cartridge receiving cavity, and the second side plate has a second inner surface facing the process cartridge receiving cavity, the first inner surface and the second inner surface are opposite to each other;

before the separation force receiving member receives the separation force, the front positioning member is in a state of contact with the first inner surface or a gap is formed between the front positioning member and the first inner surface, and the rear positioning member is in a state of contact with the second inner surface or a gap is formed between the rear positioning member and the second inner surface; the front-rear direction is parallel to a direction in which the tray moves into and out of the main assembly of the image forming apparatus; and when the separation force receiving member receives the separation force, the developing unit rotates relative to the photosensitive unit, and the rear positioning member abuts the second inner surface.

6. The process cartridge according to claim 1, wherein the image forming apparatus is provided with a rotational stop protrusion, the process cartridge further comprises a charging member and a conductive member, the charging member is configured to charge the photosensitive member, the conductive member is configured to supply power to the charging member;

along a longitudinal direction of the process cartridge, the side member comprises a first side member disposed at a first end of the process cartridge and a second side member disposed at a second end of the process cartridge, the second side member is provided with a first end face and a step portion, the step portion comprises a recessed portion, the recessed portion is recessed from the step portion toward the first end of the process cartridge along the longitudinal direction of the process cartridge and is further recessed toward a front direction along the front-rear direction, the conductive member is disposed in the recessed portion and is exposed rearward, the step portion protrudes from the first end face, the step portion has an abutment surface facing a lower side of the process cartridge; and when the process cartridge is mounted in the image forming apparatus, the abutment surface abuts the rotational stop protrusion, the front-rear direction is parallel to a direction in which the tray moves into and out of the main assembly of the image forming apparatus, and along the front-rear direction, a direction from the developing unit toward the photosensitive unit is a rearward direction, and an opposite direction is the front direction.

7. The process cartridge according to claim 6, wherein the developing unit comprises a first driving member provided at the first end of the process cartridge in a longitudinal direction, and the photosensitive unit comprises a second driving member provided at the first end of the process cartridge in the longitudinal direction;

the first side member is provided with a first exposure portion configured to expose at least a part of the first driving member and a second exposure portion configured to expose at least a part of the second driving member, the first exposure portion is configured as a notch structure, and the second exposure portion is configured as a hole structure;

the first side member further comprises a guide groove, an end face of the developing unit is provided with a protrusion cooperating with the guide groove, the developing unit is supported by the first side member through the cooperation of the guide groove and the protrusion, and the protrusion is slidable within the guide groove when the developing unit moves relative to the photosensitive unit.

8. The process cartridge according to claim 6, wherein the image forming apparatus is provided with a preventing portion, the first side member further comprises a chip mount configured to mount a chip and an avoidance portion configured to avoid the preventing portion, along the front-rear direction, the avoidance portion is located to the rear of the chip mount, and when the process cartridge is lowered with the tray to a predetermined position, the preventing portion enters the avoidance portion.

9. The process cartridge according to claim 1, further comprising a chip and a chip mount, the chip is provided with a substrate and a terminal, the terminal is provided on the substrate; the chip mount is provided with a mounting surface for supporting the substrate; and the chip is configured to be press-fit into the chip mount when being mounted.

10. The process cartridge according to claim 9, wherein the chip mount is provided with a mounting cavity, the mounting surface is disposed inside the mounting cavity, the mounting cavity has a mounting opening facing upward, and the mounting opening is provided with a guide portion configured to guide the chip.

11. The process cartridge according to claim 10, wherein the substrate comprises a front surface, a rear surface opposite the front surface, and a side surface connecting the front surface and the rear surface, the terminal is provided on the front surface;

the chip mount further comprises an elastic member and a blocking portion, the elastic member is provided on at least one side of the mounting cavity and comprises a cover portion, the cover portion is configured to abut the front surface of the substrate; and the blocking portion is provided on a side of the mounting cavity different from the side on which the elastic member is provided, and the blocking portion is configured to abut the side surface of the substrate.

12. The process cartridge according to claim 11, wherein the chip mount comprises two elastic members, the two elastic members are provided on opposite sides of the mounting cavity, respectively; and within a region defined by the mounting cavity, the chip mount further comprises an empty portion adjacent to the blocking portion.

13. The process cartridge according to claim 9, wherein the chip mount is detachable relative to the side member.

14. The process cartridge according to claim 1, further comprising a plurality of electrode contacts, wherein the developing unit is rotatable relative to the photosensitive unit about an developing rotation axis, and the developing rotation axis is located outside of a polygon having a largest area that formed by connecting the plurality of electrode contacts.

15. The process cartridge according to claim 1, further comprising a sealing member removable from the process cartridge, wherein when viewed in a direction perpendicular to a surface of the sealing member, an developing rotation axis of the developing unit is located outside of a width dimension of the sealing member defined in a direction perpendicular to the developing rotation axis.

16. The process cartridge according to claim 2, wherein the separation force receiving member comprises a surface configured to receive the separation force, at least a portion of the surface faces downward.

17. The process cartridge according to claim 2, further comprising a shielding member, wherein the separation force receiving member is provided with an acting portion, the acting portion is configured to receive a force applied by the image forming apparatus, and when viewed in a longitudinal direction of the process cartridge, the shielding member shields the acting portion.

18. A process cartridge detachably mountable in an image forming apparatus, the image forming apparatus comprising a tray configured to mount the process cartridge, the tray having a rear inner surface disposed to face a front-rear direction; the process cartridge comprising:

a developing unit provided with a developing member;

a photosensitive unit provided with a photosensitive member;

a side member disposed at a longitudinal end of the process cartridge, the developing unit and the photosensitive unit being arranged along a front-rear direction and movably connected by the side member;

a separation force receiving member configured to receive a separation force from the image forming apparatus thereby causing the developing unit to move relative to the photosensitive unit;

a resetting member configured to elastically deform and apply a force to the photosensitive unit when the developing unit moves relative to the photosensitive unit; and a rear positioning member provided on at least one of the side member and the photosensitive unit;

wherein when the separation force receiving member receives the separation force, as the developing unit moves, the rear positioning member abuts the rear inner surface by the force of the resetting member.

19. The process cartridge according to claim 18, further comprising a front positioning member configured to abut a front inner surface of the tray, wherein the front inner surface and the rear inner surface are opposite to each other.

20. The process cartridge according to claim 18, wherein the rear positioning member is configured as a protrusion.

* * * * *